(12) United States Patent
Osborne et al.

(10) Patent No.: US 11,569,541 B2
(45) Date of Patent: Jan. 31, 2023

(54) BATTERY PACK FOR A CORDLESS POWER TOOL

(71) Applicant: Black & Decker Inc., Newark, DE (US)

(72) Inventors: Nathan Osborne, Baltimore, MD (US); Corey Redmond, Elkridge, MD (US); Dustin Jeffries, Baltimore, MD (US); Ralphy A. Louis, York, PA (US); Michael Varipatis, Fallston, MD (US); Bhanuprasad V. Gorti, Perry Hall, MD (US); Daniel J. White, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 81 days.

(21) Appl. No.: 14/755,737

(22) Filed: Jun. 30, 2015

(65) Prior Publication Data
US 2015/0380697 A1    Dec. 31, 2015

Related U.S. Application Data

(60) Provisional application No. 62/019,106, filed on Jun. 30, 2014.

(51) Int. Cl.
*H01M 50/211*    (2021.01)
*H01M 50/209*    (2021.01)
(Continued)

(52) U.S. Cl.
CPC ....... *H01M 50/209* (2021.01); *H01M 10/482* (2013.01); *H01M 10/486* (2013.01);
(Continued)

(58) Field of Classification Search
CPC combination set(s) only.
See application file for complete search history.

(56) References Cited

U.S. PATENT DOCUMENTS

| 4,659,636 A | * | 4/1987 | Suzuki | H01M 50/555 |
|---|---|---|---|---|
| | | | | 429/57 |
| 5,227,260 A | * | 7/1993 | Rose | H01M 10/12 |
| | | | | 429/185 |

(Continued)

FOREIGN PATENT DOCUMENTS

| CN | 101176223 A | * | 5/2008 | ............ H01M 10/04 |
| CN | 102484221 A | * | 5/2012 | ............ H01M 10/48 |

(Continued)

OTHER PUBLICATIONS

Thomas, Shane, "PCT Search Report dated Dec. 1, 2015".

(Continued)

*Primary Examiner* — Kaity V Chandler
(74) *Attorney, Agent, or Firm* — Michael Aronoff

(57) ABSTRACT

A battery pack includes a battery cell holder, where the battery cell holder includes multiple frames with each of the frames defining a cavity and adjacent frames connected to each other. The battery pack includes at least one pouch battery cell disposed in the cavity of each of the frames, where pouch battery cells disposed in adjacent frames are electrically connected to each other. The multiple frames are arranged in a stacked configuration.

14 Claims, 72 Drawing Sheets

(51) Int. Cl.
- H01M 10/48 (2006.01)
- H01M 50/502 (2021.01)
- H01M 10/42 (2006.01)
- H01M 10/0585 (2010.01)
- H01M 10/0525 (2010.01)
- H01M 50/578 (2021.01)
- H01M 50/581 (2021.01)

(52) U.S. Cl.
CPC ...... H01M 50/502 (2021.01); *H01M 10/0525* (2013.01); *H01M 10/0585* (2013.01); *H01M 10/425* (2013.01); *H01M 50/578* (2021.01); *H01M 50/581* (2021.01); *H01M 2220/30* (2013.01)

(56) References Cited

U.S. PATENT DOCUMENTS

| | | |
|---|---|---|
| 5,773,164 A | 6/1998 | Venkatesan et al. |
| 6,056,185 A | 5/2000 | Daroux et al. |
| 6,287,721 B1 | 9/2001 | Xie et al. |
| 6,296,967 B1 | 10/2001 | Jacobs et al. |
| 6,304,057 B1 | 10/2001 | Hamada et al. |
| 6,335,110 B1 | 1/2002 | Chang et al. |
| 6,432,574 B1 | 8/2002 | Saito et al. |
| 6,440,604 B1 | 8/2002 | Yoshida et al. |
| 6,497,978 B1 | 12/2002 | Takada et al. |
| 6,641,027 B2 | 11/2003 | O'Connell et al. |
| 6,670,771 B2 | 12/2003 | Shin et al. |
| 6,822,420 B2 | 11/2004 | Kozu et al. |
| 6,849,458 B2 | 2/2005 | Pantoliano et al. |
| 7,054,139 B2 | 5/2006 | Stephens et al. |
| 7,108,941 B2 | 9/2006 | Hayashi et al. |
| 7,177,140 B2 | 2/2007 | Clarke et al. |
| 7,201,997 B2 | 4/2007 | Ishida et al. |
| 7,261,971 B2 | 8/2007 | Higuchi et al. |
| 7,348,099 B2 | 3/2008 | Mukai et al. |
| 7,458,996 B2 | 12/2008 | Ogura et al. |
| 7,466,547 B2 | 12/2008 | Heirich et al. |
| 7,479,349 B2 | 1/2009 | O'Phelan et al. |
| 7,504,179 B2 | 3/2009 | Tanjou et al. |
| 7,553,581 B2 | 6/2009 | Sugimune et al. |
| 7,602,146 B2 | 10/2009 | Carrier et al. |
| 7,611,797 B2 | 11/2009 | Kim et al. |
| 7,648,538 B2 * | 1/2010 | Oogami ............ H01M 10/0486 429/162 |
| 7,659,029 B2 | 2/2010 | Oogami et al. |
| 7,666,547 B2 | 2/2010 | Urano et al. |
| 7,727,671 B2 | 6/2010 | Okutani et al. |
| 7,736,797 B2 | 6/2010 | Kim et al. |
| 7,811,708 B2 | 10/2010 | Chamberlain, II et al. |
| 7,879,486 B2 | 2/2011 | Skinlo et al. |
| 7,935,439 B2 | 5/2011 | Kim |
| 8,043,743 B2 | 10/2011 | Park et al. |
| 8,173,293 B2 | 5/2012 | Kim |
| 8,227,108 B2 | 7/2012 | Lee et al. |
| 8,252,452 B2 | 8/2012 | Yoon et al. |
| 8,263,256 B2 | 9/2012 | Shibuya et al. |
| 8,318,345 B2 | 11/2012 | Kim et al. |
| 8,420,251 B2 | 4/2013 | Watanabe et al. |
| 8,426,057 B2 | 4/2013 | Park et al. |
| 8,448,836 B2 | 5/2013 | Schloms et al. |
| 8,574,740 B2 | 11/2013 | Weber et al. |
| 8,574,753 B2 | 11/2013 | Ishii et al. |
| 8,652,220 B2 | 2/2014 | Horie et al. |
| 8,709,636 B2 | 4/2014 | Oury et al. |
| 8,709,637 B2 | 4/2014 | Ahn et al. |
| 9,537,173 B2 | 1/2017 | Kim et al. |
| 9,899,708 B2 | 2/2018 | Kim et al. |
| 10,381,605 B2 | 8/2019 | Fauteux et al. |
| 10,490,868 B2 | 11/2019 | Nam et al. |
| 10,601,005 B2 | 3/2020 | Lee et al. |
| 10,622,597 B2 | 4/2020 | Yoo et al. |
| 10,734,617 B2 | 8/2020 | Sakai et al. |
| 2003/0091896 A1 | 5/2003 | Watanabe et al. |
| 2003/0170535 A1 | 9/2003 | Watanabe et al. |
| 2003/0224246 A1 | 12/2003 | Watanabe et al. |
| 2004/0009334 A1 | 1/2004 | Nakada et al. |
| 2004/0228061 A1 | 11/2004 | Kim et al. |
| 2005/0058908 A1 | 3/2005 | Imachi et al. |
| 2005/0100783 A1 | 5/2005 | Ro et al. |
| 2006/0127751 A1 | 6/2006 | Woo et al. |
| 2008/0007011 A1 | 1/2008 | Buermann et al. |
| 2008/0018821 A1 | 1/2008 | Park et al. |
| 2008/0070102 A1 | 3/2008 | Tanjou et al. |
| 2008/0070111 A1 | 3/2008 | Abe et al. |
| 2008/0118821 A1 | 5/2008 | Gehring et al. |
| 2009/0023057 A1 * | 1/2009 | Kim ............ H01M 50/10 429/185 |
| 2009/0061302 A1 | 3/2009 | Scott et al. |
| 2009/0142659 A1 | 6/2009 | Lai et al. |
| 2009/0208828 A1 * | 8/2009 | Kanai ............ H01M 50/209 429/120 |
| 2010/0045049 A1 | 2/2010 | Rossetti et al. |
| 2011/0020690 A1 | 1/2011 | Canale et al. |
| 2011/0042117 A1 | 2/2011 | Doege et al. |
| 2011/0070477 A1 | 3/2011 | Fujiwara et al. |
| 2011/0129722 A1 | 6/2011 | Yoneda et al. |
| 2011/0159328 A1 * | 6/2011 | Yeo ............ H01M 50/116 429/162 |
| 2011/0229745 A1 | 9/2011 | Barter et al. |
| 2011/0248069 A1 | 10/2011 | Khakhalev et al. |
| 2012/0003506 A1 | 1/2012 | Shin et al. |
| 2012/0028097 A1 | 2/2012 | Oury et al. |
| 2012/0040221 A1 | 2/2012 | Stoughton et al. |
| 2012/0040235 A1 | 2/2012 | Cho et al. |
| 2012/0045682 A1 | 2/2012 | Oury et al. |
| 2012/0064385 A1 | 3/2012 | Park |
| 2012/0183831 A1 | 7/2012 | Jeong et al. |
| 2012/0196173 A1 | 8/2012 | Kim |
| 2012/0214055 A1 * | 8/2012 | Schaefer ............ H01M 50/116 429/186 |
| 2012/0231300 A1 | 9/2012 | Park et al. |
| 2012/0301776 A1 | 11/2012 | Hohenthanner et al. |
| 2013/0011717 A1 | 1/2013 | Yotsumoto et al. |
| 2013/0052511 A1 | 2/2013 | Khakhalev et al. |
| 2013/0101883 A1 | 4/2013 | Zhao |
| 2013/0189554 A1 * | 7/2013 | Schmieder ............ H01M 50/20 429/100 |
| 2013/0207459 A1 | 8/2013 | Schröder et al. |
| 2013/0207612 A1 | 8/2013 | Lev et al. |
| 2013/0216880 A1 | 8/2013 | Park et al. |
| 2013/0224523 A1 | 8/2013 | Nam et al. |
| 2013/0280578 A1 | 10/2013 | Yang et al. |
| 2013/0280587 A1 | 10/2013 | Kim et al. |
| 2013/0288110 A1 | 10/2013 | Schaefer et al. |
| 2013/0344379 A1 | 12/2013 | Cho et al. |
| 2014/0072851 A1 | 3/2014 | Oh et al. |
| 2014/0087245 A1 | 3/2014 | Lee et al. |
| 2014/0093768 A1 | 4/2014 | Kim et al. |
| 2014/0154565 A1 | 6/2014 | Ku et al. |
| 2014/0199584 A1 * | 7/2014 | Kondo ............ H01M 4/131 429/163 |
| 2014/0308585 A1 * | 10/2014 | Han ............ C01B 33/18 252/502 |
| 2014/0370387 A1 * | 12/2014 | Anguchamy ......... H01M 4/364 429/223 |
| 2015/0380697 A1 | 12/2015 | Osborne et al. |
| 2016/0141728 A1 | 5/2016 | Fauteux et al. |
| 2017/0331083 A1 | 11/2017 | Koenig et al. |
| 2019/0363332 A1 | 11/2019 | Fauteux et al. |
| 2020/0358053 A1 | 11/2020 | Sauerteig et al. |
| 2020/0358054 A1 | 11/2020 | Sauerteig et al. |
| 2020/0358055 A1 | 11/2020 | Sauerteig et al. |
| 2020/0358060 A1 | 11/2020 | Sauerteig et al. |
| 2020/0358145 A1 | 11/2020 | Sauerteig et al. |
| 2020/0388892 A1 | 12/2020 | Kim |
| 2021/0024517 A1 | 1/2021 | Long et al. |
| 2021/0143498 A1 | 5/2021 | Lee et al. |

(56) References Cited

U.S. PATENT DOCUMENTS

FOREIGN PATENT DOCUMENTS

| | | |
|---|---|---|
| EP | 3460866 A1 | 3/2019 |
| EP | 3499600 A1 | 6/2019 |
| EP | 3591730 A1 | 1/2020 |
| EP | 3591739 A1 | 1/2020 |
| EP | 3664179 A1 | 6/2020 |
| EP | 3729534 A1 | 10/2020 |
| EP | 3818577 A1 | 5/2021 |
| EP | 3823081 A1 | 5/2021 |
| EP | 3488614 B1 | 1/2022 |
| GB | 2200068 | 7/1988 |
| JP | 2004039274 | 2/2004 |
| JP | 2005166279 | 6/2005 |
| JP | 3997430 | 10/2007 |
| JP | 2011054338 | 3/2011 |
| JP | 2012033449 | 2/2012 |
| WO | 2007011144 | 1/2007 |
| WO | 2008002024 | 1/2008 |
| WO | 2019120806 A1 | 6/2019 |
| WO | 2020114800 A1 | 6/2020 |

OTHER PUBLICATIONS

International Preliminary Report on Patentability dated Jan. 12, 2017.
Extended EP Search Report dated Nov. 24, 2017 issued in corresponding EP application No. 15815896.4.

\* cited by examiner

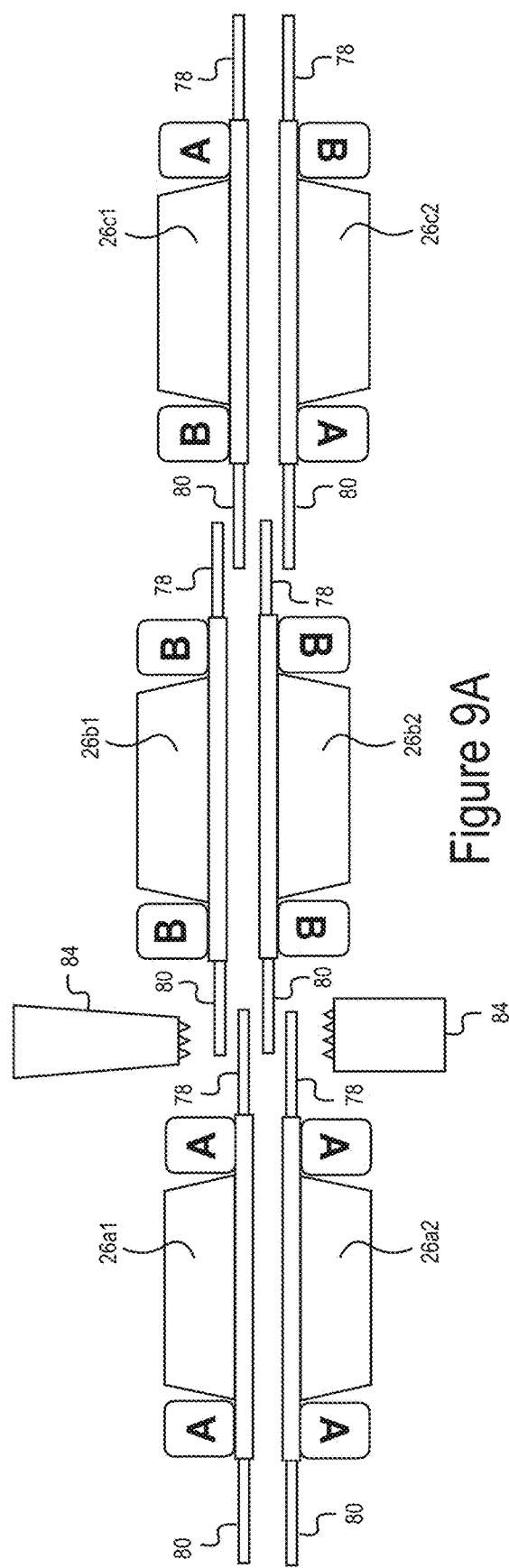
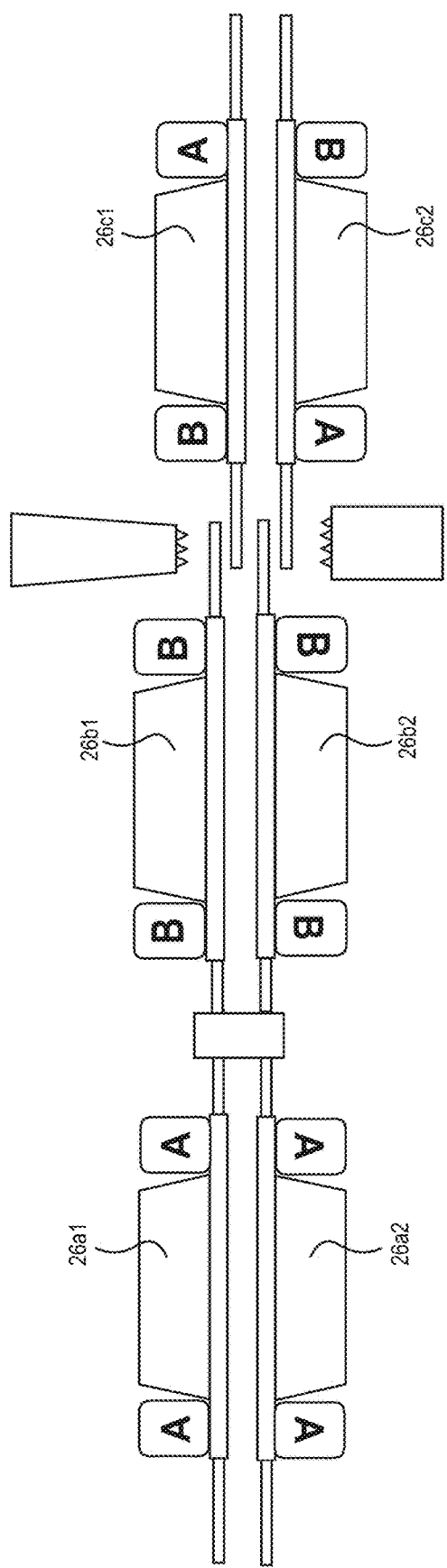
Figure 9A
Figure 9B

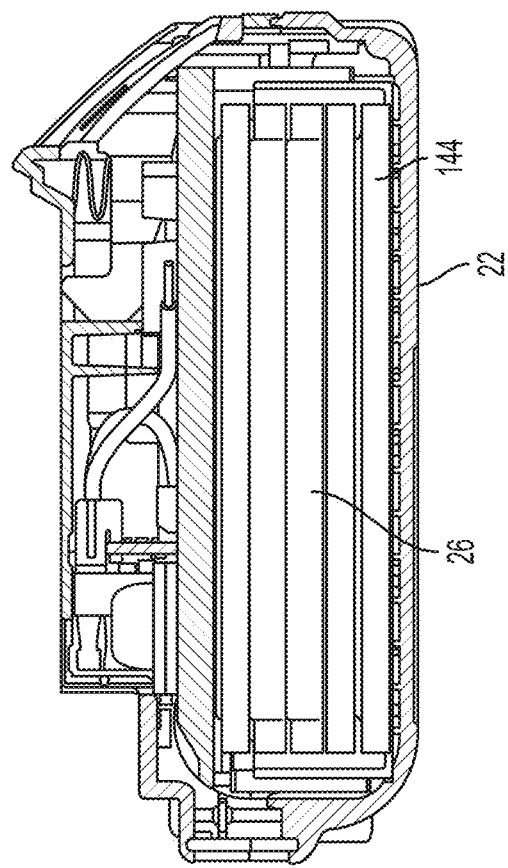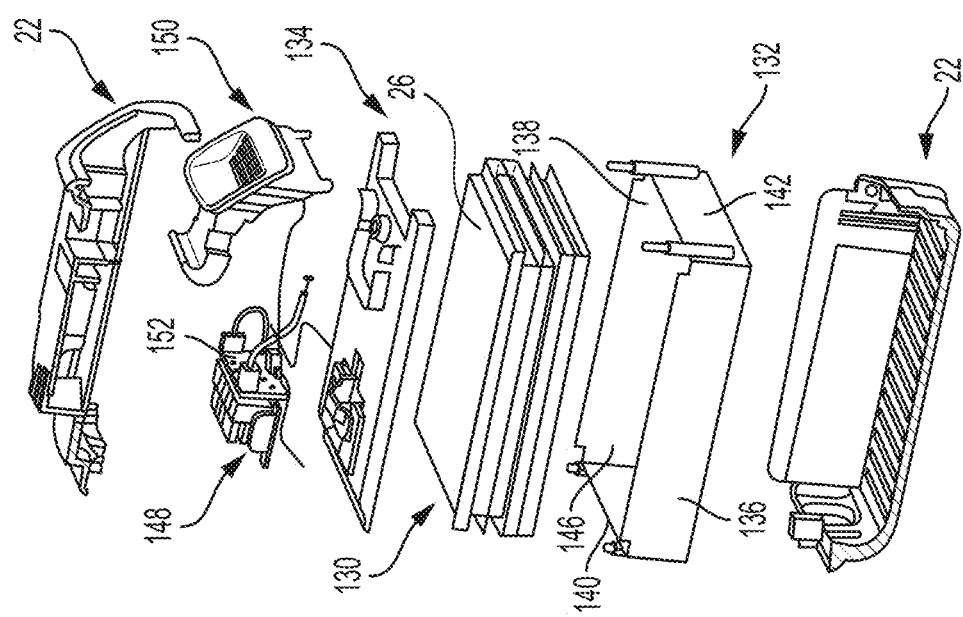
Figure 29

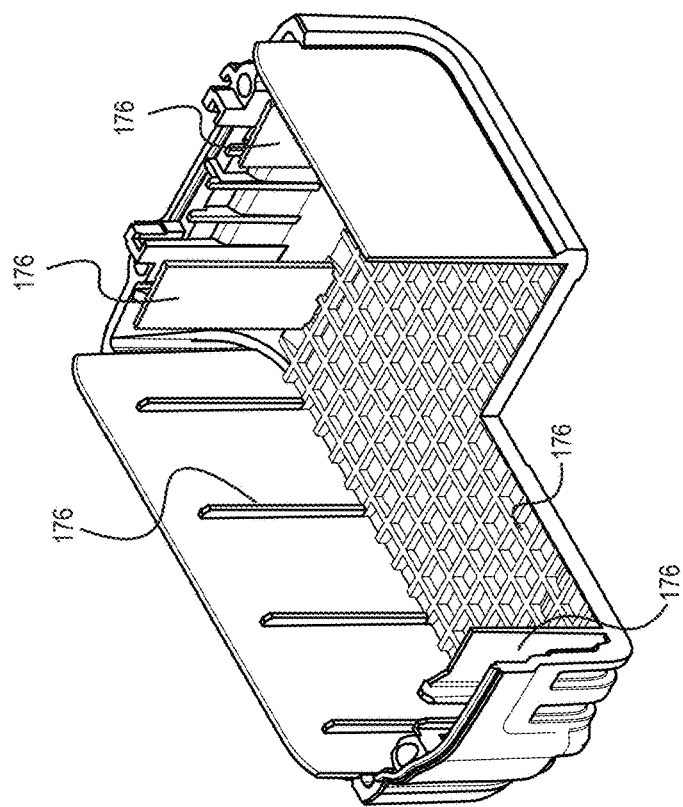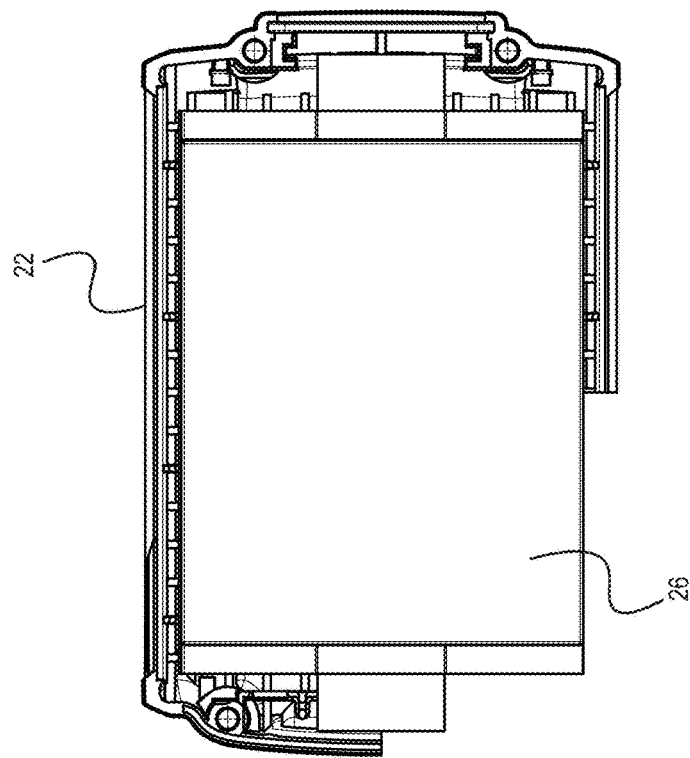
Figure 34

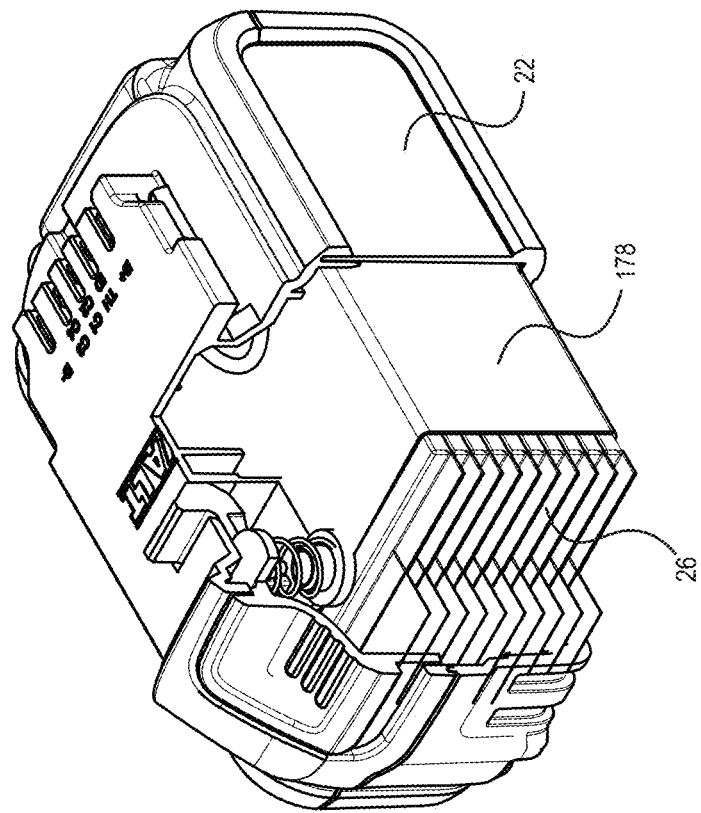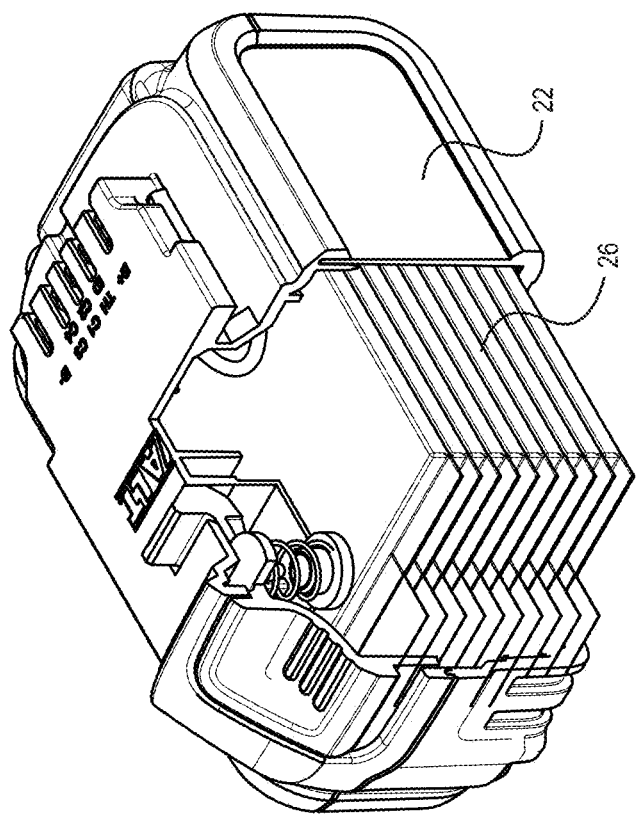
Figure 35

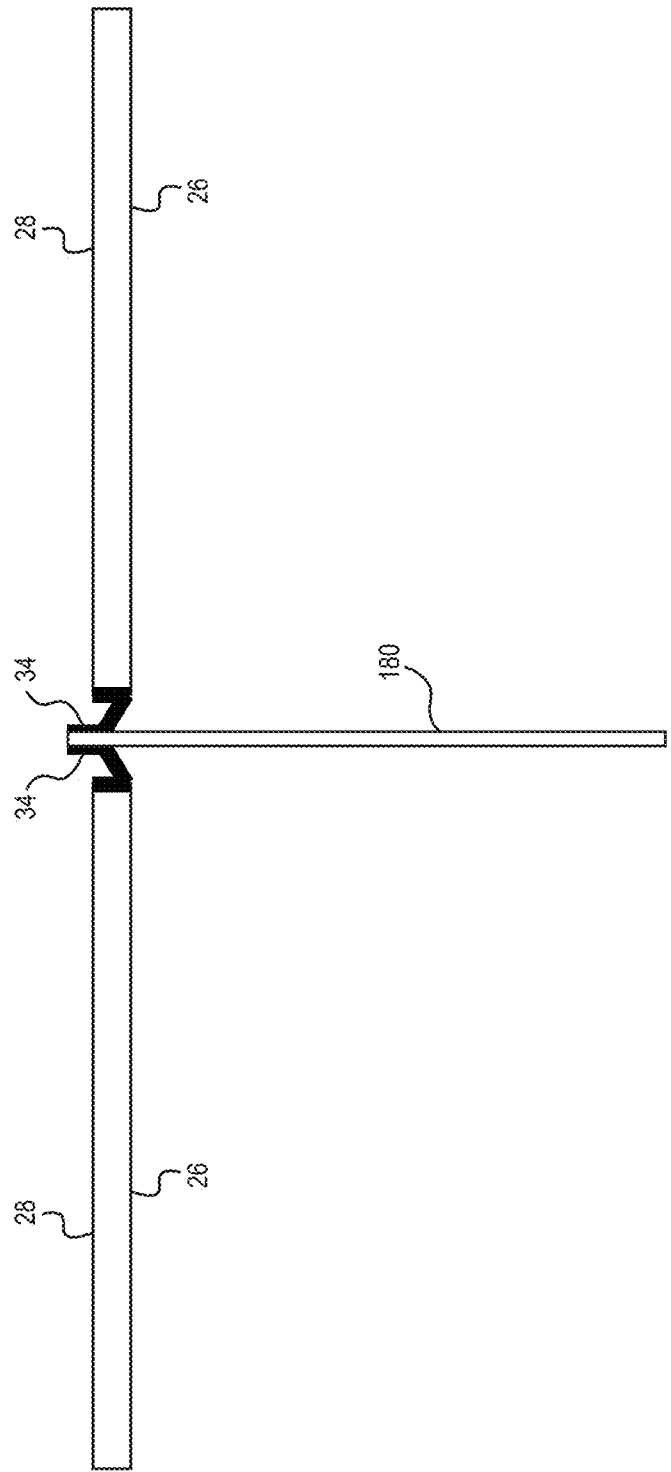
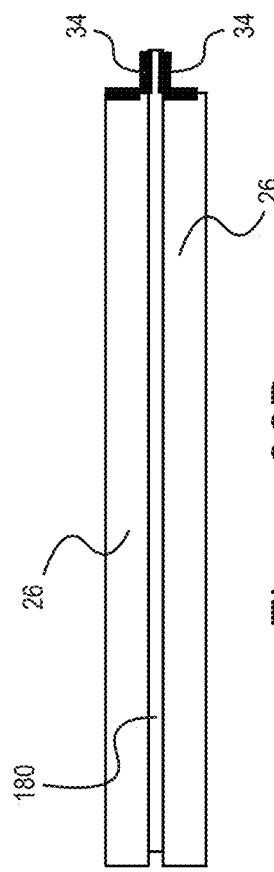
Figure 36A
Figure 36B

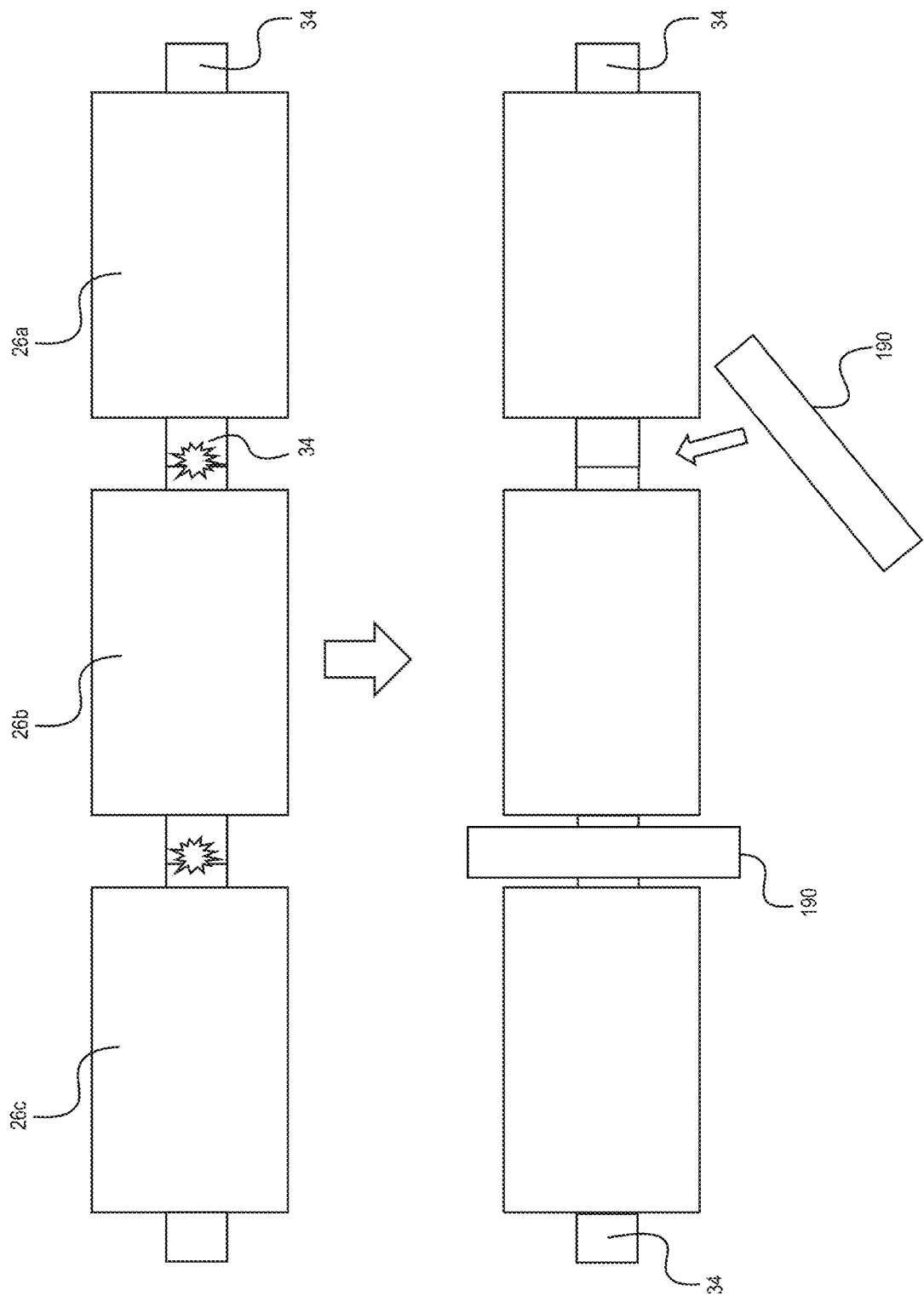

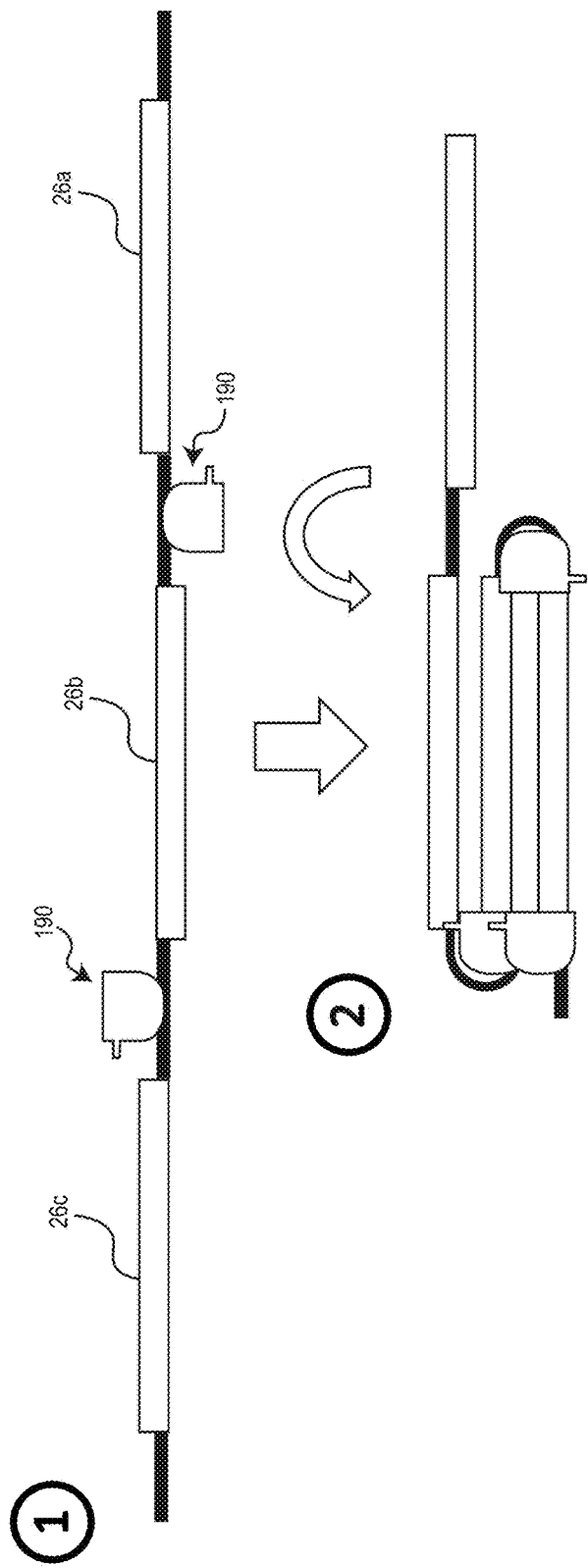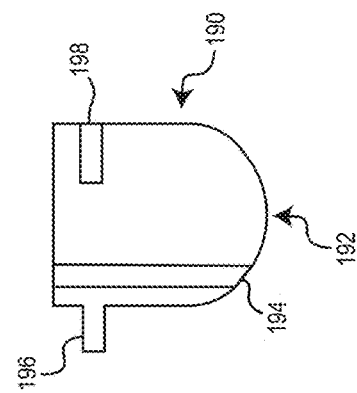

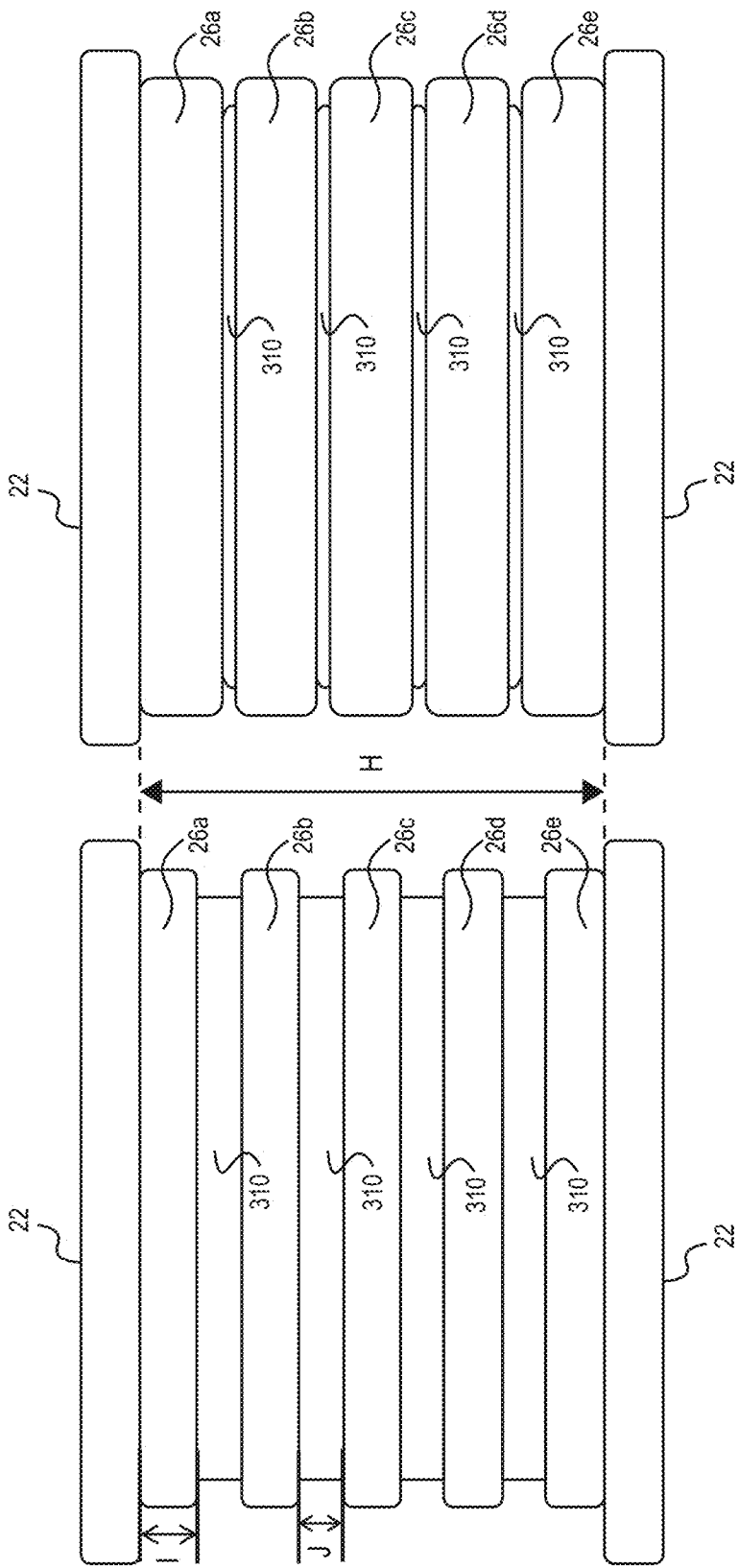

Pouch Cell Batteries: Inductive Characteristics

Measurement Method 1. providing a high frequency power supply and producing a pulse width modulated signal
2. charging the battery to 3.8 V/cell at a constant charging current of 3A followed by constant voltage at 3.8 V with a decreasing charging current until the charging current is less than 50mA
3. measuring cell parameters including cell OCV, input current to cell over time – at least 100 Megasamples/second
4. calculating the inductance L of the battery pack using the formula:

$$V(t) = L \frac{di}{dt}$$

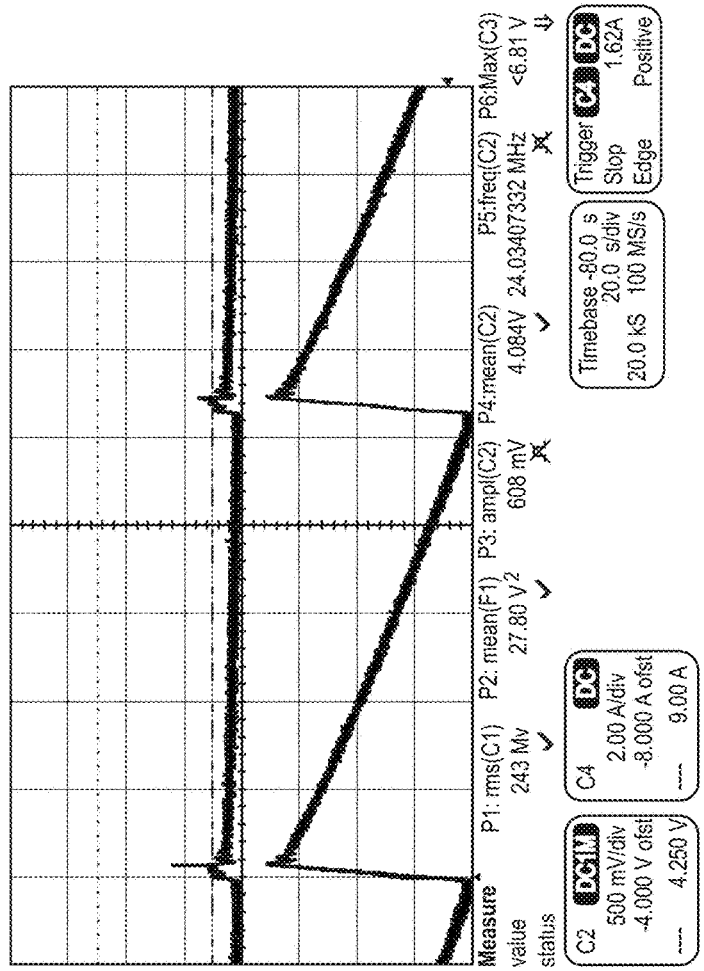

Figure 70

Pouch Cell Batteries: Inductive Characteristics

- A battery pack with a characteristic impedance-inductance ratio defined as:

$$\frac{1}{Z_{cell} L_{cell}}$$

- 5S1P Configuration:
  - $> 5.00 \times 10^7 \; \Omega^{-1} H^{-1}$

- 5S2P Configuration:
  - $> 4.00 \times 10^8 \; \Omega^{-1} H^{-1}$

- Zcell is to be measured by the AC Impedance method, using a Hioki 3560 AC Impedance meter or similar, with a measurement frequency of 1kHz
- Lcell is to be measured using the procedure outlined

Figure 71

Pouch Cell Batteries: Inductive Characteristics
- A battery pack with a characteristic energy density per inductance at high discharge rate defined as:
$$\frac{VIt}{L}$$
- For 5S1P Configuration
  — At 100A: >0.02 J/H
  — At 80A: >0.05 J/H
  — At 60A: >0.20 J/H
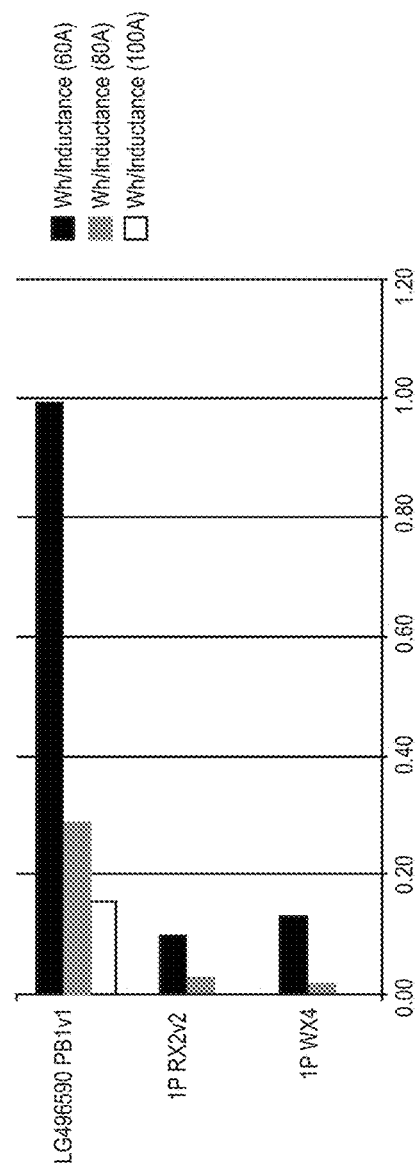
- For 5S2P Configuration
  — At 100A: >2.50 J/H
  — At 80A: >2.00 J/H
  — At 60A: >2.00 J/H
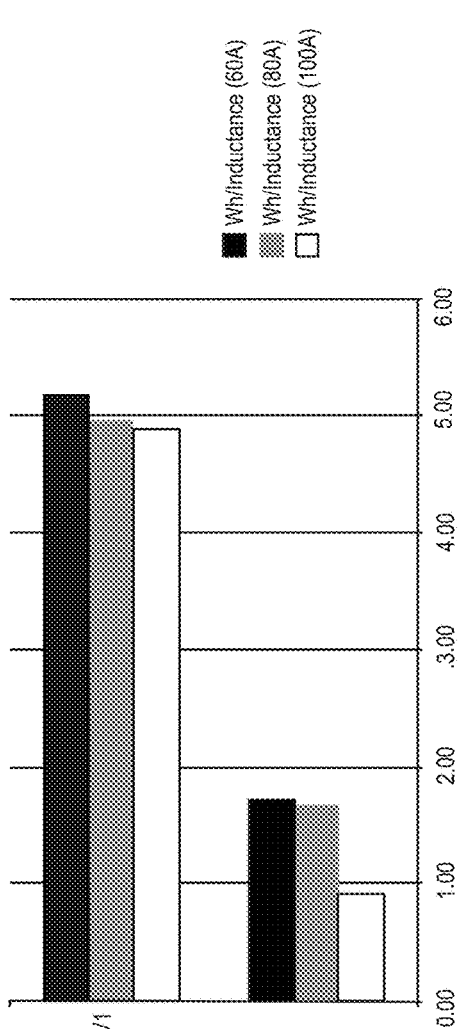
Figure 73

Pouch Cell Batteries: Inductive Characteristics

- Procedure for measuring Energy Density
  - Charge battery pack to 4.2V/cell at 3A using constant current, then charge at 4.2V/cell constant voltage until input current is less than 50mA.
    - Charge is completed when the input current is less than 50mA
  - Discharge the battery pack at a given constant current. Discharge is complete when battery pack reaches 2.5V/cell or 12.5V stack
    - Battery pack must be discharged in a chamber held at 23°C, 50% RH
    - Discharge is complete when pack voltage reaches 2.5V/cell or 12.5V stack
  - Record Voltage as a function of time during discharge
  - Calculate Whr based on formula below:

$$Whr = V_{rated} It$$

Other voltages could be used in these calculations, which will affect the measured Energy Density or Whr. Calculate the Whr. Using Watts x seconds, which equals Joules.

- Procedure for calculating $V_{mech}$:
  - The Mechanical volume of the battery pack is defined as the space enclosed by the outer surfaces of the battery pack including all opening surfaces that allow access into the interior of the battery pack

Figure 75

BATTERY PACK FOR A CORDLESS POWER TOOL

CROSS-REFERENCE TO RELATED APPLICATION

This application claims the benefit of U.S. Provisional Application Ser. No. 62/019,106, filed Jun. 30, 2014, titled "Battery Pack For A Cordless Power Tool," which is incorporated herein by reference in its entirety.

TECHNICAL FIELD

This description relates to a battery pack for a cordless power tool.

BACKGROUND

It is known that there are cordless power tools that are powered by a removable and rechargeable battery pack. Conventional removable, rechargeable battery packs include a housing and a battery—sometimes referred to as a core pack. The battery includes a plurality of battery cells. Conventional Li-Ion battery cells have a standard form factor referred to as 18650 in the industry.

SUMMARY

According to one general aspect, a battery pack includes a battery cell holder, where the battery cell holder includes multiple frames with each of the frames defining a cavity and adjacent frames connected to each other. The battery pack includes at least one pouch battery cell disposed in the cavity of each of the frames, where pouch battery cells disposed in adjacent frames are electrically connected to each other. The multiple frames are arranged in a stacked configuration.

In another general aspect, a method for manufacturing a battery includes inserting at least one pouch battery cell in each of a plurality of frames, where adjacent frames are connected to each other, electrically connecting the pouch battery cells in adjacent frames and folding the frames to form a stacked configuration of pouch battery cells.

In another general aspect, a battery pack includes a battery cell holder, where the battery cell holder comprises a tray defining a cavity. A plurality of pouch battery cells arranged in a stacked configuration are inserted into the cavity and a lid is coupled to the tray to cover the plurality of pouch battery cells in the tray.

The details of one or more implementations are set forth in the accompanying drawings and the description below. Other features will be apparent from the description and drawings, and from the claims.

BRIEF DESCRIPTION OF THE DRAWINGS

FIGS. 9a-9e is an example illustration of a manufacturing process for assembling a plurality of pouch cells in a string assembly having an alternating direction configuration.

FIG. 29 is an example illustration of an alternate implementation for a cell holder and a method of manufacturing a battery.

FIG. 34 is an example illustration of an alternate implementation for a cell holder.

FIG. 35 is an example illustration of the cell holder of FIG. 34.

FIGS. 36a-36b are example illustrations of connections of adjacent pouch cells.

FIG. 38 is an example illustration of a spacer or end cap.

FIG. 39 is an example illustration of the spacer or end cap of FIG. 38.

FIG. 40 is an example illustration of the spacer or end cap of FIG. 38.

FIGS. 67a and 67b are example illustrations of pouch cells assembled to form a battery.

FIG. 70 is an example illustration of inductive characteristics for a power tool battery pack.

FIG. 71 is an example illustration of inductive characteristics for a power tool battery pack.

FIG. 73 is an example illustration of inductive characteristics for pouch cell batteries.

FIG. 75 is an example illustration of inductive characteristics for pouch cell batteries.

DETAILED DESCRIPTION

This document describes non-cylindrical battery cells, for example, pouch cells or prismatic cells. The non-cylindrical battery cells may be used instead of 18650 battery cells. One example implementation includes the use of non-cylindrical battery cells in a battery pack, where the battery pack may be used with a cordless power tool.

Figure 1:
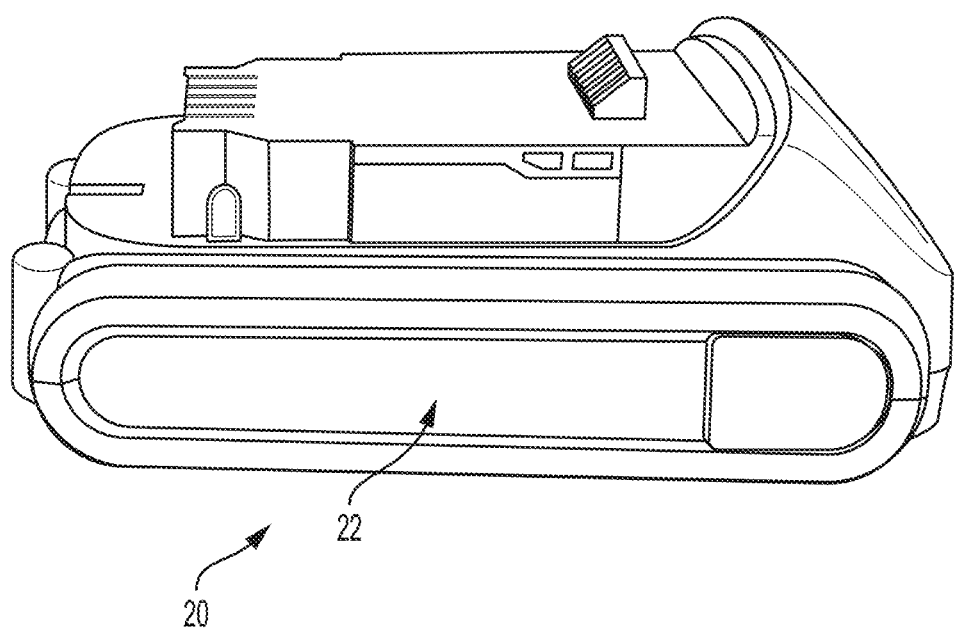
FIG. 1 is an example illustration of a battery pack.
Figure 2:
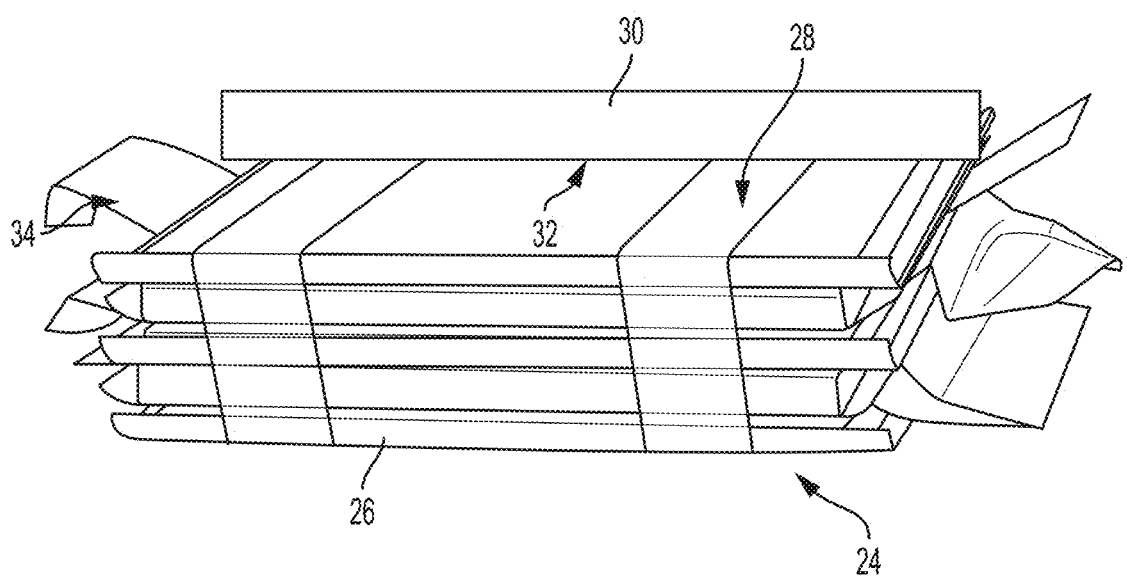
FIG. 2 is an example illustration of pouch cells contained in the battery pack of FIG. 1.

In one example implementation, one general aspect controls the expansion or swelling of a battery cell(s) inside a battery pack. FIG. 1 is an example illustration of a battery pack 20. FIG. 2 is an example illustration of pouch cells 26 contained in the battery pack 20 of FIG. 1. As illustrated in FIGS. 1 and 2, a battery pack 20 includes a housing 22 and a battery 24. The battery 24 includes a plurality of pouch cells 26. Each pouch cell 26 utilizes a sealed, metal/polymer laminated pouch 28 to hold the internal components of the cell 26. These types of cells are known to swell under a variety of conditions including high temperature environment, cell cycling, high current, etc. The battery pack 20 designed to use the pouch cells 26 must accommodate potential swelling of the cells or else the effective life of the battery/battery pack could be reduced. If the cell 26 does not have the ability to expand or swell, pressure will rise inside of the pouch 28. This could result in a seal of the pouch rupturing which would render the cell/battery useless.

In an example implementation, the battery pack 20 includes a firm internal plate structure 30 made of plastic or other material which serves as a hard stop and does not move as the cells 26 swell. The first cell in a stack will abut against the plate structure 30. As a result all swelling will occur in a direction other than towards the plate structure 30 preserving the dimensional location of the first cell. The plate structure 30 prevents the cells 26 from moving above a lower plane 32 of the plate structure 30. However, the cells 26 are connected with interconnects/tabs 34. The tabs 34 may flex as the cells 26 expand/swell. The tabs 34 may be, for example, (a) a metallic strap having an accordion configuration, (b) metal straps with excess length, (c) discrete wires with slack, or (d) flexible circuits with slack.

Alternatively or in addition, the battery pack housing 22 may include an external enclosure which can also expand in one or more directions. For example, the external enclosure may include a top portion and a bottom portion and a lap joint between the top portion and the bottom portion and a spring mechanism mounting the top portion and the bottom portion together in a clamshell configuration. As the battery cells 26 swell, the pack housing 22 expansion is controlled in a predefined direction(s). This allows the pack geometry that couples to a corresponding power tool to be maintained and avoid any dimensional changes. As such, the pouch cells 26 expand/swell and the battery pack 20 can expand away from the power tool. This configuration would prevent any interference with the power tool. This provides a configuration having a relatively small battery pack 20 when the battery pack 20 is new and allows the battery pack 20 to expand over time without causing any mechanical conflict with the power tool.

Another general aspect is to control a location of venting of the pouch cell 26 in abusive conditions or during excessive swelling such that any venting occurs in a more advantageous location. Yet another general aspect is to create features in the pouch 28 for mechanically coupling a first pouch cell to a second pouch cell and/or for locating and/or fixing the cell(s) in the battery pack housing 22.

Figure 3:
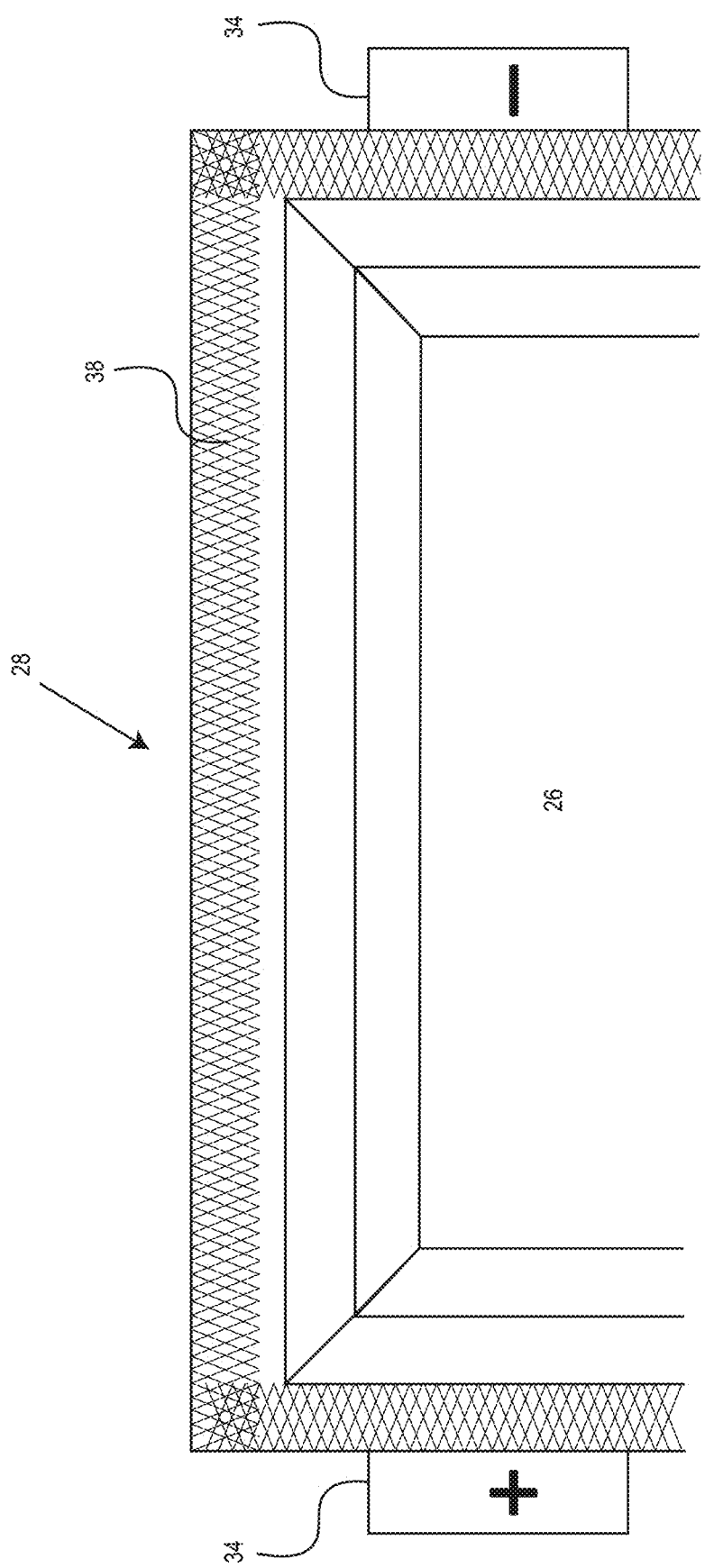
FIG. 3 is an example diagram of a portion of an example pouch cell from FIG. 2.
Figure 4:
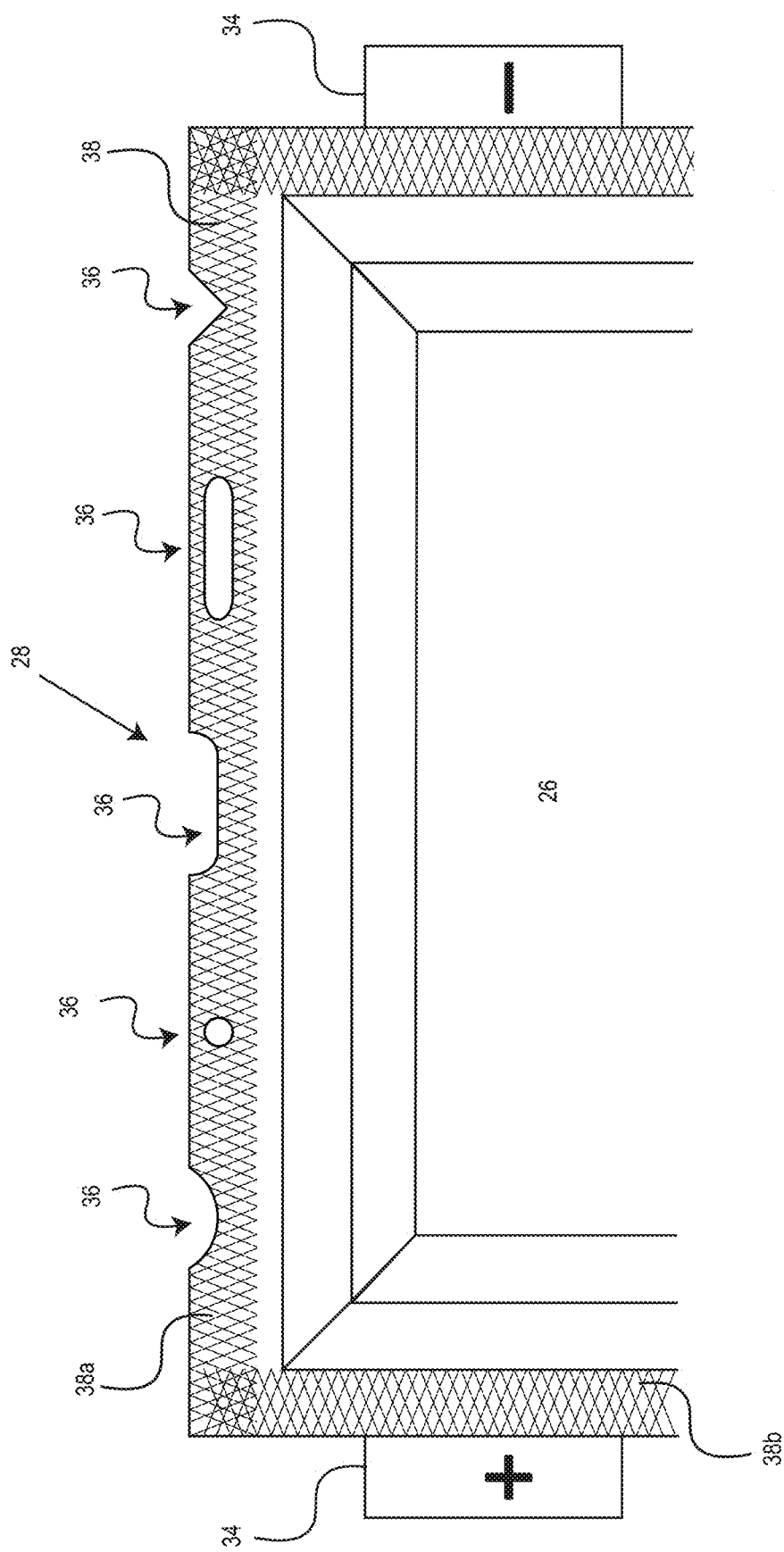
FIG. 4 is an example diagram of a portion of an example pouch cell from FIG. 2.

FIGS. 3 and 4 are example diagrams of an example pouch cell 26 from FIG. 2. As illustrated in FIGS. 3 and 4, an example implementation of a pouch cell 26 may include one or more notches, slots, or holes or other equivalent cutout 36 created in the pouch sealed edge 38. The cutouts 36 may be created as part of a post-cell manufacturing process step. Such a cutout 36 would reduce the effective seal-width so that during an event of excessive cell swelling or gassing, the pouch 28 would likely vent in the location of the cutout 36. Another use for such a feature is to allow for a pin/stake/stud or other locating feature (of known location) to interface with the pouch 28 for purposes of dimensionally locating the cell 26, retaining the cell 26 in an assembly, providing retention or impact absorption during mechanical abuse, controlling the seal-edge shape, or for controlling other mechanical properties.

A long, sealed edge 38*a* of the pouch 28 is usually the weakest section followed by a sealed edge 38*b* holding a terminal tab 34. However, it is difficult to predict the exact location the cell 26 will vent. In addition, it is important that the cell(s) 26 mechanically interface with the battery pack housing 22 and/or other battery pack components.

In an example implementation, notching or creating a hole through the sealed edge 38 will not affect the performance of the pouch cell, but will reduce the effective seal width in that specific location. This may create a weak point which is likely to break first in the event of a venting situation. This may allow the gases to be vented to a predefined location in the battery pack.

Notching or creating holes through the sealed edge 38 may also allow the pouch cells to couple to the battery pack housing or other battery components to mechanically support or locate the cells. This may also allow for any forces or loads to be distributed evenly about the cell. The cutout may be any of a variety of shapes including but not limited to semi-circular, circular, polygonal, elliptical, and semi-elliptical.

Another general aspect is to electrically connect a string of pouch cells in a series-parallel configuration. Yet another general aspect is to mechanically constrain the pouch cells in a battery pack configuration. Yet another general aspect is to assemble and handle a plurality of non-cylindrical cells, for example pouch or prismatic cells, during manufacture of the battery pack.

Figure 5A:
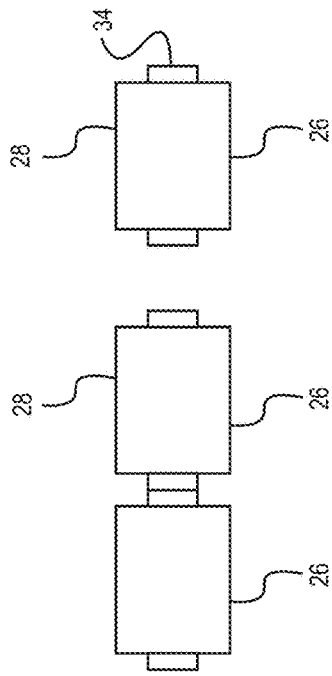
FIG. 5a is an example illustration of a plurality of pouch cells assembled and connected in a string (linear) configuration.
Figure 5B:
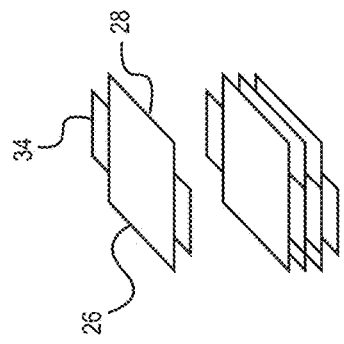
FIG. 5b is an example illustration of a plurality of pouch cells assembled and connected in a stacked configuration.

As illustrated in FIG. 5*a*, the plurality of cells 26 may be assembled and connected in a string (linear) configuration. As illustrated in FIG. 5*b*, the plurality of cells 26 may be assembled and connected in a stacked configuration. Each configuration has its advantages and disadvantages. The string configuration provides for a maximum clearance for tooling that utilizes welding to connect the battery cell tabs 34, accommodates a welding tool in a plane perpendicular to a long axis of the pouch cell 26, is easier to automate assembly; however, it would require a larger assembly fixture and require a complex cell holder configuration. On the other hand, the stacked configuration allows for a simple and small cell holder configuration, is easier for manual assembly, and allows for a compact assembly fixture; however, it may be difficult to have a welding plane perpendicular to the pouch 26 and would allow less room for the welding tooling.

Figure 6A:
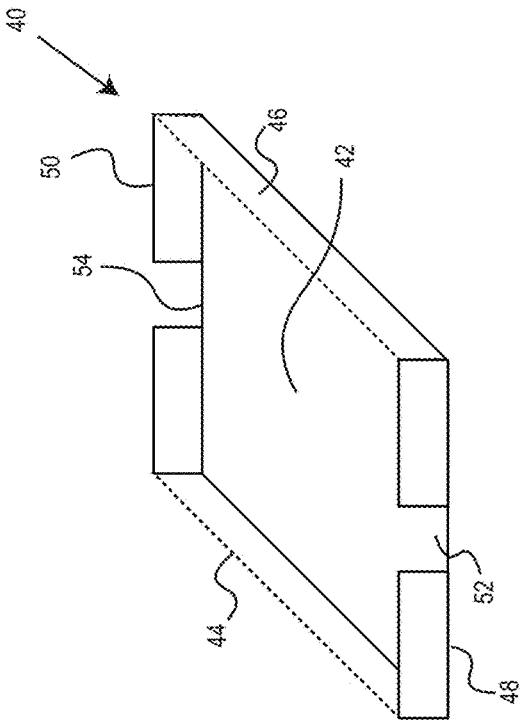
FIG. 6a in an example illustration of a cell holder configured as a cell basket.

FIG. 6*a* in an example illustration of a cell holder configured as a cell basket. In one example implementation of a cell holder, as illustrated in FIG. 6*a*, the cell holder is configured as a cell basket 40 (or simply referred to as a basket 40). The pouch cell 26 may be retained in a cell basket 40. The basket 40 may include a bottom wall 42, a first sidewall 44 and a second sidewall 46. The first and second sidewalls 44, 46 extend perpendicularly from the bottom wall 42. The basket 40 may also include a front wall 48 and a rear wall 50 extending perpendicularly from the bottom wall 42 and perpendicularly to the side walls 44, 46. The front and rear walls 48, 50 may define first and second openings 52, 54 at opposing ends of the bottom wall 42 to accommodate the cell tabs 34. The cell basket 40 provides a flat plane in the form of the bottom wall 42 to which the cell 26 can adhere. However, including a bottom wall 42 increases the pack height. In an alternate implementation, the sidewalls 44, 46 may be eliminated leaving only the bottom wall 42 and the front and rear walls 48, 50. This would reduce the pack width.

Figure 6B:
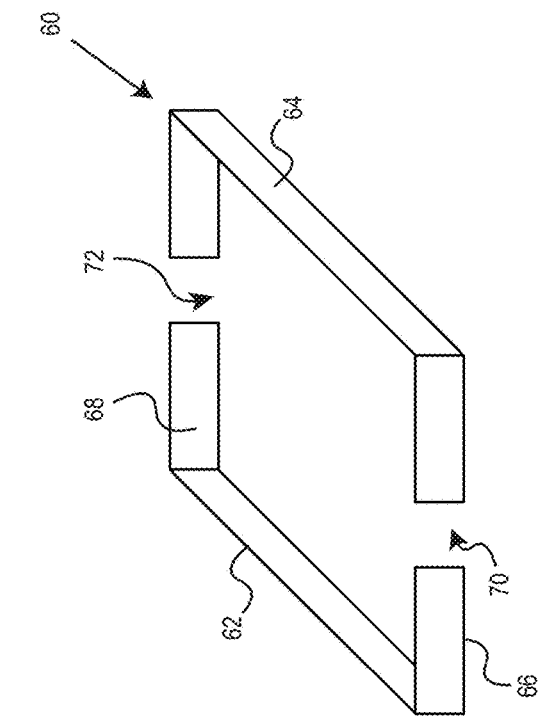
FIG. 6b is an example illustration of a cell holder configured as a cell frame.

FIG. 6*b* is an example illustration of a cell holder configured as a cell frame. In another example implementation of a cell holder, as illustrated in FIG. 6*b*, the cell holder is configured as a cell frame 60, which may simply be referred to as frame 60. The pouch cell 26 may be retained in the cell frame 60. The cell frame 60 includes a first sidewall 62, a second sidewall 64, a front wall 66 and a rear wall 68. The front and rear walls 66, 68 are similar to the front and rear walls 48, 50 of the cell basket 40 described above with respect to FIG. 6*a* and may also define first and second openings 70, 72. The cell frame 60 provides a smaller adhesion area and minimizes pack height but increases pack width. The first and second openings 70, 72 to accommodate the cell tabs 34 from the pouch cell 26.

Figure 7A:
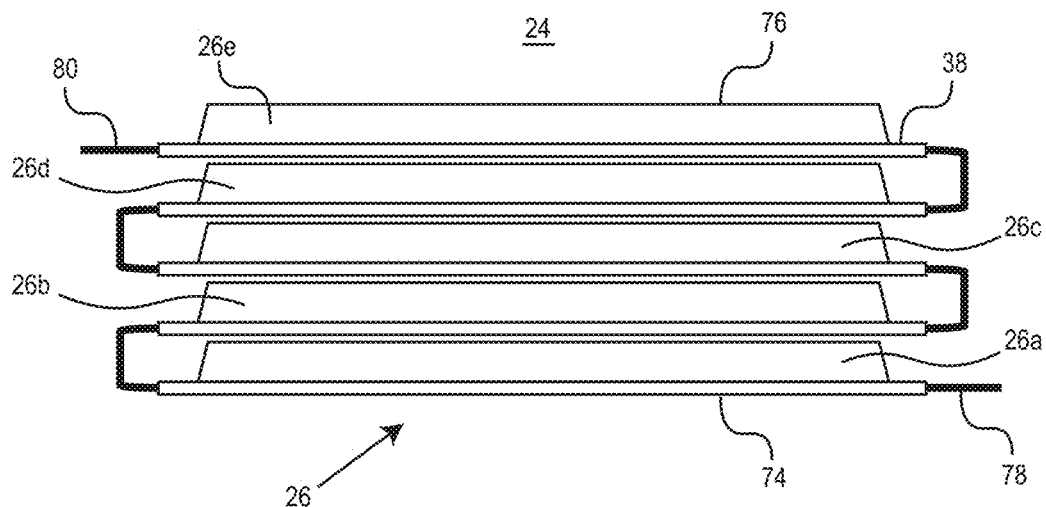
FIG. 7a is an example illustration of a plurality of pouch cells assembled to form a battery with the pouch cells oriented in a common direction.

FIG. 7a is an example illustration of a plurality of pouch cells assembled to form a battery with the pouch cells oriented in a common direction. In an example implementation, as illustrated in FIG. 7a, the pouch cells 26 may be assembled to form a battery 24 with the cells 26 oriented in a common direction. In this implementation, all of the cells 26 are facing in the same direction. In other words, in the illustrated example configuration with five cells, a bottom surface 74 of a first cell 26a is adjacent to a top surface 76 of a second cell 26b, a bottom surface 74 of the second cell 26b is adjacent to a top surface 76 of a third cell 26c, a bottom surface 74 of the third cell 26c is adjacent to a top surface 76 of a fourth cell 26d, and a bottom surface 74 of the fourth cell 26d is adjacent to a top surface 76 of a fifth cell 26e. Furthermore, a negative tab or terminal 78 of the first cell 26a is connected to a positive tab/terminal 80 of the second cell 26b, a negative tab/terminal 78 of the second cell 26b is connected to a positive tab/terminal 80 of the third cell 26c, a negative tab/terminal 78 of the third cell 26c is connected to a positive tab/terminal 80 of the fourth cell 26d and negative tab/terminal 78 of the fourth cell 26d is connected to a positive tab/terminal 80 of the fifth cell 26e. It should be noted that this example implementation includes five cells. However, other contemplated implementations may include more or less cells.

Figure 7B:
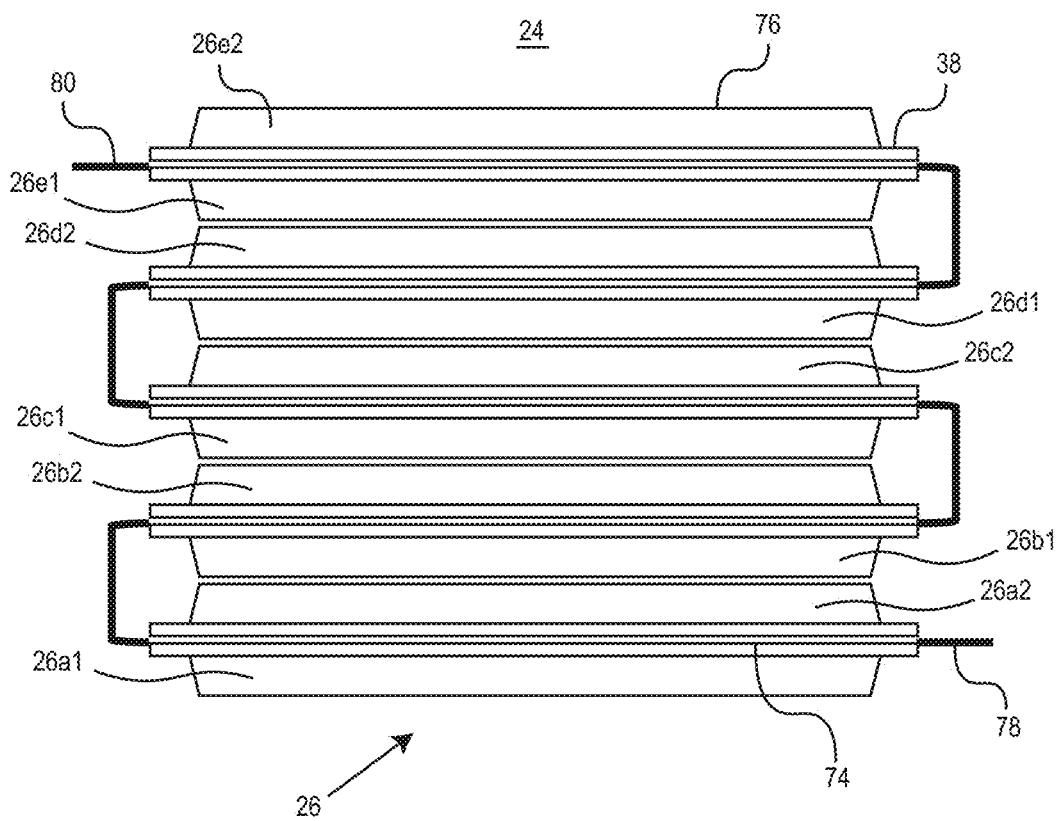
FIG. 7b is an example illustration of a plurality of pouch cells assembled to form a battery with the pouch cells oriented in an alternating direction.
Figure 8A:
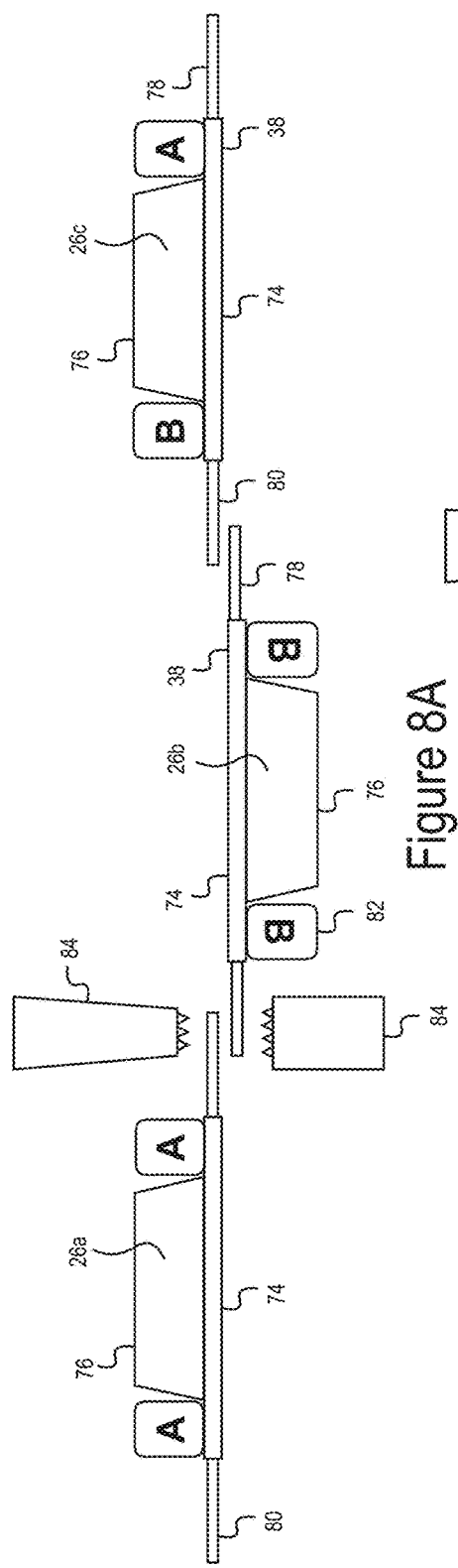
FIGS. 8a-8e is an example illustration of a manufacturing process for assembling a plurality of pouch cells in a string assembly having a common direction configuration.
Figure 8B:
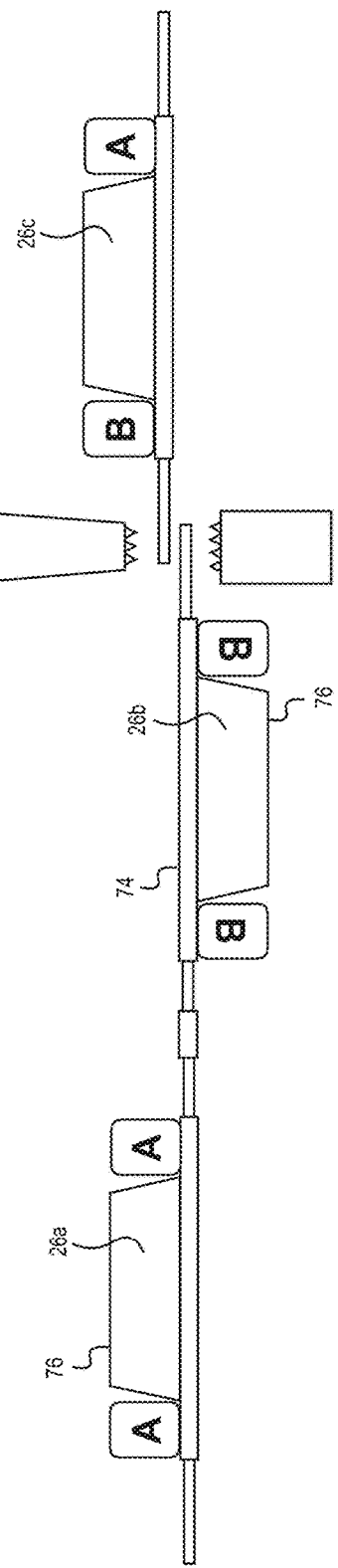
Figure 8C:
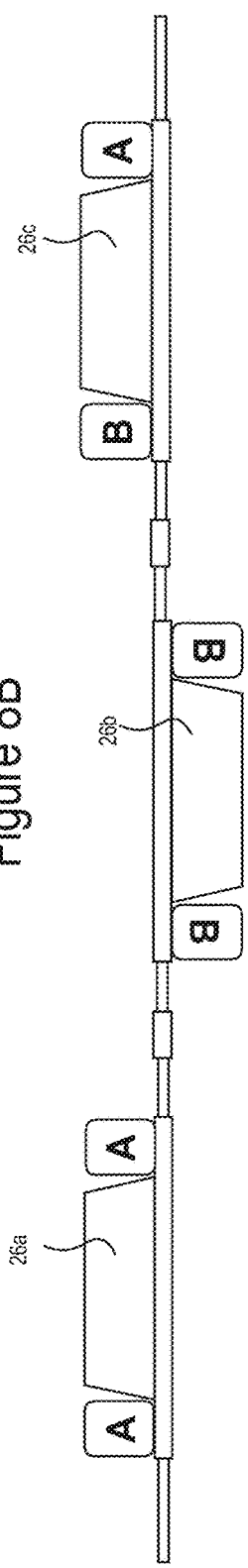
Figure 8D:
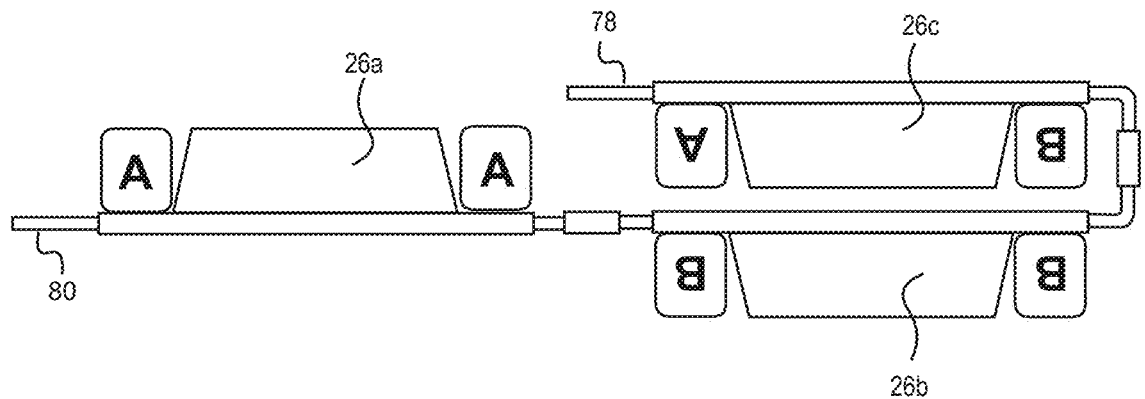
Figure 8E:
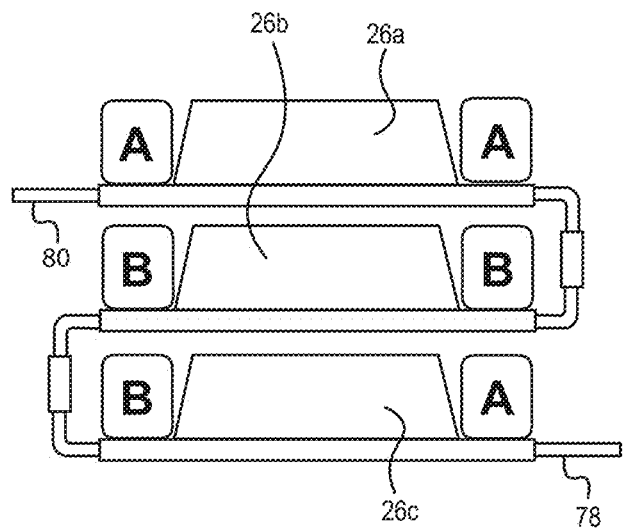
Figure 9C:
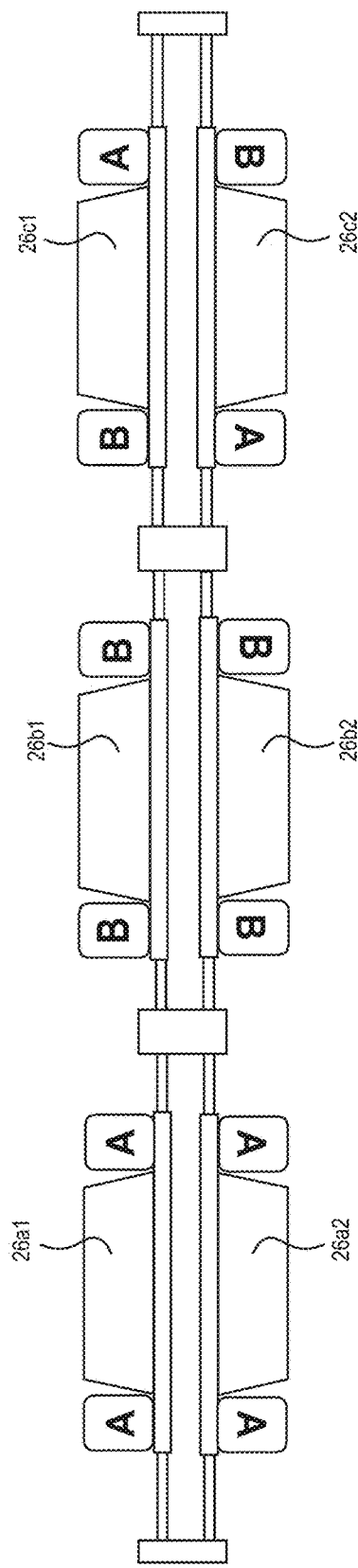
Figure 9D:
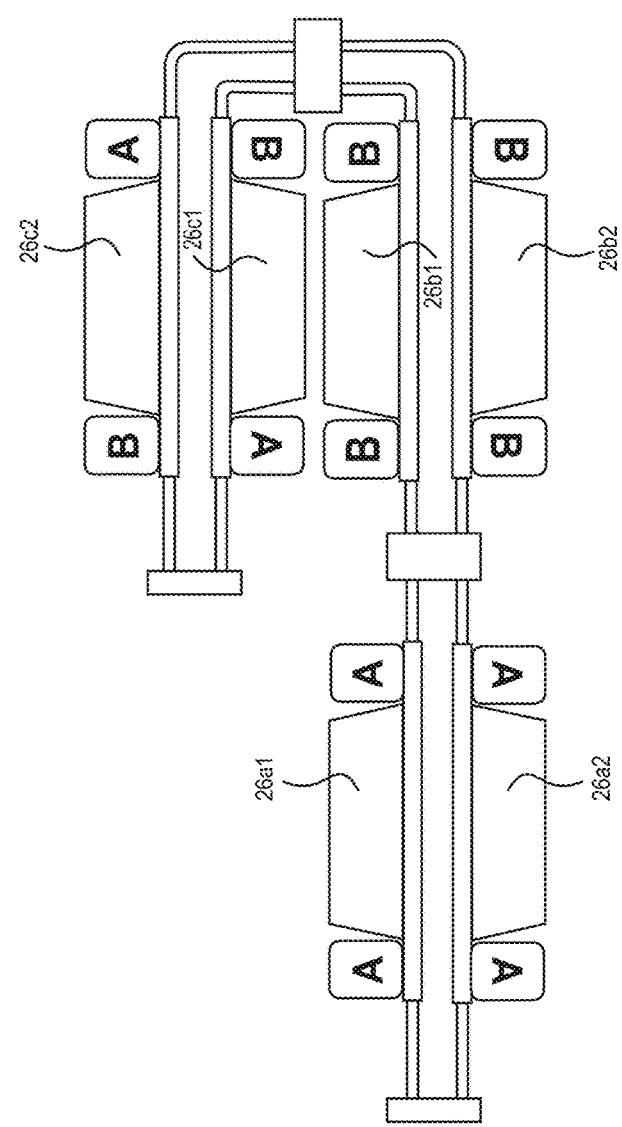
Figure 9E:
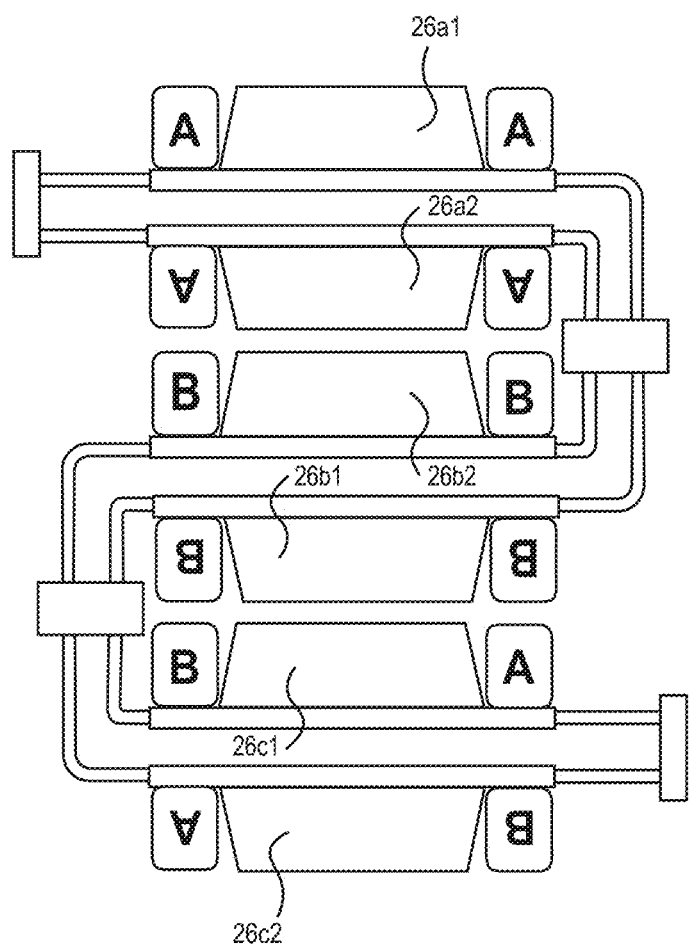
Figure 10A:
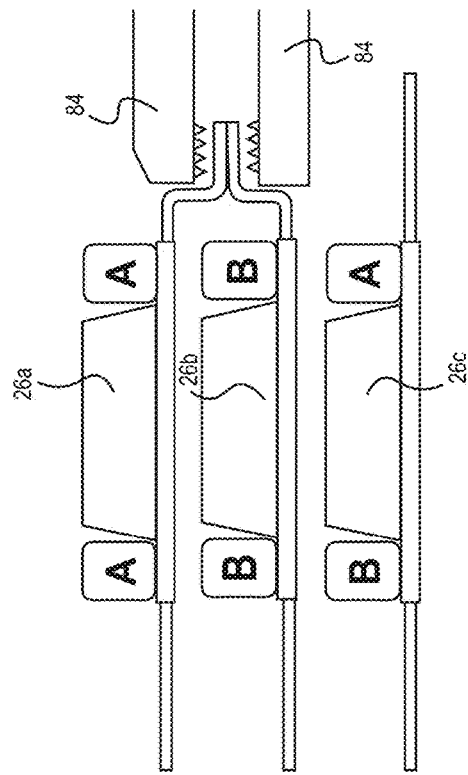
FIGS. 10a-10d is an example illustration of a manufacturing process for assembling a plurality of pouch cells in a stacked assembly having a common direction configuration.
Figure 10B:
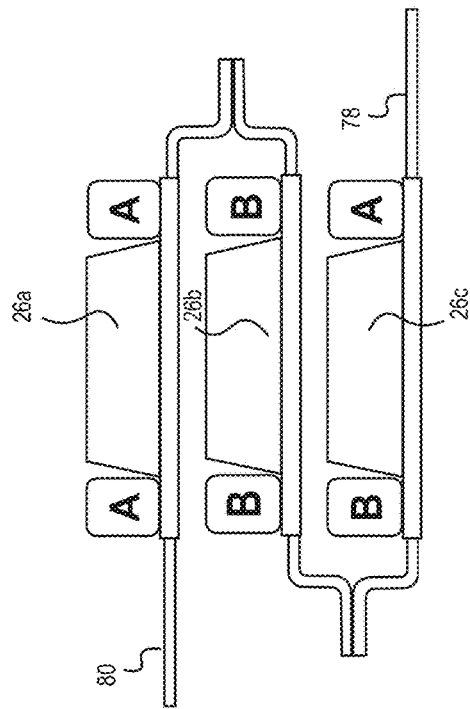
Figure 10C:
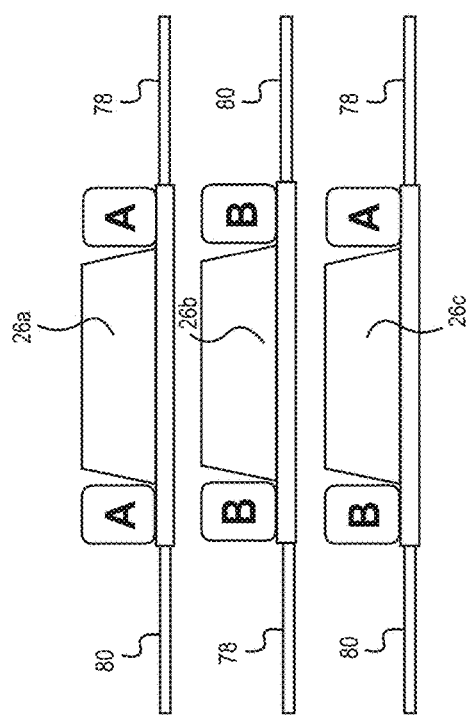
Figure 10D:
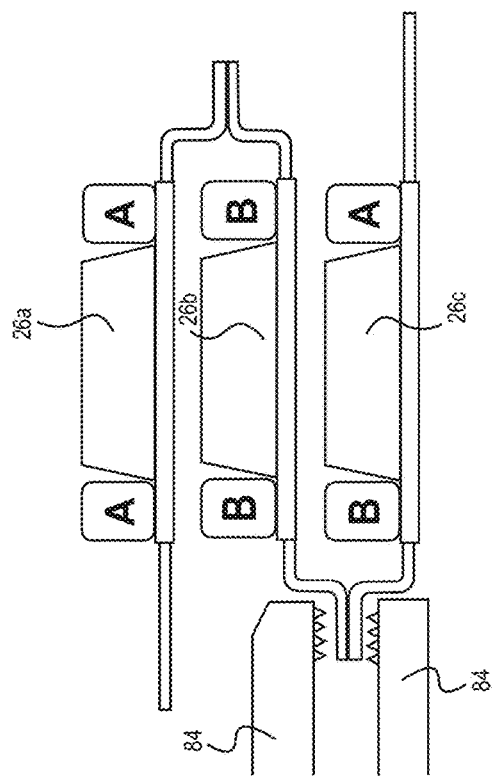
Figure 11B:
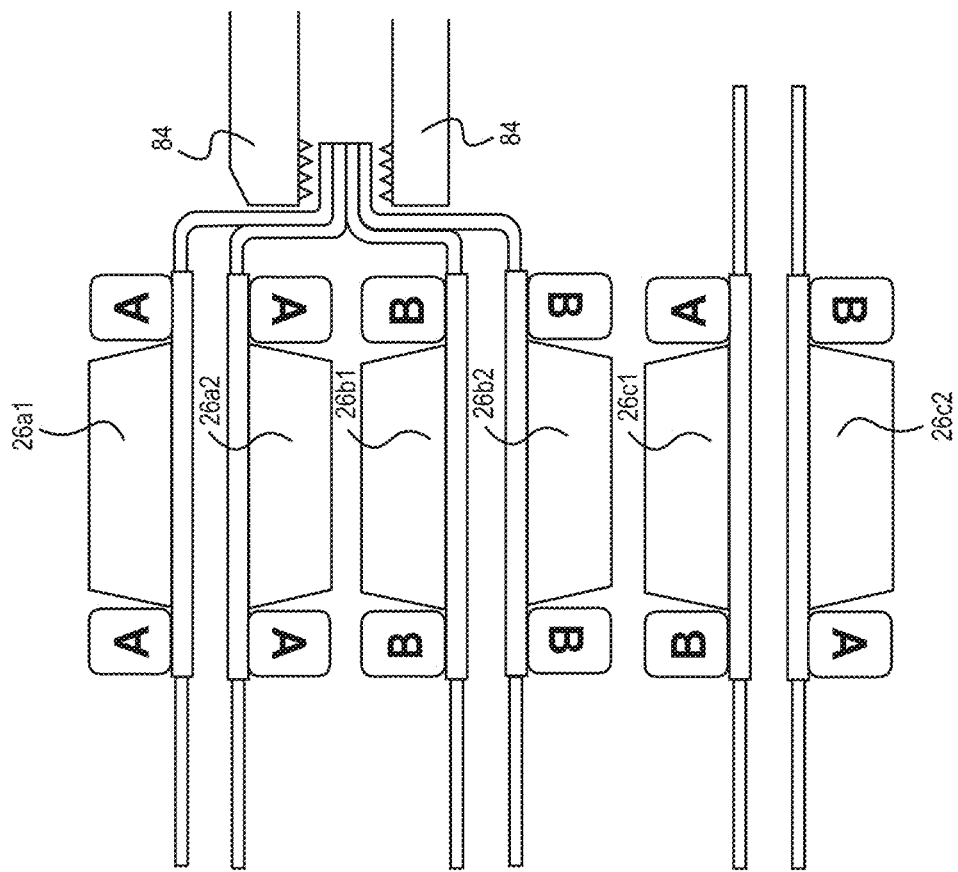
FIGS. 11a-11d is an example illustration of a manufacturing process for assembling a plurality of pouch cells in a stacked assembly having an alternating direction configuration.
Figure 11A:
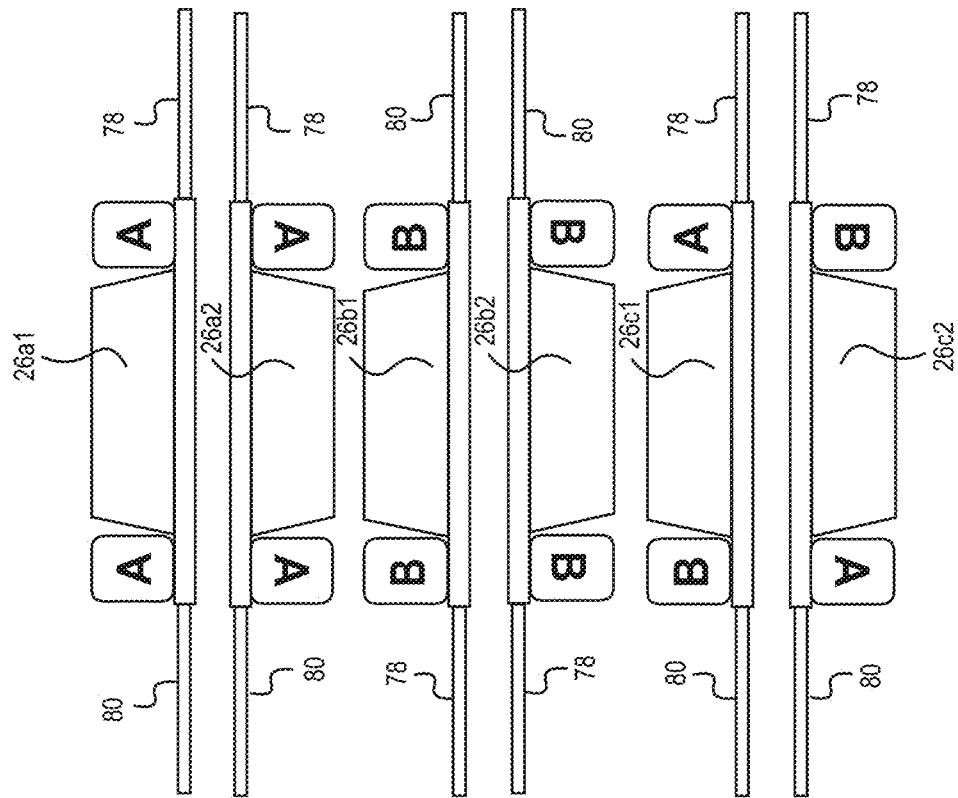
Figure 11D:
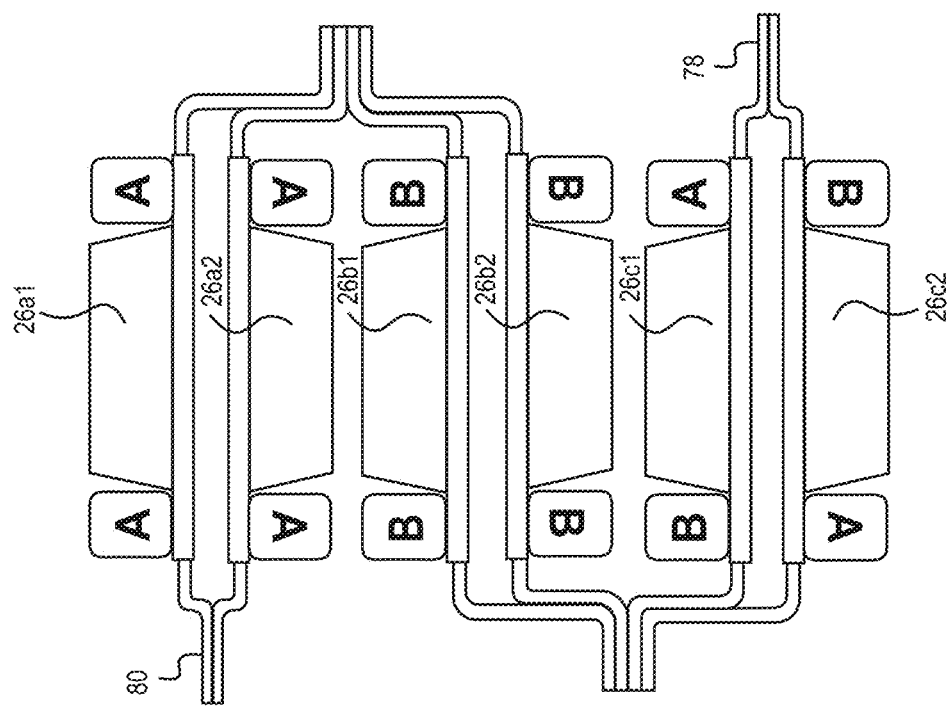
Figure 11C:
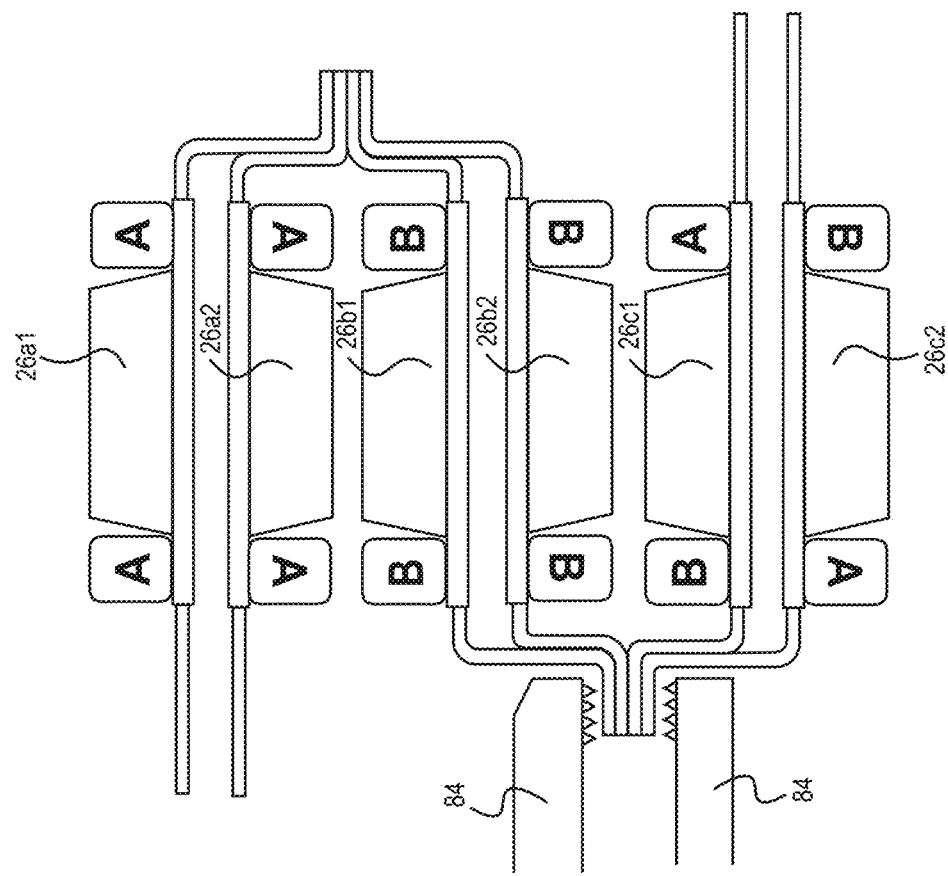

FIG. 7b is an example illustration of a plurality of pouch cells assembled to form a battery with the pouch cells oriented in an alternating direction. In another example implementation, as illustrated in FIG. 7b, the pouch cells 26 may be assembled to form a battery 24 with the cells 26 oriented in an alternating direction. In this implementation, pairs of cells 26 are positioned back-to-back such that alternating cells 26 are facing in opposite directions in order to keep parallel tabs together when adjacent. In other words, in a configuration with ten cells 26, a bottom surface 74 of a first cell 26a1 is adjacent to a bottom surface 74 of a second cell 26a2, a top surface 76 of the second cell 26a2 is adjacent to a top surface 76 of a third cell 26b1, a bottom surface 74 of the third cell 26b1 is adjacent to a bottom surface 74 of a fourth cell 26b2, a top surface 76 of the fourth cell 26b2 is adjacent to a top surface 76 of a fifth cell 26c1, a bottom surface 74 of the fifth cell 26c1 is adjacent to a bottom surface 74 of a sixth cell 26c2, a top surface 76 of the sixth cell 26c2 is adjacent to a top surface 76 of a seventh cell 26d1, a bottom surface 74 of the seventh cell 26d1 is adjacent to a bottom surface 74 of an eighth cell 26d2, a top surface 76 of the eighth cell 26d2 is adjacent to a top surface 76 of a ninth cell 26e1 and a bottom surface 74 of the ninth cell 26e1 is adjacent to a bottom surface 74 of a tenth cell 26e2. In this implementation, the first and second cells 26a1, 26a2 are connected in parallel, the third and fourth cells 26b1, 26b2 are connected in parallel, the fifth and sixth cells 26c1, 26c2 are connected in parallel, the seventh and eighth cells 26d1, 26d2 are connected in parallel and the ninth and tenth cells 26e1, 26e2 are connected in parallel. Furthermore, the first/second cells 26a1, 26a2 are connected in series with the third/fourth cells 26b1, 26b2 which are connected in series with the fifth/sixth cells 26c1, 26c2 which are connected in series with the seventh/eighth cells 26d1, 26d2 which are connected in series with the ninth/tenth cells 26e1, 26e2. It should be noted that this example implementation includes ten cells. However, other contemplated implementations may include more or less cells.

As such, the battery 24 could either be a string assembly configuration or a stack assembly configuration. Furthermore, both the string assembly configuration and the stack assembly configuration could be implemented using a basket 40 configuration or a frame 60 configuration.

FIGS. 8a-8e illustrate an example manufacturing process for assembling a plurality of pouch cells in a string assembly/common direction configuration. In a first step, illustrated in FIG. 8a, a plurality of the pouch cells 26 are positioned in a line, where a first cell 26a is positioned with the top surface 76 facing up and with the positive tab 80 to the left and the negative tab 78 to the right, a second cell 26b is positioned with the top surface 76 facing down and with the positive tab 80 to the left and the negative tab 78 to the right and a third cell 26c is positioned with the top surface 76 facing up and the positive tab 80 to the left and the negative tab 78 to the right. The battery may have more or less cells. The battery may also include a bending element 82 that will be described in more detail below. This configuration provides a weld zone that is open and easily accessible by a welding device 84 such as an ultrasonic welding device, a resistive welding device or other welding or coupling devices. While a gantry-type welding device 84 is illustrated other types of welding devices, such as a jaw-type welding device that slides in and out of the weld zone or other types may be used. In a second step, illustrated in FIG. 8b, the welding device 84 welds the negative tab 78 of the first cell 26a to the positive tab 80 of the second cell 26b. In a third step, illustrated in FIG. 8c, the welding device 84 welds the negative tab 78 of the second cell 26b to the positive tab 80 of the third cell 26c. In a fourth step, illustrated in FIG. 8d, the third cell 26c is folded over the second cell 26b. In a fifth step, illustrated in FIG. 8e, the second and third cells 26b, 26c are folded under the first cell 26a. Other folding methods are contemplated.

FIGS. 9a-9e illustrate an example manufacturing process for assembling a plurality of pouch cells in a string assembly/alternating direction configuration. In a first step, illustrated in FIG. 9a, a plurality of sets of pouch cells 26 are positioned in a line, where each set has two pouch cells 26x1, 26x2 positioned bottom-to-bottom. In all other respects, the assembly process is the same as the process described above with respect to the common direction configuration. When this configuration is complete, there will be three sets of cells connected in series with each set having two cells that are connected in parallel.

FIGS. 10a-10d illustrate an example manufacturing process for assembling a plurality of pouch cells in a stacked assembly having a common direction configuration. In a first step, illustrated in FIG. 10a, a plurality of the pouch cells 26 are positioned in a stack. In this example implementation, the positive tab 80 of the first cell 26a is to the left and the negative tab 78 of the first cell 26a is to the right, the positive tab 80 of the second cell 26b is to the right and the negative tab 78 of the second cell 26b is to the left and the positive tab 80 of the third cell 26c is to the left and the negative tab 78 of the third cell 26c is to the right. In a second step, illustrated in FIG. 10b, a jaw-type welding device 84 welds the negative tab 78 of the first cell 26a to the positive tab 80 of the second cell 26b. In a third step, illustrated in FIG. 10c, the welding device 84 welds the negative tab 78 of the second cell 26b to the positive tab 80 of the third cell 26c.

FIGS. 11a-11d illustrate an example manufacturing process for assembling a plurality of pouch cells in a stacked assembly having an alternating direction configuration. In a first step, illustrated in FIG. 11a, a plurality of sets of pouch cells 26 are positioned in a stack, wherein each set has two pouch cells 26x1, 26x2 positioned bottom-to-bottom, similar to the alternating direction configuration described above. In all other respects, the assembly process is the same as the process described above with respect to the common direction configuration. When this configuration is complete, there will be three sets of cells connected in series with each set having two cells that are connected in parallel.

Figure 12:
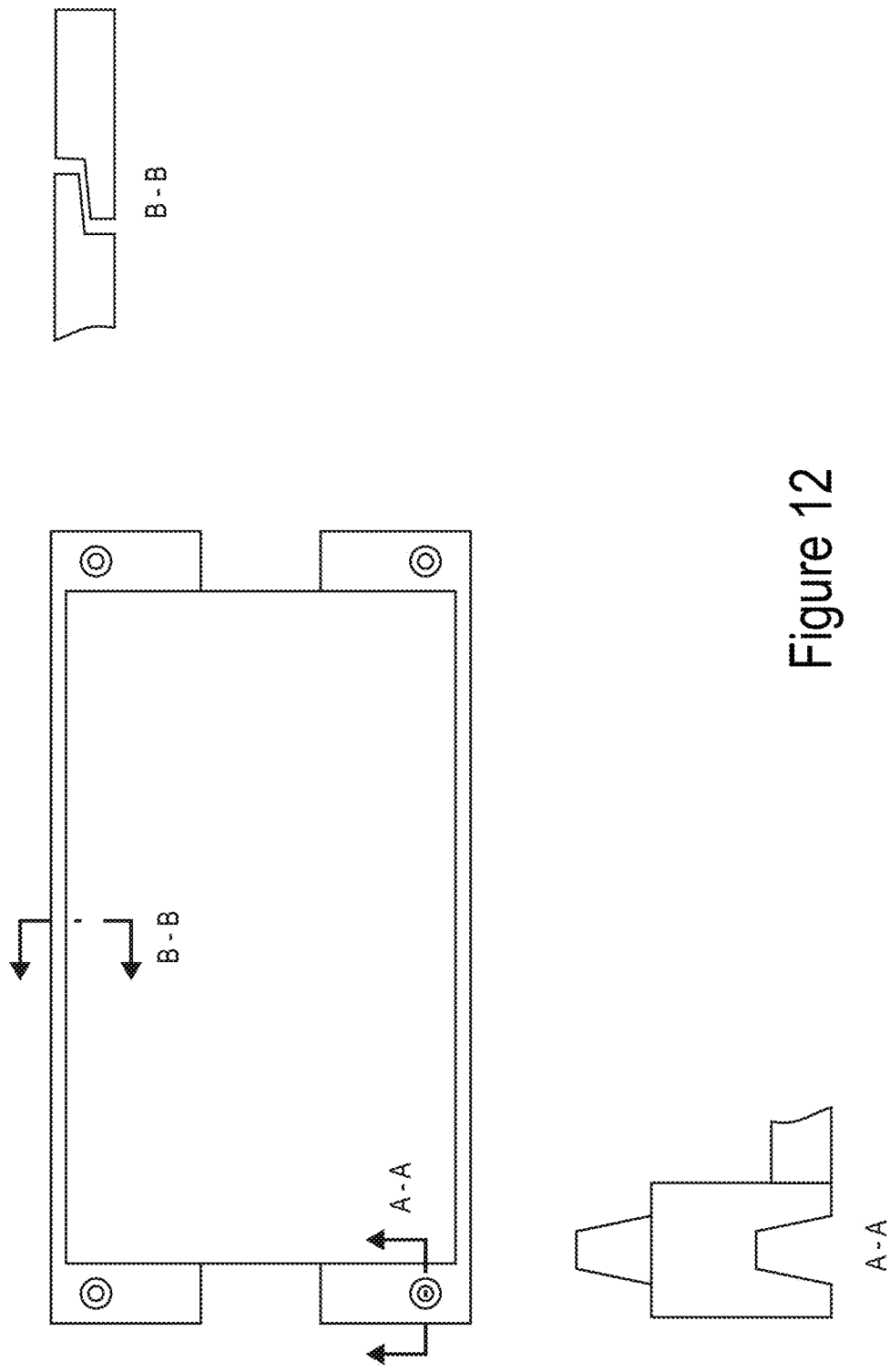
FIG. 12 is an example illustration of a cross-section view of an example cell holder interlocking for a pouch cell in a stacked assembly.

FIG. 12 is an example illustration of a cross-section view of an example cell holder interlocking for a pouch cell in a stacked assembly. Section A-A shows a post-n-hole method plastic end-features. Section B-B shows a lap joint method for thin walls along the cell length. The lap join may have sections of inversed orientation so locking is bi-directional.

Figure 13:
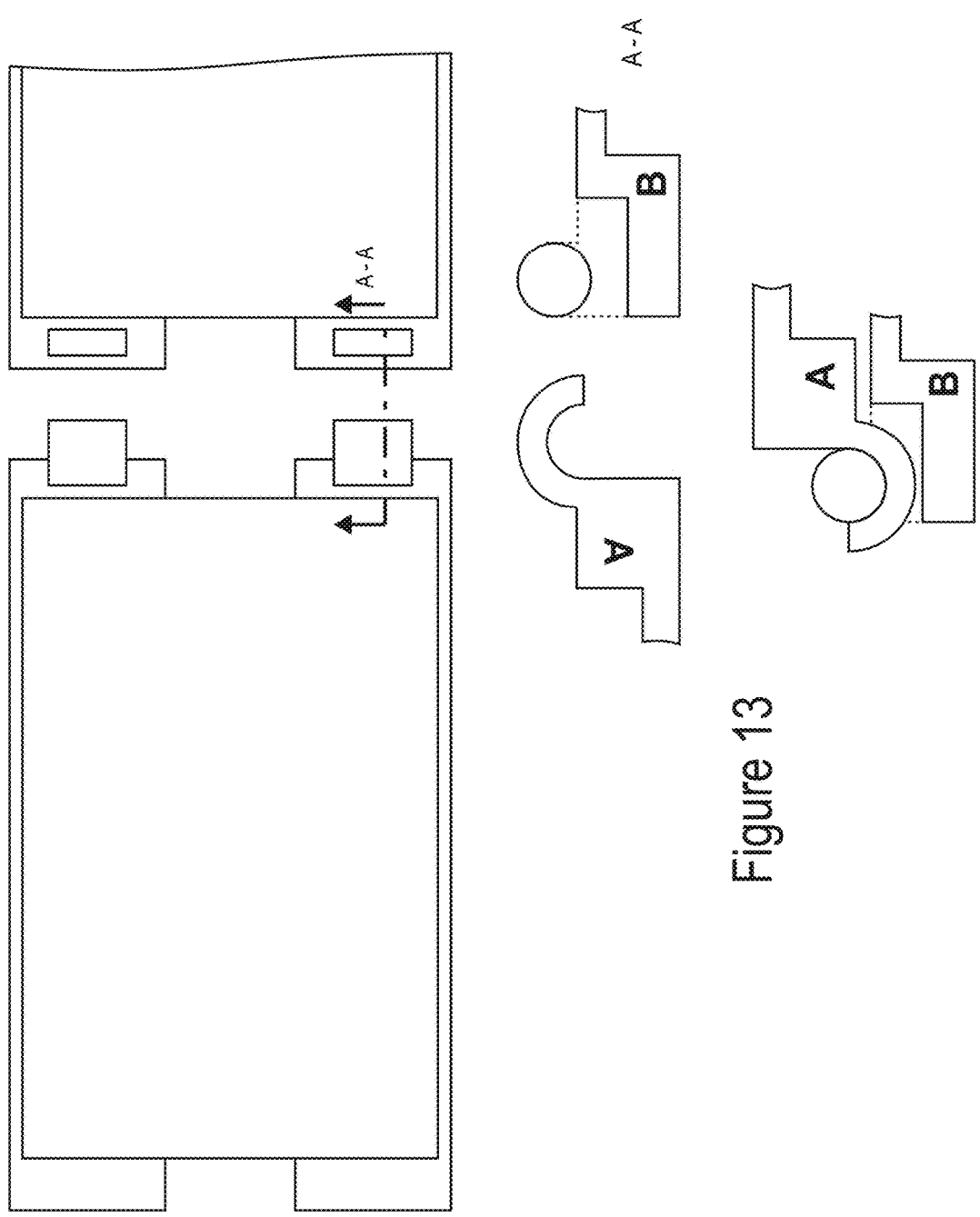
FIG. 13 is an example illustration of a cross-section view of an example cell holder interlocking for a pouch cell in a string assembly.

FIG. 13 is an example illustration of a cross-section view of an example cell holder interlocking for a pouch cell in a string assembly. Section A-A shows a captive hinge interlocking method. In this example, intermediate-stack cell holders are common among the cell holders with the bottom and top being unique.

Figure 14:
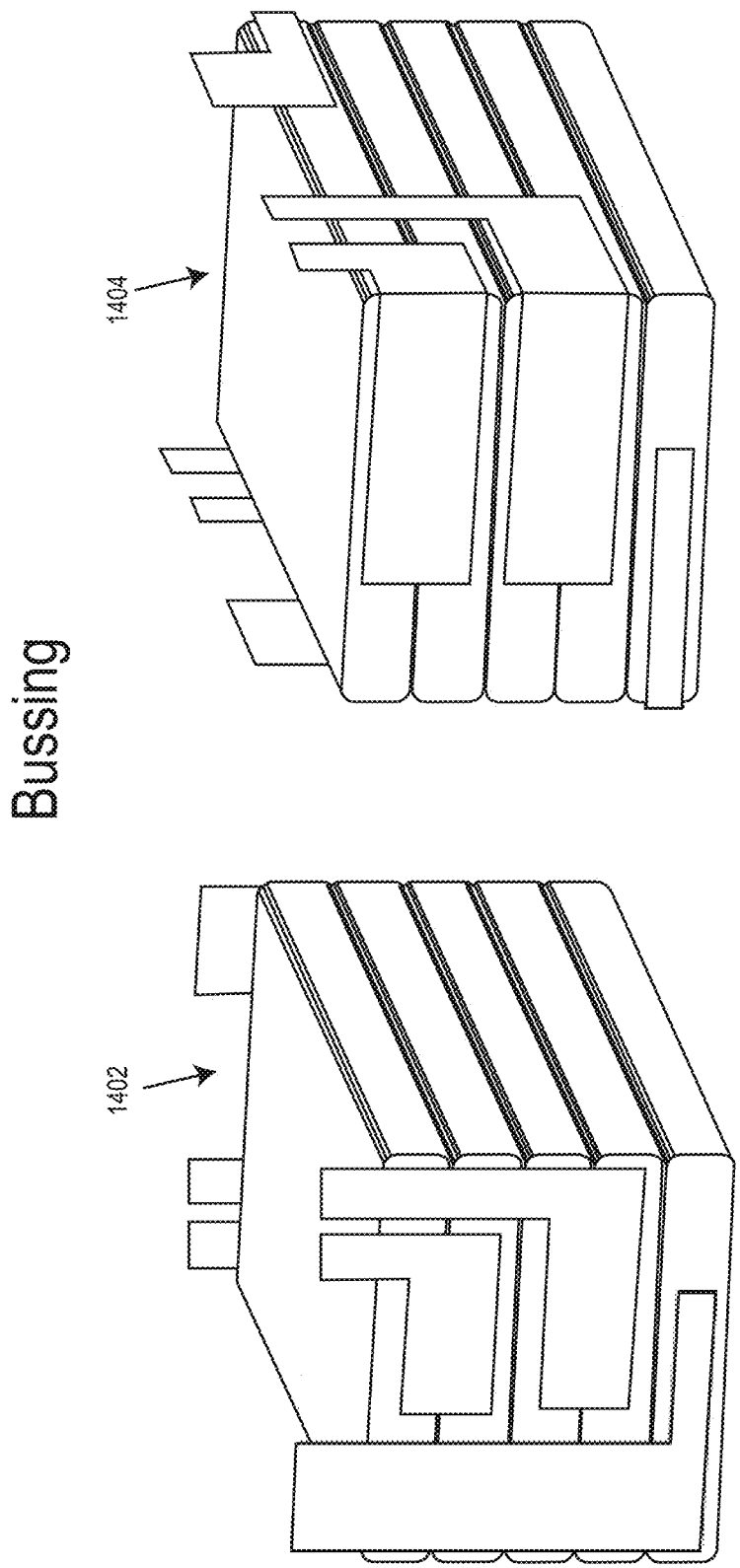
FIG. 14 is an example illustration of example methods for connecting pouch cells using busses.

FIG. 14 is an example illustration of example methods for connecting pouch cells using busses. In the example pouch cell configuration 1402, bussing is wrapped up the pack sides to electrically connect pouch cells. This bussing arrangement may be used for a 5s1p string assembly method but may be difficult for a 5s2p string assembly method. The bussing shown in the pouch cell configuration 1402 may be used for a stack assembly method.

In the example pouch cell configuration 1404, bussing is wrapped up the pack sides to electrically connect pouch cells. This bussing arrangement may be used for both a 5s1p or a 5s2p string assembly method. The bussing shown in the pouch cell configuration 1404 may be used for a stack assembly method.

Figure 15:
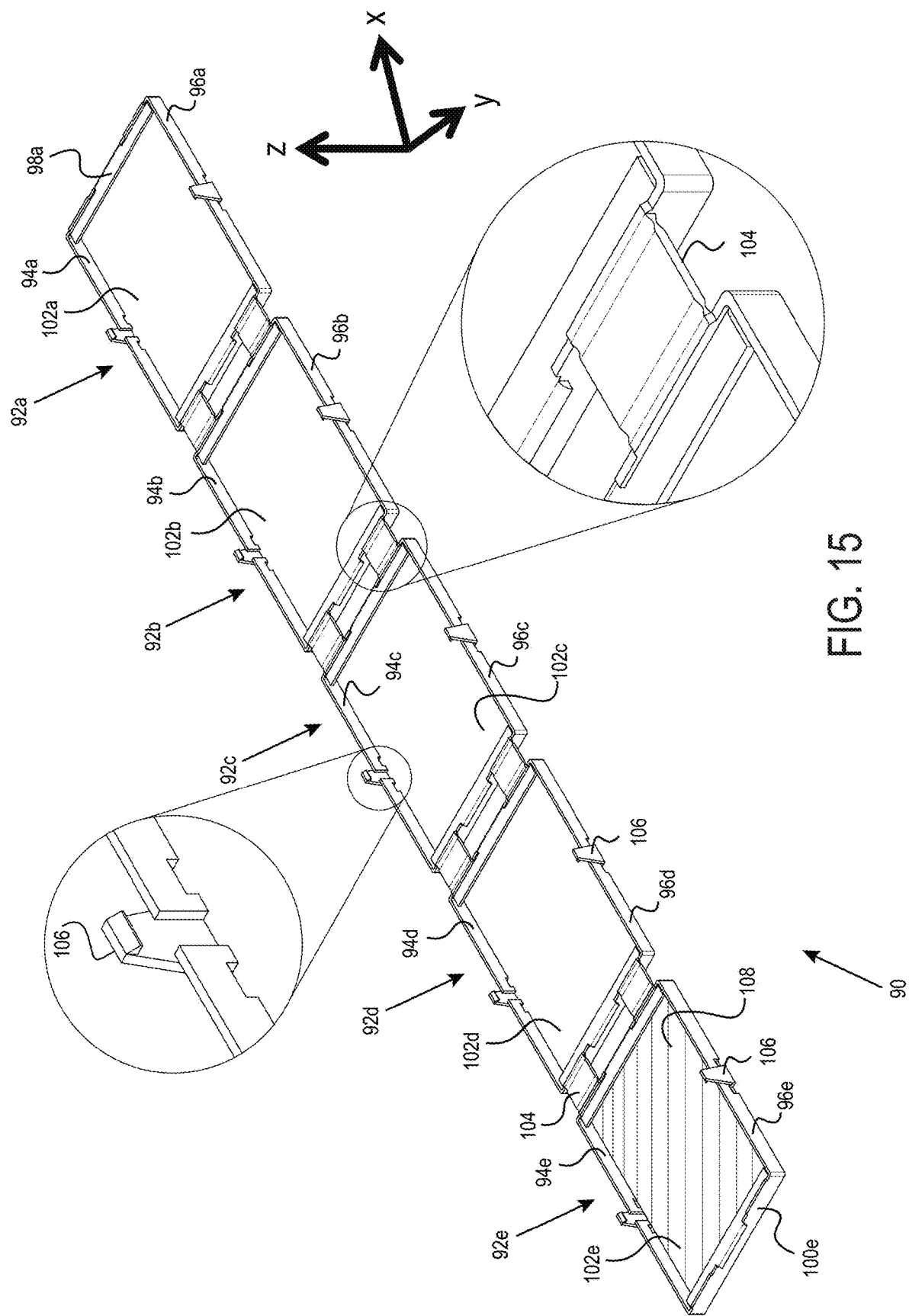
FIG. 15 is an example illustration of an example cell holder for pouch cells arranged in a string assembly configuration including an exploded view of a living hinge and an exploded view of a male snap element.
Figure 16:
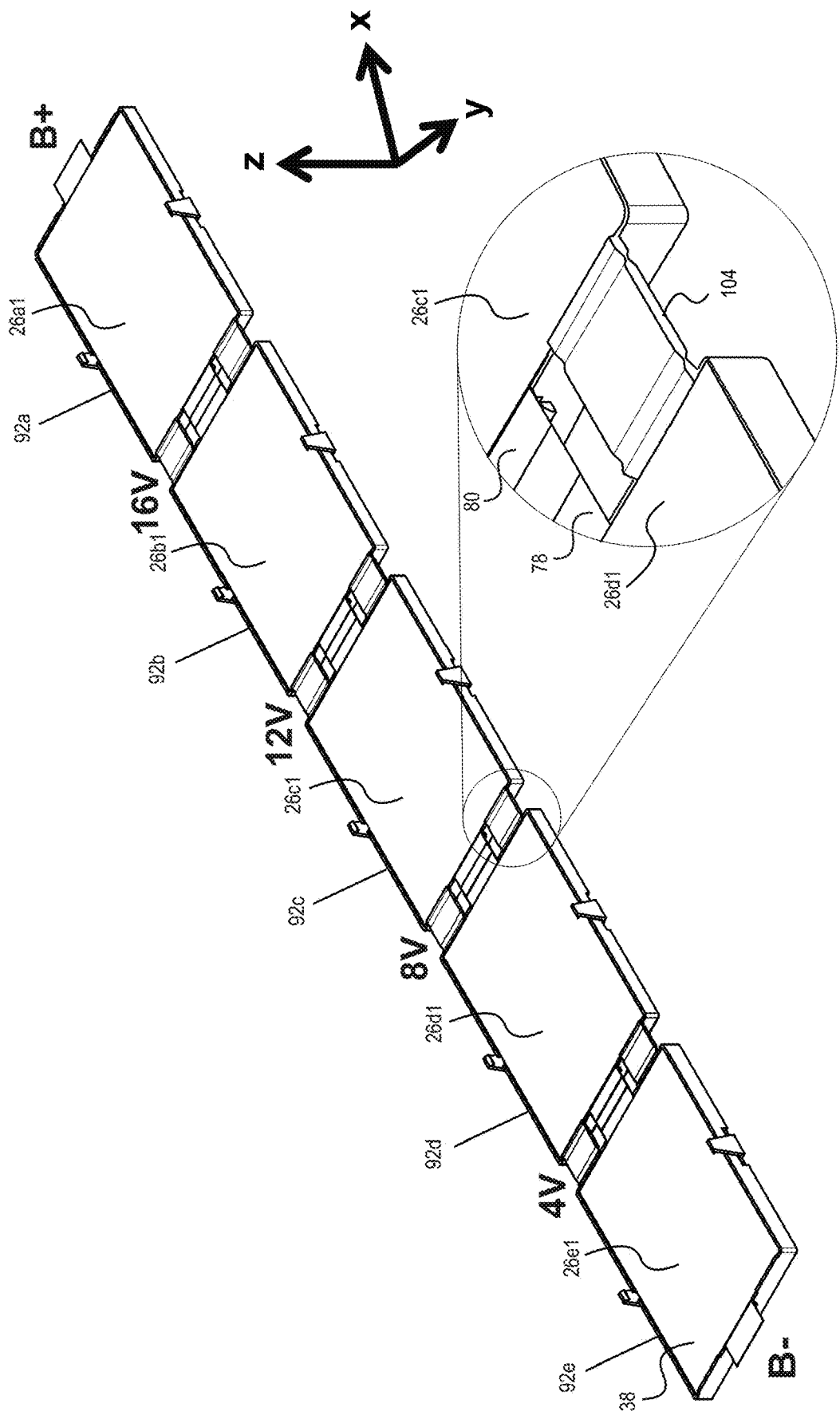
FIG. 16 is an example illustration of the cell holder of FIG. 15 with a set of first pouch cells inserted into the cell holder including an exploded view of a living hinge.
Figure 17:
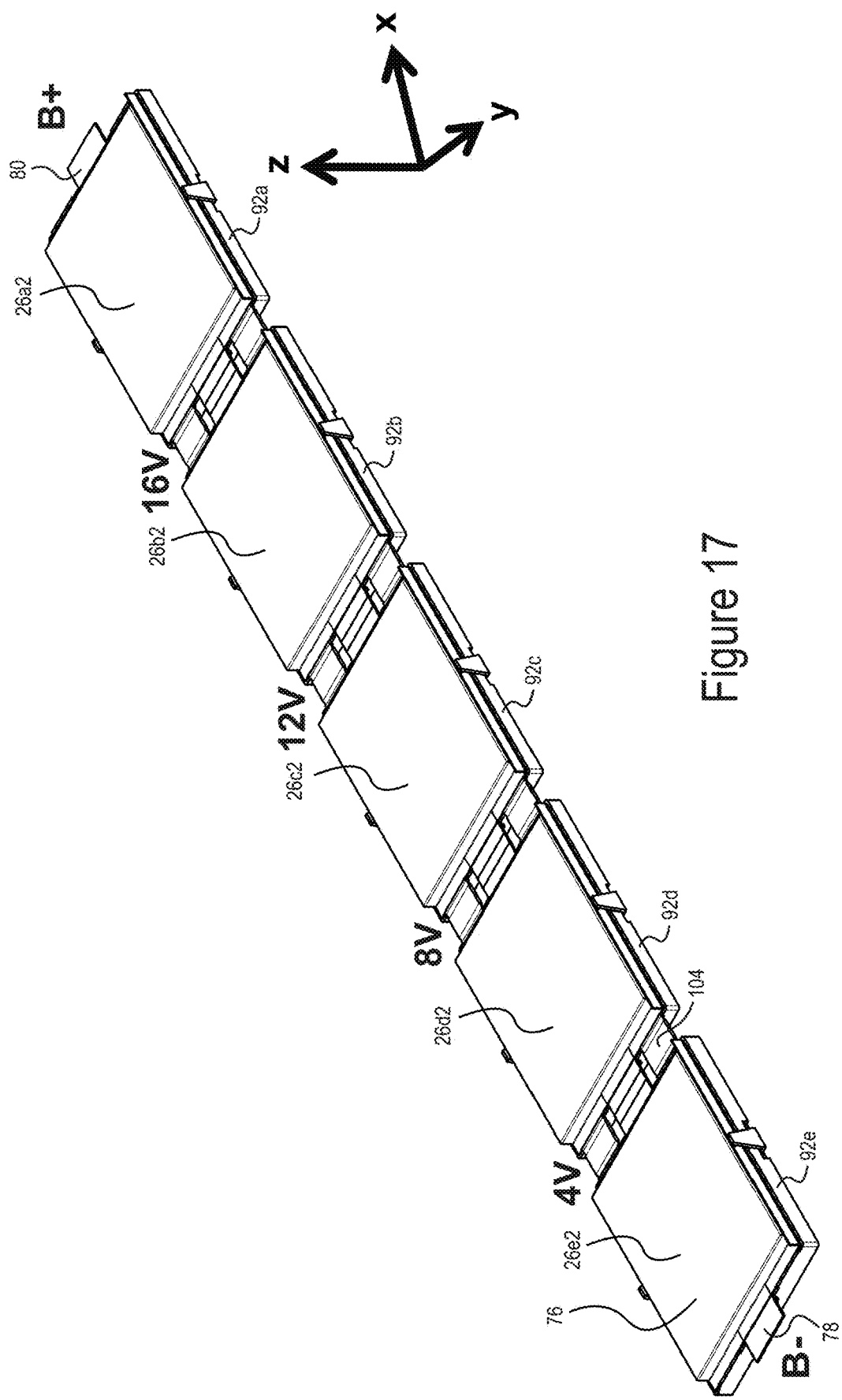
FIG. 17 is an example illustration of the cell holder of FIG. 15 with a set of second pouch cells inserted into the cell holder.
Figure 18:
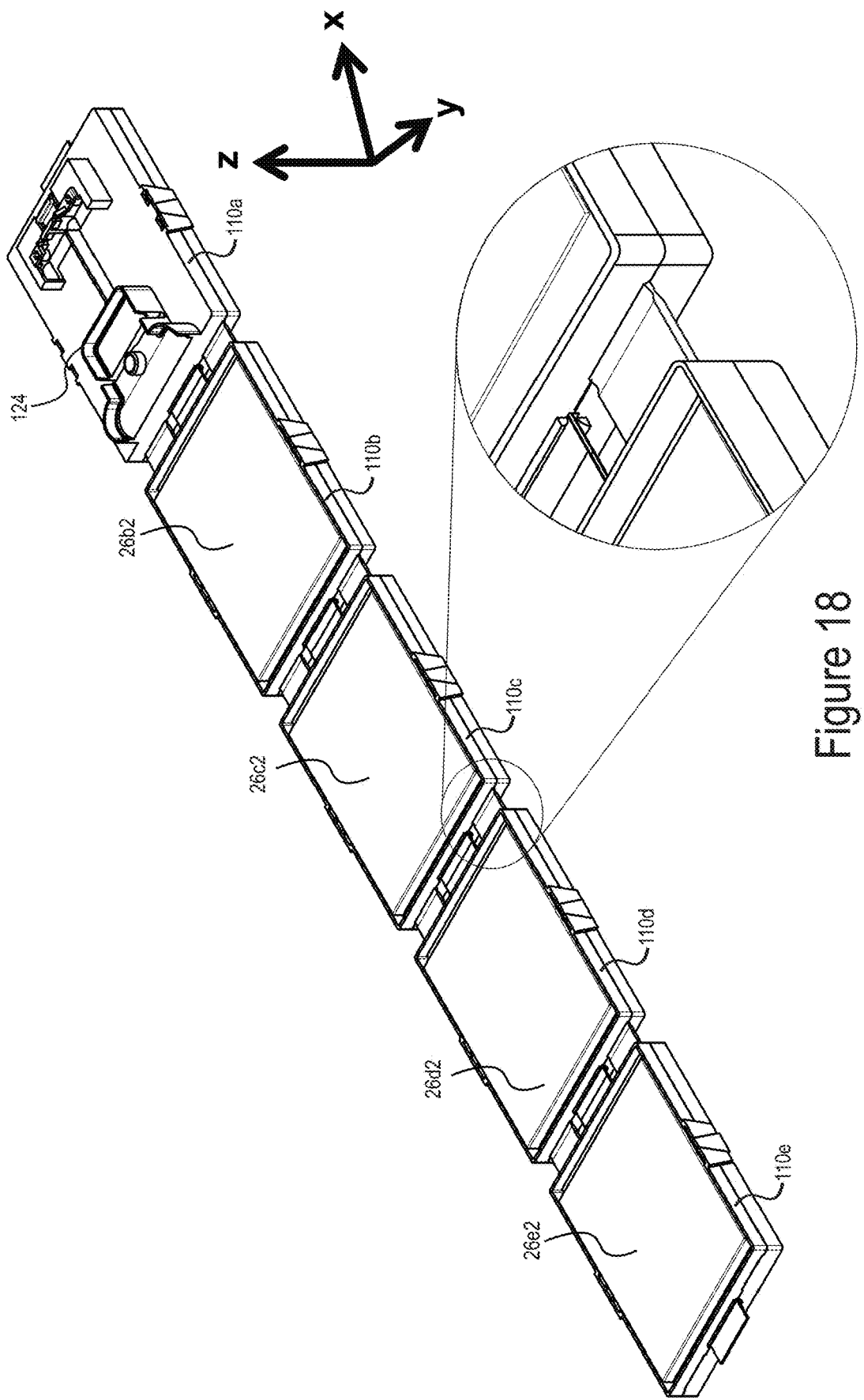
FIG. 18 is an example illustration of the cell holder of FIG. 15 having a plurality of top frames including a top frame cap and including an exploded view of a living hinge.
Figure 19:
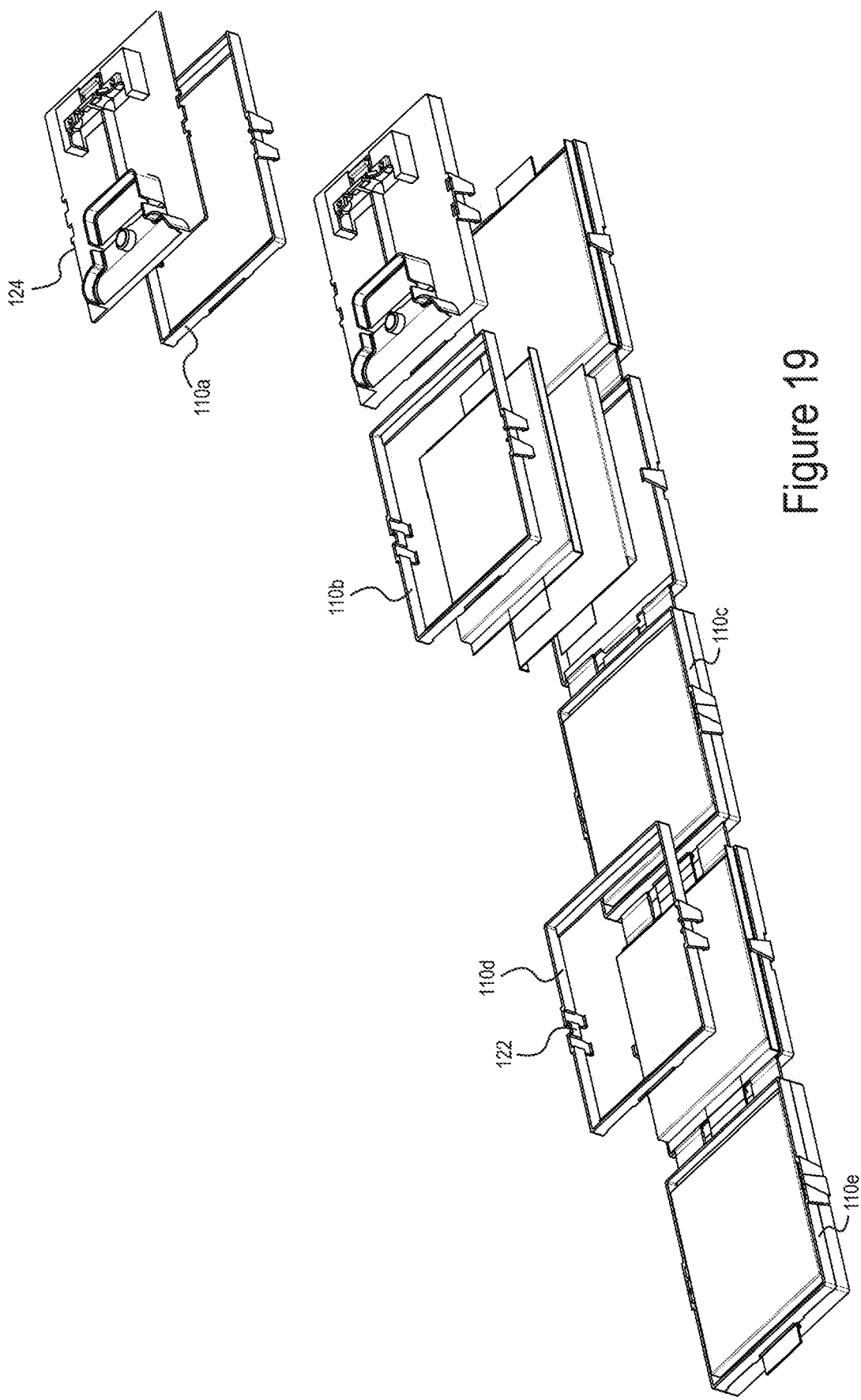
FIG. 19 is an example illustration of the cell holder of FIG. 15 and the method for assembling the top frames.

Another general aspect is a cell holder for a battery including a plurality of pouch battery cells in a string assembly configuration. In one example implementation of the cell holder 90, illustrated in FIGS. 15-27, the holder 90 comprises a set of bottom frames 92. FIGS. 15-27 illustrate an example for assembling the battery including the plurality of pouch battery cells in the string assembly configuration. FIG. 15 illustrates an example cell holder for pouch cells arranged in a string assembly configuration including an exploded view of a living hinge and an exploded view of a male snap element. FIG. 16 illustrates the cell holder of FIG. 15 with a set of first pouch cells inserted into the cell holder including an exploded view of a living hinge. FIG. 17 illustrates the cell holder of FIG. 15 with a set of second pouch cells inserted into the cell holder. FIG. 18 illustrates the cell holder of FIG. 15 having a plurality of top frames including a top frame cap and including an exploded view of a living hinge. FIG. 19 illustrates the cell holder of FIG. 15 and the method for assembling the top frames.

In FIG. 15, the set of bottom frames 92 will include a number of frames 92 equal to a number of sets of battery cells 26. In the illustrated example implementation, the battery 24 includes five sets of battery cells 26 and, as such, the holder 90 includes five bottom frames 92 in the set of bottom frames. In alternate implementations, the battery 26 may include more or less sets of battery cells 26. Each set of battery cells 26 may include one or more cells 26.

There is a lead—exterior—frame 92a and a trailing—exterior—frame 92e and a plurality of intermediate—interior—frames 92b, 92c, 92d. Each bottom frame 92 includes a first sidewall 94 and a second sidewall 96 and a leading/front wall 98 and a trailing/rear wall 100. The first sidewall, second sidewall, leading wall and trailing wall form a generally rectangular perimeter wall defining a cavity 102.

The walls are sized to create the cavity 102 that is configured to receive a pouch cell 26—top surface 76 down—such that the perimeter seal edge 38 of the cell 26 rests on and is supported by the walls 94, 96, 98, 100. The plurality of bottom frames 92 is aligned in a linear fashion.

The frames 92 may be connected to each other with a pair of living hinges 104. The leading frame 92a and the trailing frame 92e include only one pair of living hinges 104 connecting them to an interior frame 92b, 92d, respectively. The interior frames 92b, 92c, 92d include two pairs of living hinges 104 connecting them to either another interior frame 92 or an exterior frame 92a, 92e—depending upon the location of the frame 92 in the line of frames 92. In an example implementation, the plurality of frames 92 may be made of a single piece, injection molded plastic part. Each frame 92 also includes a pair of male snap elements 106, one snap element 106 on each of the first and second side walls 94, 96, that will be described in more detail below. In an alternate implementation, the trailing frame 92e may include a bottom wall 108.

FIG. 18 illustrates the cell holder of FIG. 15 having a plurality of top frames. Referring to FIG. 18, the cell holder 90 also comprises a set of a plurality of top frames 110. The number of top frames 110 is equal to the number of bottom frames 92. Each top frame 110 may be a single injection molded plastic part. Also referring to FIG. 20, each top frame 110 comprises a first sidewall 112 and a second sidewall 114, a leading/front wall 116 and a trailing/rear wall 118. The first sidewall, the second sidewall, the leading wall and the trailing wall form a generally rectangular perimeter wall defining a cavity 120. The walls 112, 114, 116, 118 are sized to create the cavity 120 that is configured to receive a pouch cell 26—top surface 76 up—such that the walls of the top frame 110 rests on and is supported by the seal edge 38 of the cell 26. The cavity 120 defined by the top frame side walls 112, 114, 116, 118 has approximately the same dimensions in the X and Y directions as the cavity 102 defined by the bottom frame side walls 94, 96, 98, 100. Each top frame 110 also includes a pair of female snap elements 122, one snap element 122 on each of the first and second side walls 112, 114 and positioned to engage with the male snap elements 106, as described in more detail below. The cell holder 90 may also include a top frame cap 124 that couples to the top frame 110 that is connected to the leading bottom frame 92a. In an alternate implementation, there may be a leading top frame 110 that integrates the top frame cap 124.

Figure 20:
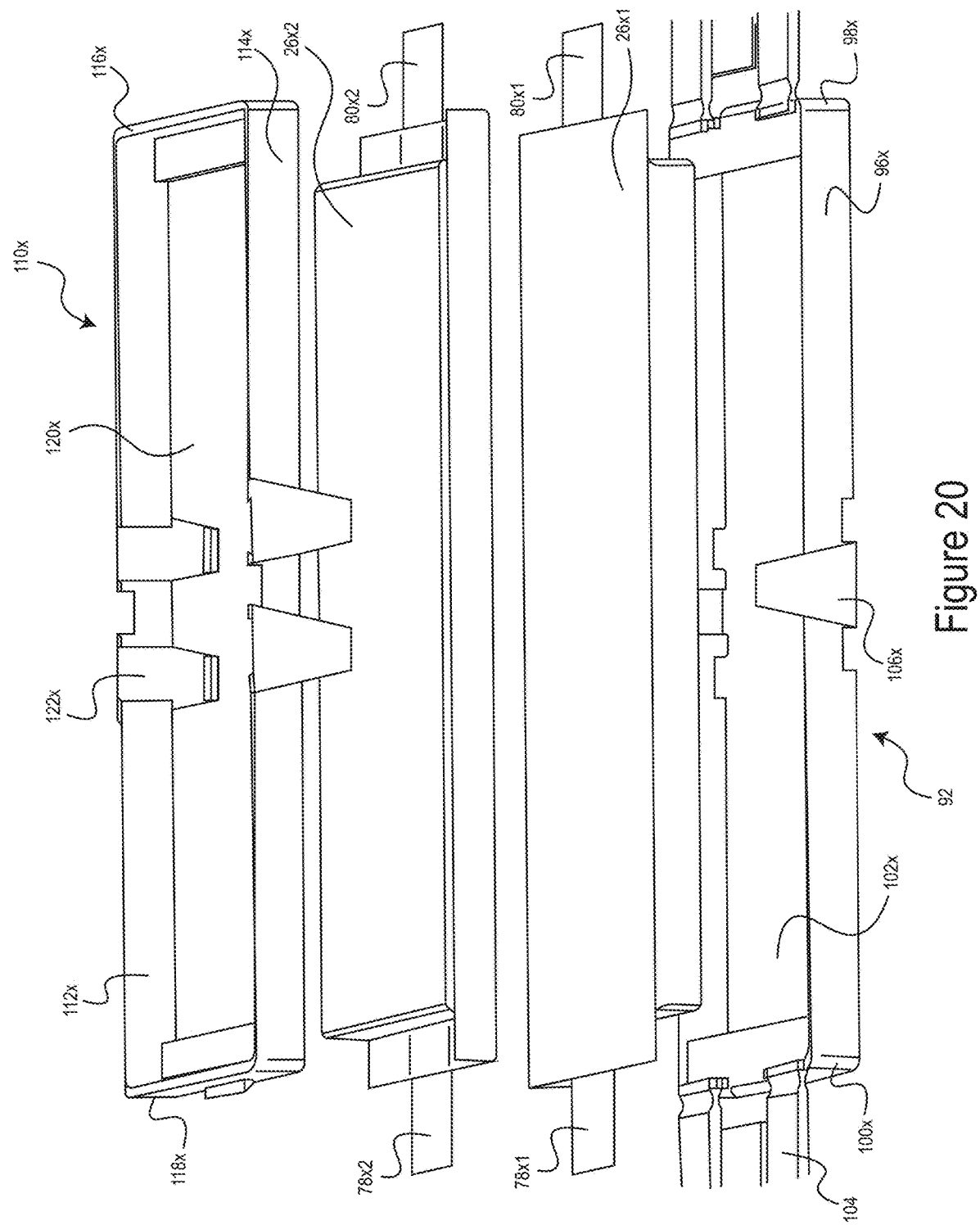
FIG. 20 is an example illustration of a single cell holder and the method of assembling the cell holder for manufacturing a battery.
Figure 21:
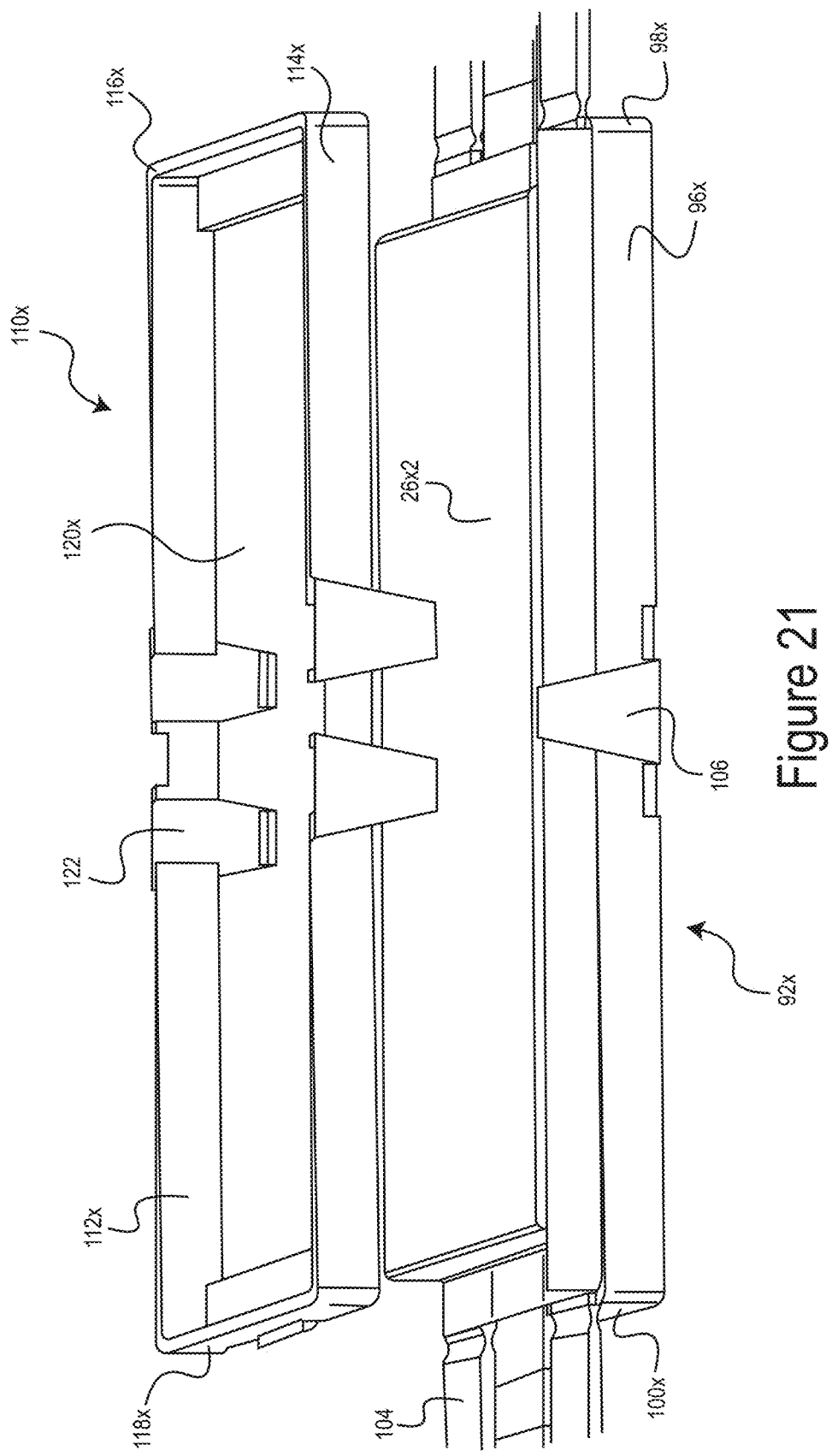
FIG. 21 is an example illustration of the single cell holder of FIG. 20 and the method of assembling the cell holder for manufacturing a battery.
Figure 22:
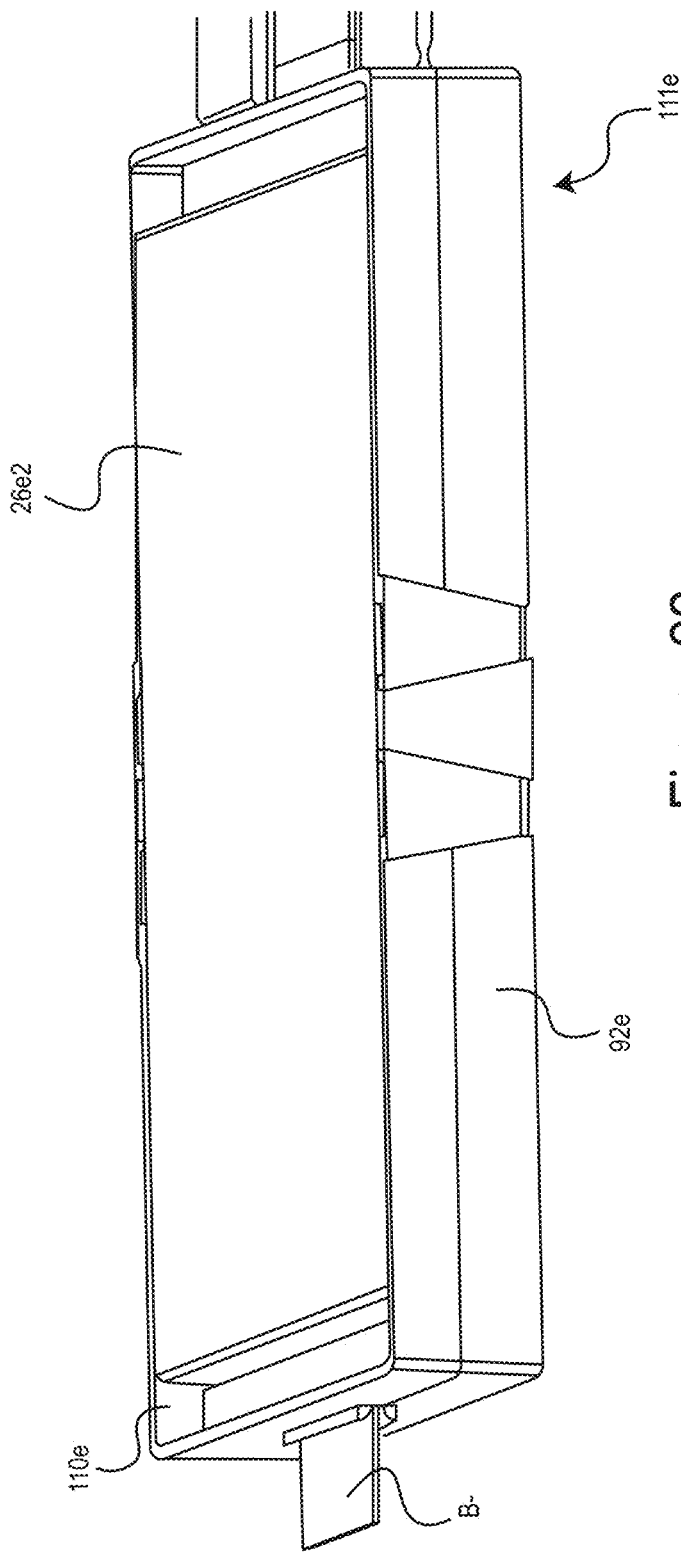
FIG. 22 is an example illustration of the assembled single cell holder of FIG. 21 for manufacturing a battery.
Figure 23:
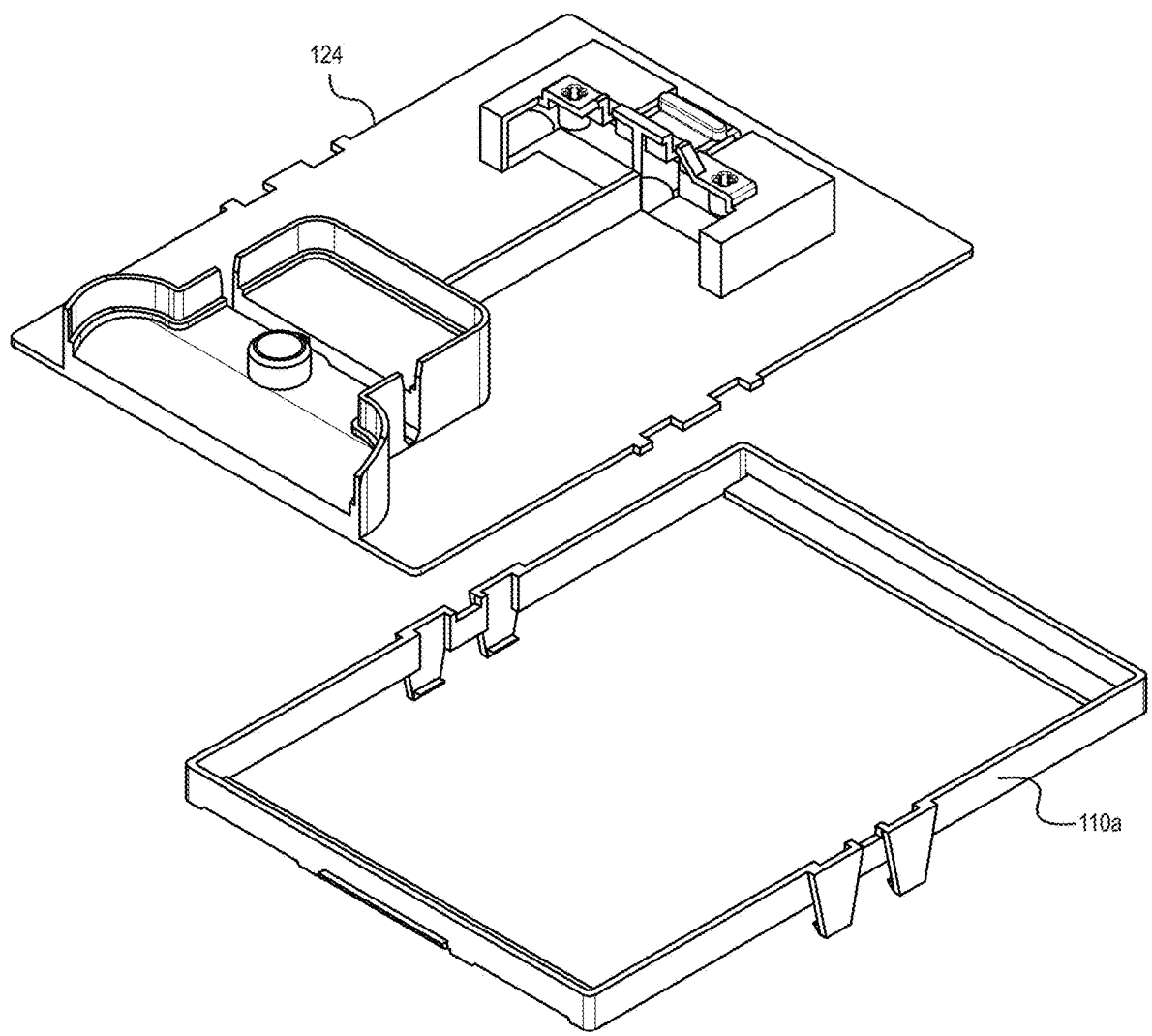
FIG. 23 is an example illustration of a single cell holder having a top frame cap and the method for assembling the cell holder for manufacturing a battery.
Figure 24:
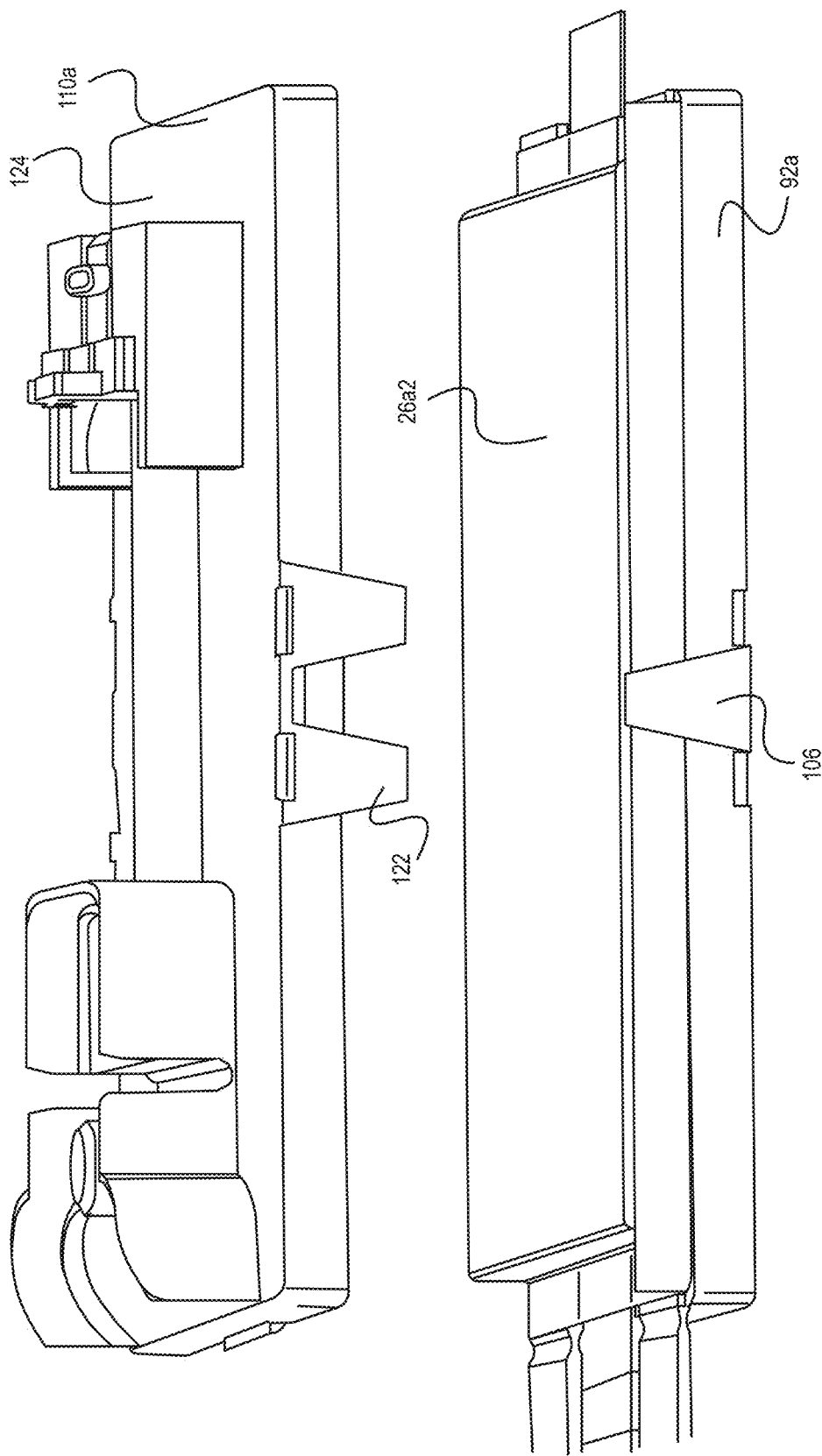
FIG. 24 is an example illustration of the single cell holder of FIG. 23 and the method of assembling the cell holder for manufacturing a battery.

FIG. 20 illustrates a single cell holder and the method of assembling the cell holder. FIG. 21 illustrates the single cell holder of FIG. 20 and the method of assembling the cell holder. FIG. 22 illustrates the assembled single cell holder of FIG. 21. FIG. 23 illustrates a single cell holder having a top frame cap and the method for assembling the cell holder. FIG. 24 illustrates the single cell holder of FIG. 23 and the method of assembling the cell holder.

Referring also to FIGS. 20-24, a process for manufacturing a battery 24 utilizing the cell holder 90 is as follows. The first step is to lay down the plurality of bottom frames 92. The second step is to place a pouch cell 26, in a downward facing orientation—top surface 76 of the cell 26 facing downward (−Z), in each of the bottom frames 92. Each pouch cell 26 includes a negative tab 78 and a positive tab 80. The pouch cells 26 are placed in the bottom frames 92 such that the positive tab 80 of one cell 26 overlaps the negative tab 78 of an adjacent cell 26. Once the cells 26 are electrically connected, the negative tab 78 of the cell 26 in the trailing frame 92e will be the most negative (B−) node in the string of cells 26 and the positive tab 80 of the cell 26 in the leading frame 92a will be the most positive (B+) node in the string of cells 26. In a first example implementation, a single cell 26 is placed in each frame 92. In a second example implementation, a second cell 26 is placed in each frame 92 with the bottom surface 74 of the first cell 26 adjacent to the bottom surface 74 of the second cell 26. In the second example implementation, the negative tab 78 of the first cell 26 is adjacent to the negative tab 80 of the second cell 26 and the positive tab 80 of the first cell 26 is adjacent to the positive tab 80 of the second cell 26. The cell tabs 78, 80 are positioned between the living hinges 104 of adjacent bottom frames 92. In the second example implementation, the cells 26 in the same bottom frame 92 will be connected in parallel providing an increased battery capacity.

In a second step, regardless of whether there are one or two cells 26 in each bottom frame 92, a top frame 110 is placed over each of the bottom frames 92. The top frame 110 is pressed into engagement with the bottom frame 92 such that the male snap element 106 engages the corresponding female snap 122 element thereby holding the cell(s) 26 in place in between the top and bottom frames 92, 110 to create a frame assembly 111. In alternate implementations, coupling devices other than the snap elements may be utilized. As noted above, depending upon the implementation, the top frame 110a that engages the leading bottom frame 92a may also receive a discrete cap 124 or may include an integrated cap 124.

Figure 25:
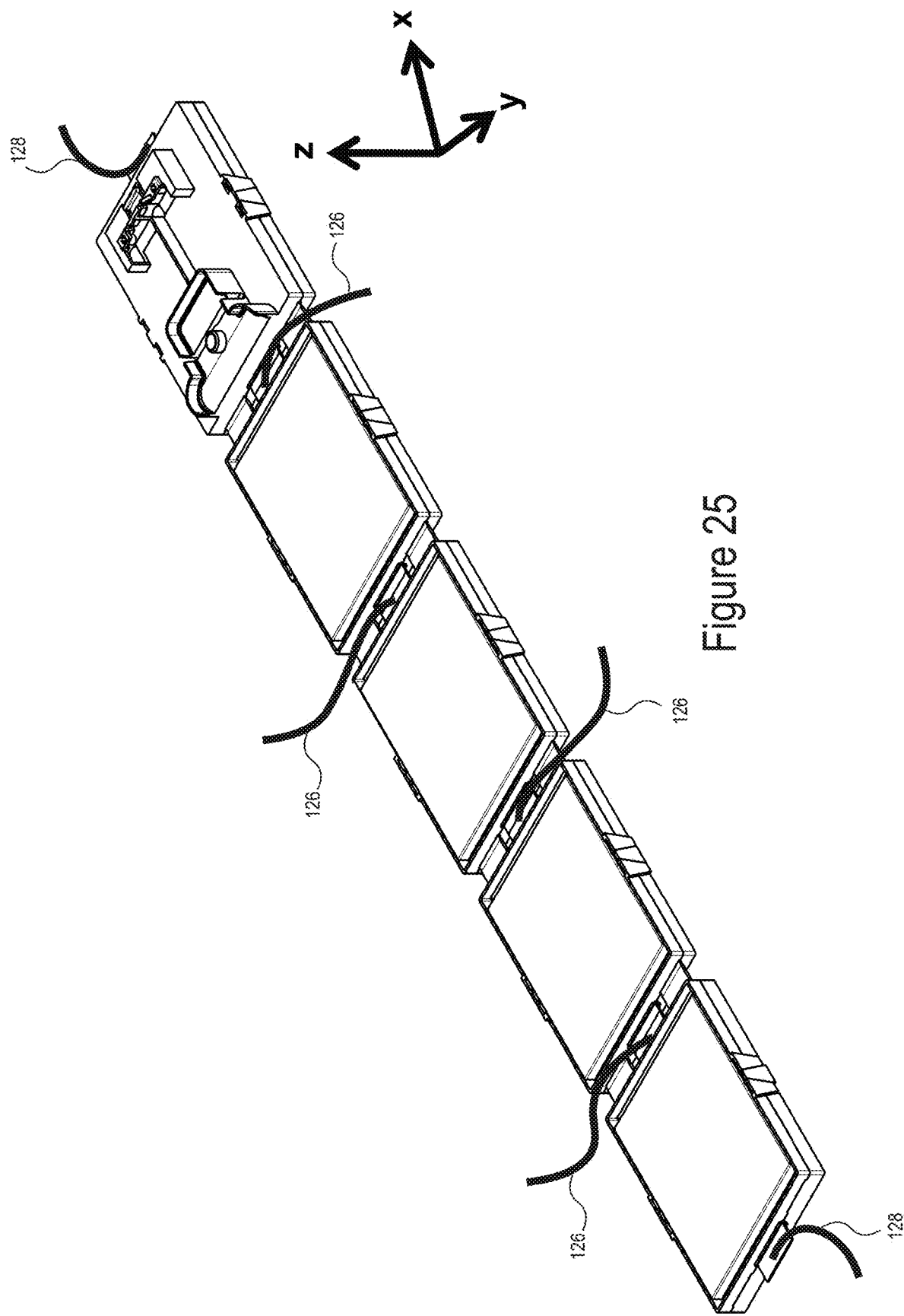
FIG. 25 is an example illustration of the plurality of assembled cell holders and a step in the method of manufacturing a battery.
Figure 26:
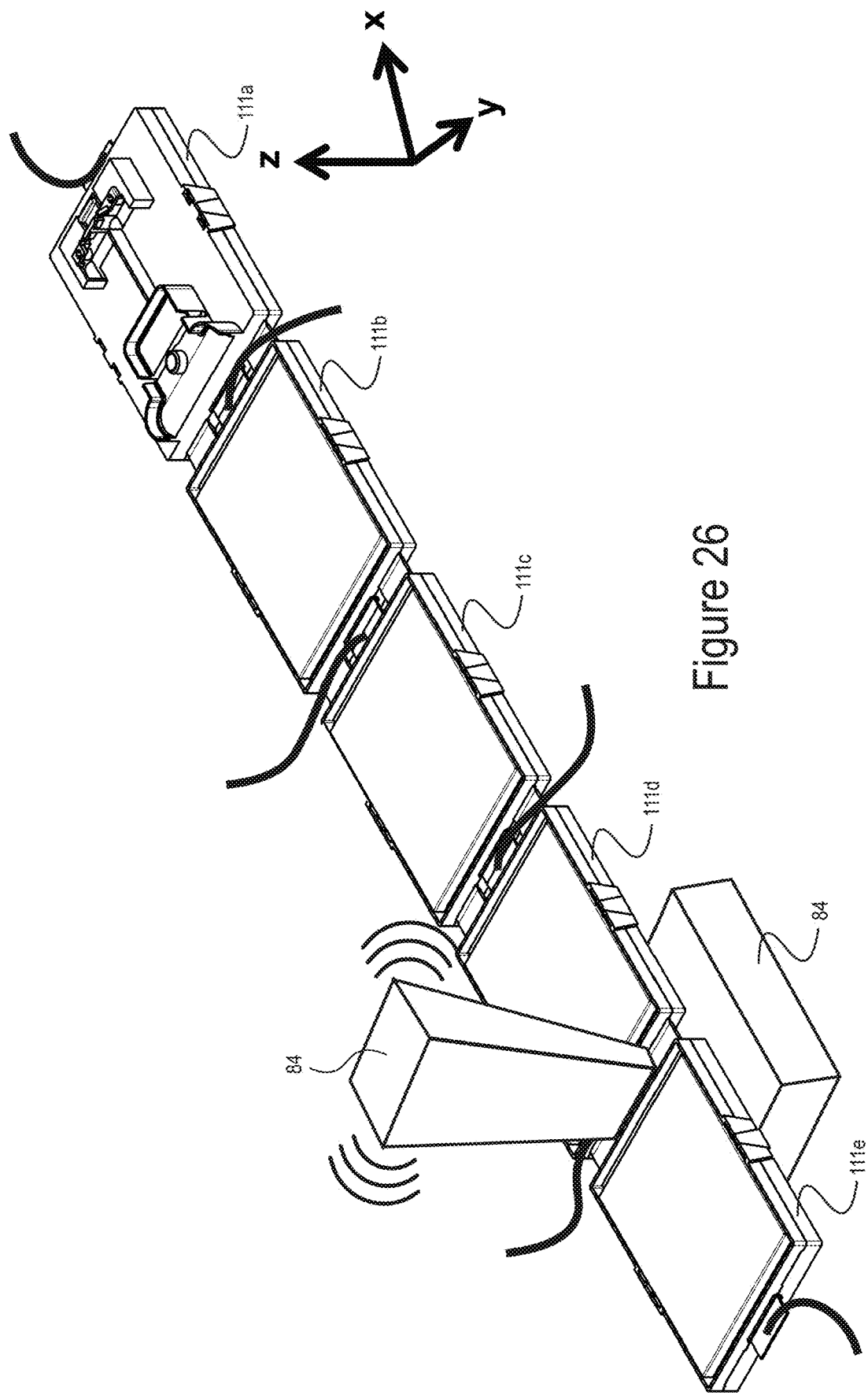
FIG. 26 is an example illustration of the plurality of assembled cell holders and a step in the method of manufacturing a battery.
Figure 27:
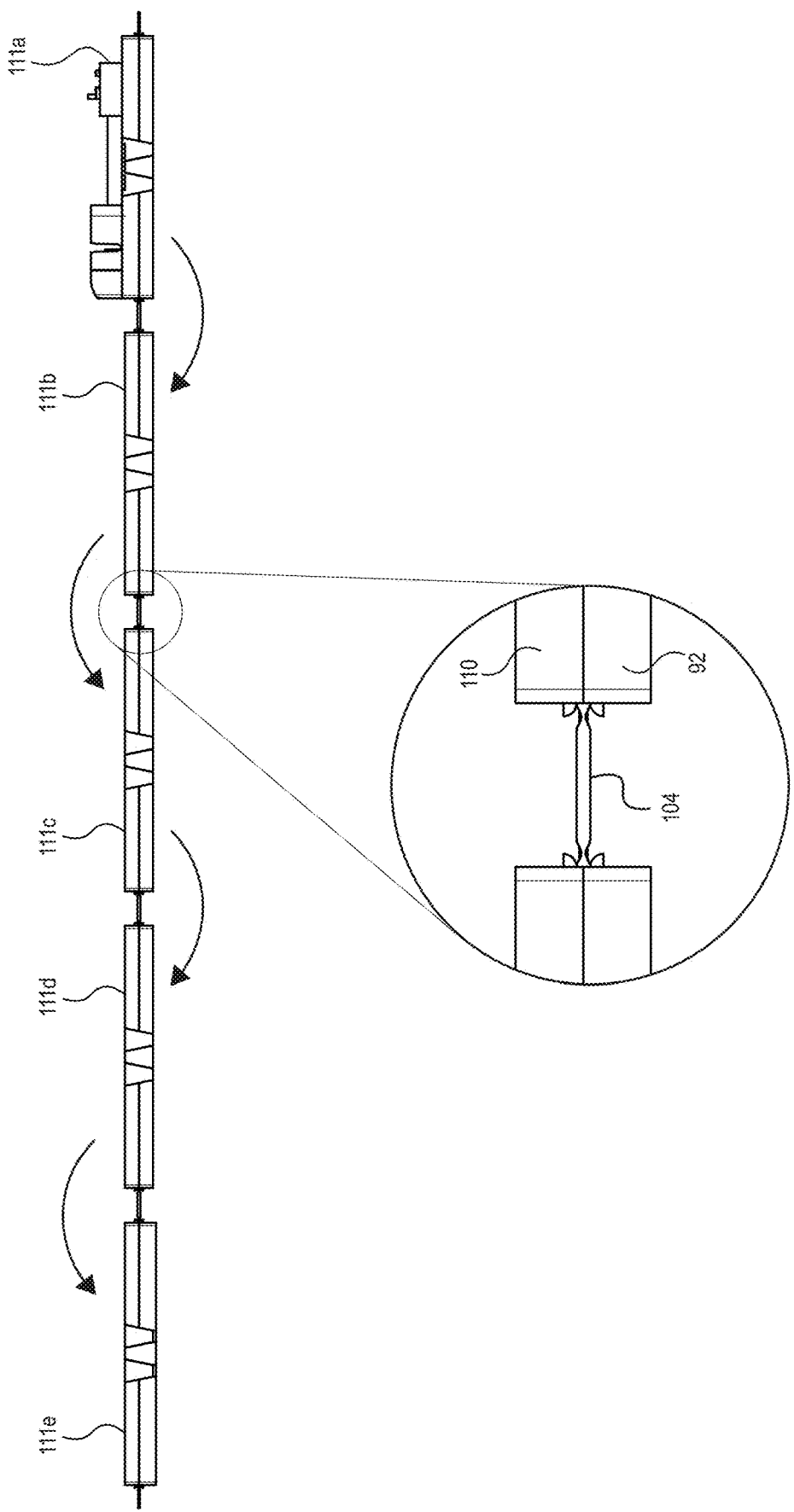
FIG. 27 is an example illustration of the plurality of assembled cell holders and a step in the method of manufacturing a battery.

FIG. 25 illustrates the plurality of assembled cell holders and a step in the method of manufacturing a battery. FIG. 26 illustrates the plurality of assembled cell holders and a step in the method of manufacturing a battery. FIG. 27 illustrates the plurality of assembled cell holders and a step in the method of manufacturing a battery. Referring to FIGS. 25 and 26, in a third step, sense wires/straps 126 may be positioned on the overlapping tabs 78, 80 between the intermediate frame assemblies 111b, 111c, 111d and between the first intermediate frame assembly 111b and the leading frame assembly 111a and the third intermediate frame assembly 111d and the trailing frame assembly 111e and power wires/straps 128 may be positioned on the B+ and B– tabs. The sense and power wires/straps may be held in place by features in the bottom frames 92, a carrier/pallet that holds the bottom frames 92 or both.

In a fourth step, as shown in FIG. 26, a welding device 84, for example an ultrasonic welding device, welds the overlapping cell tabs 78, 80 between (1) the third intermediate frame assembly 111d and the trailing frame assembly 111e, (2) the intermediate frame assemblies 111b, 111c, 111d and (3) the first intermediate frame assembly 111b and the leading frame assembly 111a. Once the connections between the tabs have been completed and the cells 26 are electrically connected the voltage potential from B– to B+ will increase from cell to cell by the voltage potential of the cell. In this example implementation, when fully charged, the cells have a 4V differential between the positive and negative tabs 80, 78. Other voltage cells may be used. As such, when the cells 26 are fully charged the voltage potential will increase by 4V from cell to cell from the B– to B+. In other words, the voltage potential between the negative tab 78 of the cell(s) 26a in the trailing frame assembly 111e and the positive tab 80 of the cell(s) 26e in the trailing frame assembly 111e will be 4V. The voltage potential between the negative tab 78 of the cell(s) 26e in the trailing frame assembly 111e and the positive tab 80 of the cell(s) 26d in the third intermediate frame assembly 111d will be 8V. The voltage potential between the negative tab 78 of the cell(s) 26e in the trailing frame assembly 111e and the positive tab 80 of the cell(s) 26c in the second intermediate frame assembly 111c will be 12V. The voltage potential between the negative tab 78 of the cell(s) 26e in the trailing frame assembly 111e and the positive tab 80 of the cell(s) 26b in the first intermediate frame assembly 111b will be 16V. The voltage potential between the negative tab 78 of the cell(s) 26e in the trailing frame assembly 111e and the positive tab 80 of the cell(s) 26a in the leading frame assembly 111a will be 20V.

Referring to FIG. 27, in a fifth step, frame assemblies 111 are folded to create the battery/core-pack 24. As the living hinges 104 are positioned in the same plane as the cell tabs 78, 80 buckling and stretching is prevented when the frame assemblies 111a-111e are folded. This will prevent damage to the weld joints between the cell tabs 78, 80 and the pouch cell seals 38. When the frame assemblies 111a-111e are folded, the living hinges 104 and connected cell tabs 78, 80 lay flat against the leading and trailing wall 98, 100, 116, 118 frame assemblies 111 providing a compact bussing and structural arrangement.

In alternate implementations, the pouch cells 26 and the corresponding frames 110, 92 may have other shapes, for example pentagonal, octagonal, etc.

Figure 28:
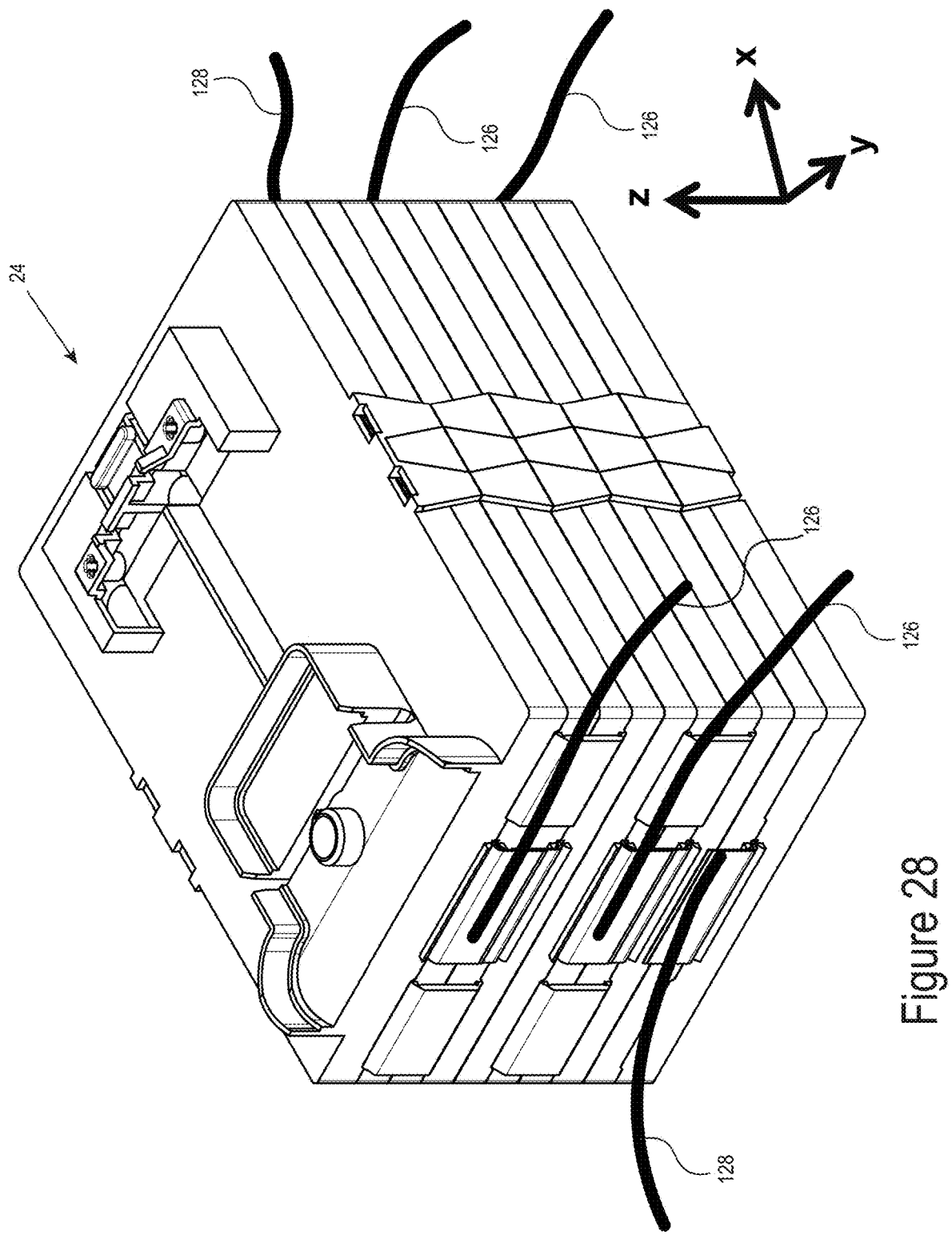
FIG. 28 is an example illustration of the assembled battery from the steps of assembling the cell holders and manufacturing the battery from FIGS. 15-27.

FIG. 28 illustrates the assembled battery from the steps of assembling the cell holders and manufacturing the battery from FIGS. 15-27. This configuration provides several advantages including: (1) maximum spacing between electrical connections of different voltage potential which reduces the risk of shorting during assembly, service and field use; (2) maximum access and clearance for tooling and fixturing, reducing time to develop the manufacturing process and reduce complexity; (3) the welded connections are now parallel and flat against the side of the core-pack, reducing the amount of "dead" or wasted space outside of the pouch cell electromechanically active volume; (4) the frames 110, 92 provide a structure that allows to interface with the body of the pouch cell 26 so to minimize mechanical stress on the cell tab 78, 80 and the pouch seal 38; and (5) the living hinge 104 features define the fold-locations and restrict the degrees of freedom such that in folding up the final core-pack shape, the cell tabs 78, 80 and weld connections are passive and do not take up any mechanical stress induced by the sub-assembly manufacturing process.

Figure 30:
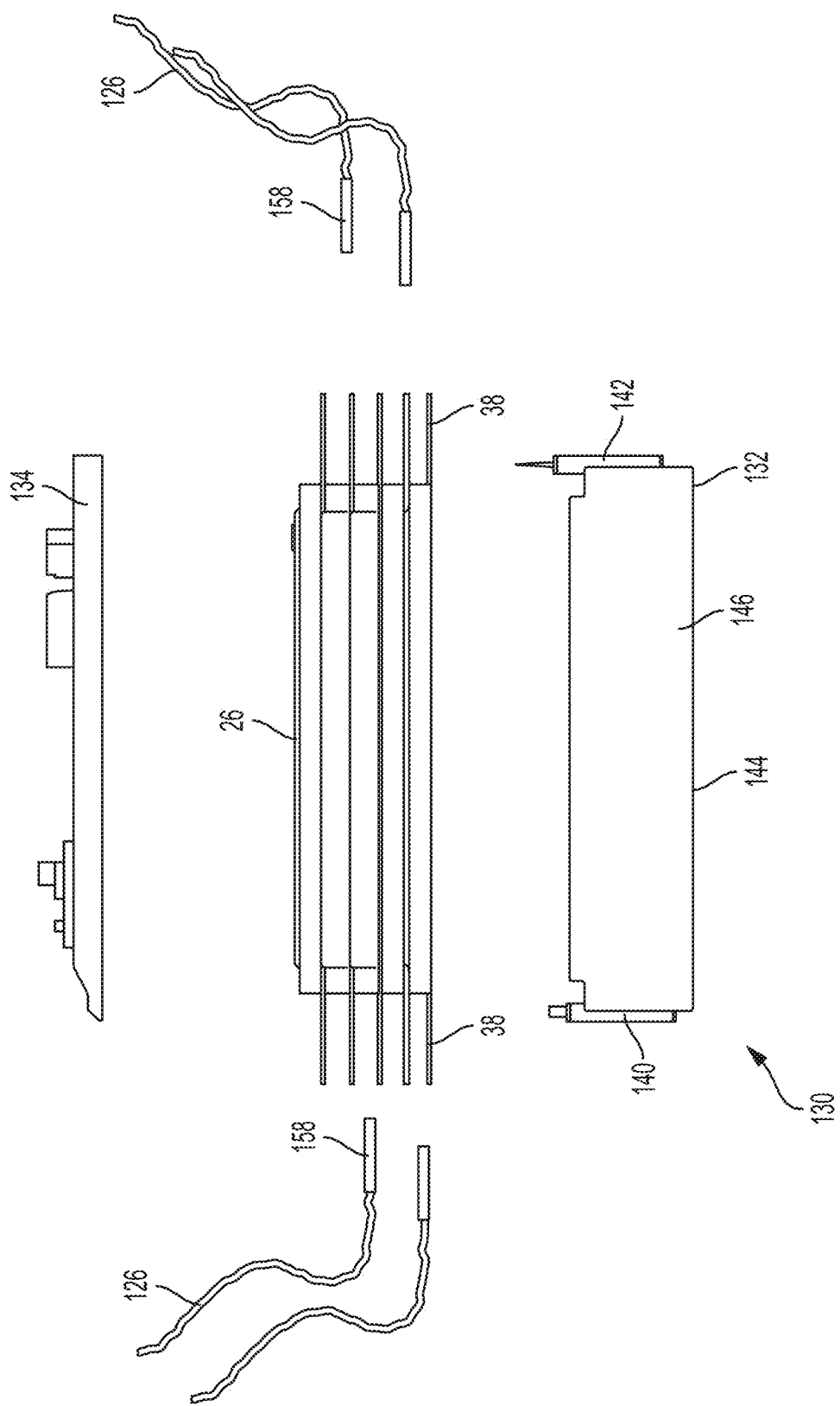
FIG. 30 is an example illustration of the cell holder of FIG. 29 and the method of manufacturing the battery.

An alternate implementation of a cell holder is illustrated in FIGS. 29 and 30. The alternative cell holder 130 includes a tray 132 and a lid 134. The tray 132 includes a pair of generally parallel sidewalls 136, 138 and a leading/front wall 140 and a trailing/rear wall 142. The leading wall 140 and the trailing wall 142 are generally parallel to each other and perpendicular to the pair of sidewalls 136, 138. The four walls 136, 138, 140, 142 form a generally rectangular opening. The tray 132 includes a bottom wall 144 at the bottom edges of the walls 136, 138, 140, 142 to form a cavity 146. The tray 132 has an open top to receive the plurality of pouch cells 26. A terminal block assembly 148, a latch 150 and a printed circuit board 152 (PCB 152) with various components may be coupled to the lid 134.

The plurality of pouch cells 26 may be formed into a stack (in one of the configurations described above). The tray cavity 146 is dimensioned to snuggly receive the stack of pouch cells 26. The interior surfaces 154 of the walls 136, 138, 140, 142 may include features such as ribs (not shown) to hold the stack of pouch cells 26 in a fixed position relative to the tray 132. The stack of pouch cells 26 may include tabs connected to the positive and negative terminals of the cells. The tabs may be connected to the cells before or after the stack of pouch cells are placed in the tray. Sense wire/straps 126 and power wires/straps 128 may be connected to the tabs using crimp terminals 158 or similar connections by welding or soldering. The sense and power wires/straps 126, 128 may be connected to the battery terminal block assembly 148. The tray 132 and lid 134 may include elements to route the sense and power wires/straps 126, 128 to the terminal block assembly 148. Once the stack of pouch cells 26 and the sense and power wires/straps 126, 128 have been placed in the tray 132 the lid 134 is coupled to the tray 132. The lid 134 may also include features to hold the stack of pouch cells in a fixed position relative to the tray 132 and the lid 134. Once the cell holder 130 is assembled, the terminal block assembly 148—which may include a terminal block and electronics related to the battery pack—may be connected to the lid 134. Thereafter, the cell holder 130/terminal block assembly 148 may be placed into the battery pack housing 22.

Figure 31:
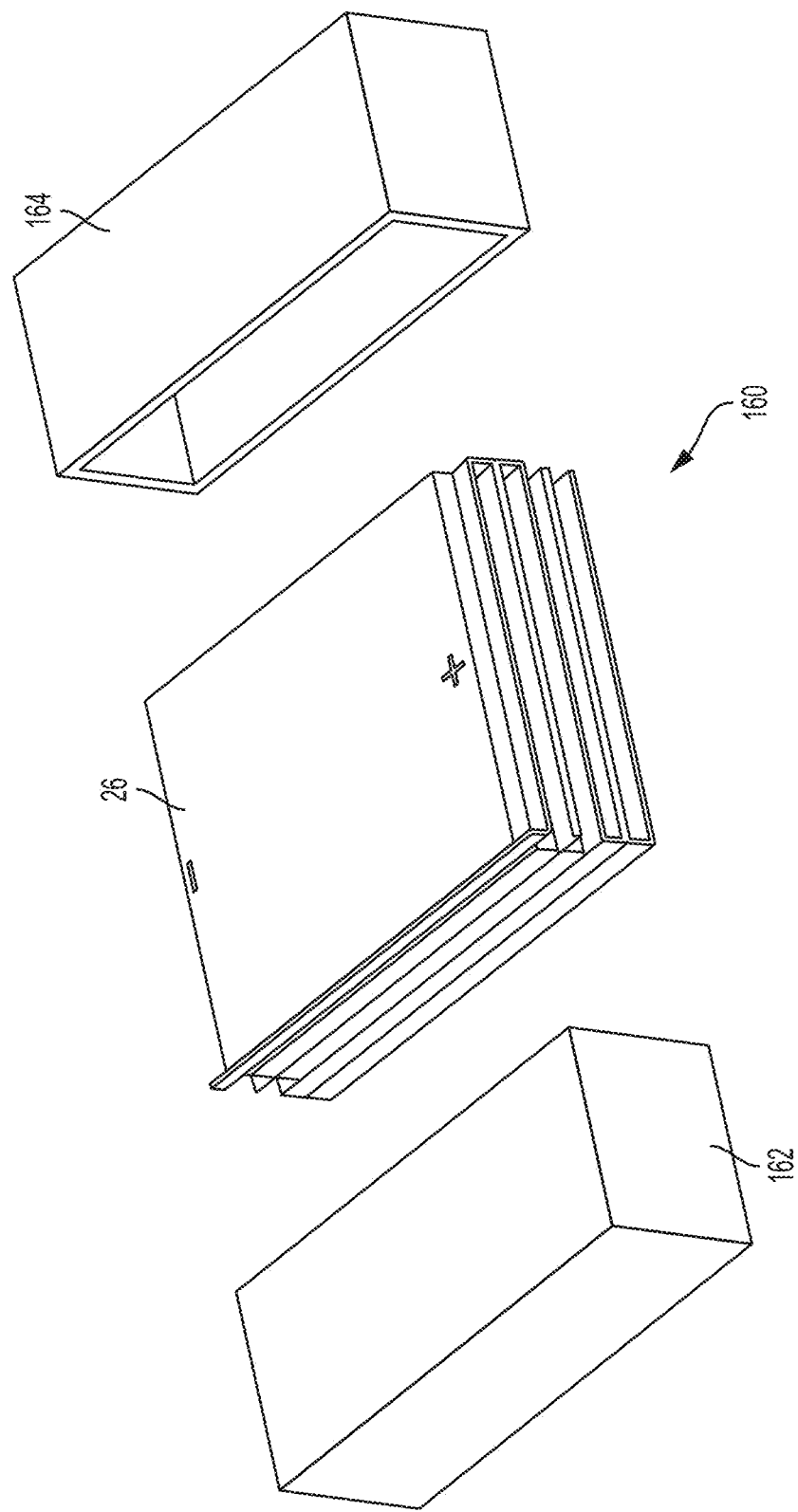
FIG. 31 is an example illustration of an alternate implementation for a cell holder and a method of manufacturing a battery.

In another example implementation of a cell holder, illustrated in FIG. 31, the holder 160 may include first and second halves 162, 164 that assemble together to contain and constrain the stack of pouch cells 26. The cell holder 160 may include slots 166 for accessing the cell tab 34 for connecting the sense and power wires/straps 126, 128. The cell holder 160 may also include elements to route the sense and power wires/straps 126, 128 to the terminal block assembly 148.

Once the cell holder 160 is assembled, a terminal block assembly 148—which may include a terminal block and electronics related to the battery pack—may be connected to the holder halves 162, 164. Thereafter the cell holder 160/terminal block assembly 148 may be placed into the battery pack housing 22.

An alternate implementation of the cell holder would include stacking the pouch cells 1-by-1 into a plastic cell holder (either the tray or the halves configuration) and then connecting the terminal tabs and sense connections from the exterior of the cell holder. The cell holder in this configuration may electrically isolate these connections from the pouch cells as well as mechanically hold or constrain the pouch cells.

Another alternate implementation of the cell holder would include stacking the pouch cells 1-by-1 and connecting the terminal tabs and sense connections prior to placement in the cell holder. In this implementation, the holder would enclose the entire battery/core-pack assembly (including the sense connections).

Another alternative implementation of the cell holder would include placing each pouch cell in an individual tray/frame and subsequently stacking the plurality of trays/frames vertically. Each pouch-frame sub-assembly may snap together or be held together by the battery pack housing or by the use of fasteners. The trays/frames may have features to align, hold, and isolate the cell tabs and sense connections. The tray/frame may either snap, grab, or be adhered to its respective pouch cell.

This configuration provides several advantages including: (1) Minimal processing equipment and fixtures; process designed more for hand-assembly operations where operator assembles and sits in front of a weld station; (2) Possibility for a simpler cell holder design (not having complex and difficult to injection-mold features); and (3) The snapping or stacking of individual tray/frame may allow for common parts and modular cell construction when going from a 5-cell to 10-cell arrangement.

Figure 32:
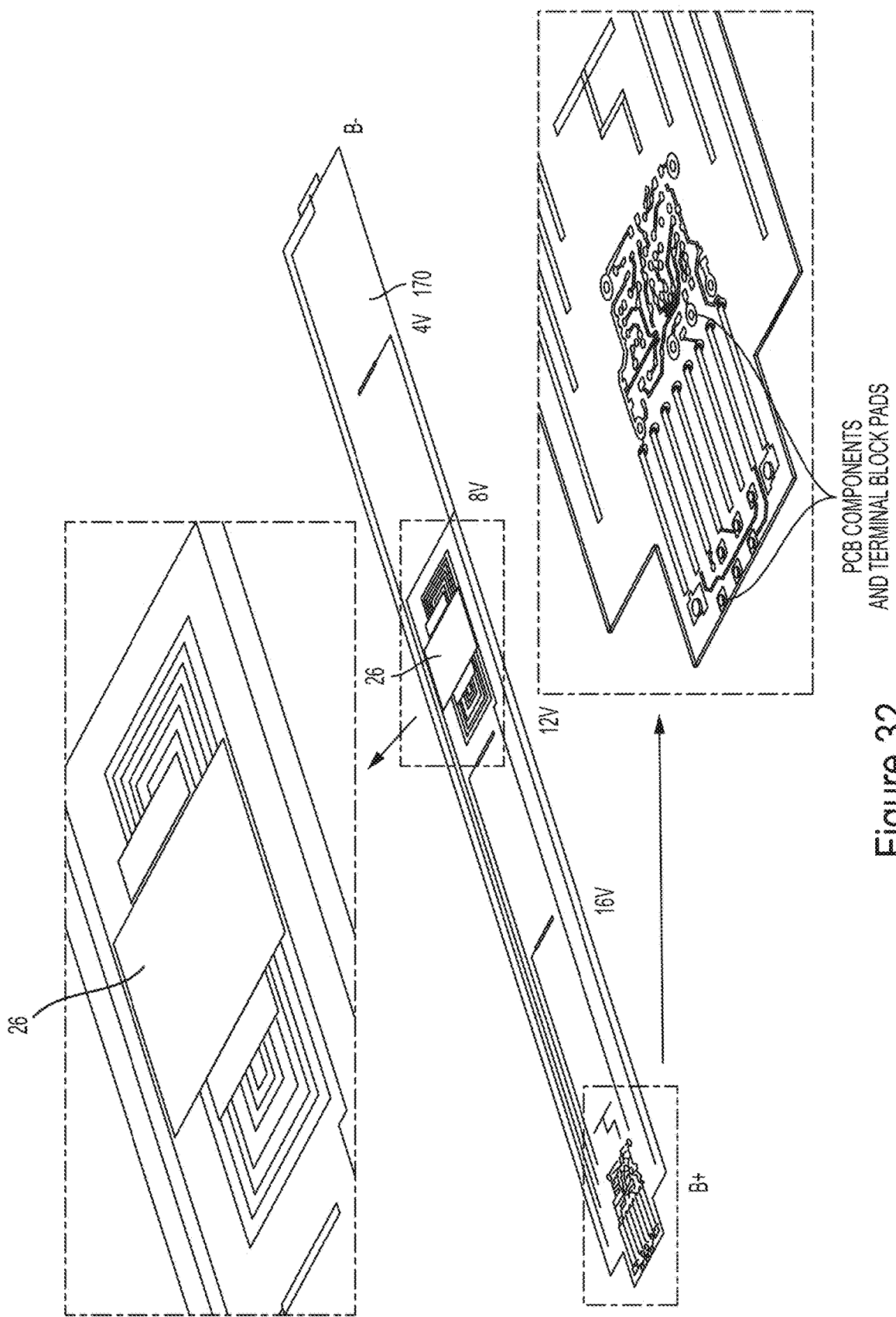
FIG. 32 is an example illustration of a flexible circuit used to connect a plurality of pouch cells.
Figure 33:
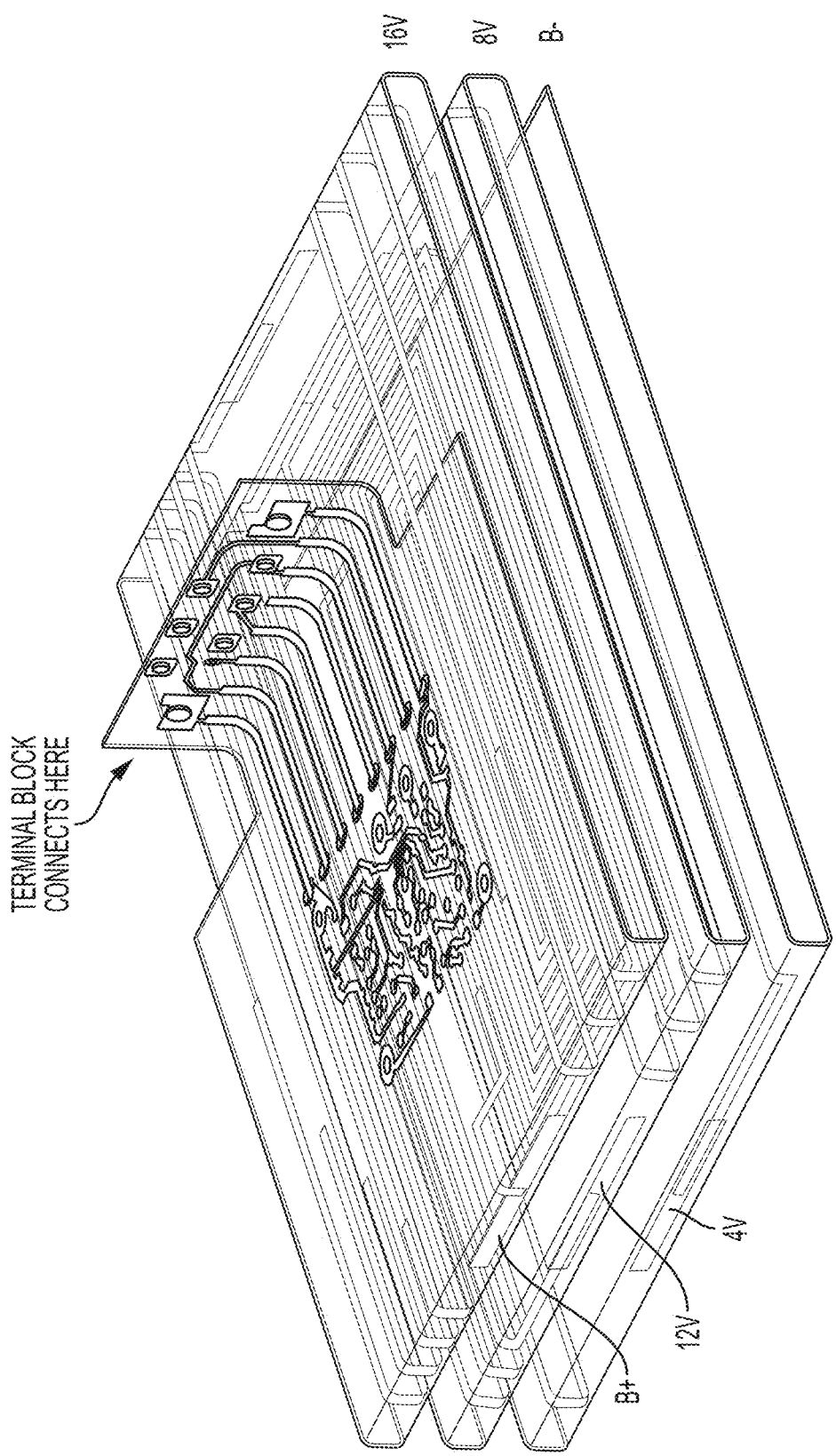
FIG. 33 is an example illustration of the flexible circuit of FIG. 32 used to connect a plurality of pouch cells.

In another general aspect, illustrated in FIGS. 32 and 33, a flexible circuit 170 is used to connect a plurality of pouch cells 26. The pouch cells 26 are placed directly on and attached to the flexible circuit 170 by adhesion or other method in a linear/string assembly configuration similar to the configuration described above. The flexible circuit 170 may also support an electronics module including the electronic components for managing the cells 26 as an integral part of the flexible circuit 170. The flexible circuit 170 may contain copper traces and pads that run from each cell tab location to electronics module. The pads may be connected to the cell tabs by ultrasonic welding, soldering, or other similar connection methods. The flexible circuit 170 may also have traces and pads that connect the electronics module to a terminal block assembly 148. The flexible circuit 170 may have a labyrinth-like, long copper trace over one or multiple cell placement locations for the purposes of sensing cell temperature by sensing the trace resistance variation with temperature (similar to a thermistor).

In an alternate implementation, one general aspect may use a flexible substrate on which the cells 26 are placed and attached by adhesion or other method for mechanically fixing the cells 26 in a linear/string assembly configuration similar to the configuration described above. The cell tabs may be ultrasonically welded together along with the appropriate sense line connections (e.g. wire, strap, etc). The electronics module, thermistor, sense lines, and terminal block may be separate parts, i.e. not integral with the substrate.

In either implementation described above, after the cells tabs are welded together, the flexible strip or flexible circuit with the cells attached thereto could fold up in a z-fold manner.

In either implementation described above, the flexible strip or flexible circuit may have stiffeners or reinforcements to better control the z-folding or other behaviors of the flexible strip.

This configuration provides several advantages including: (1) Integrated function and part consolidation (cell holder strip, sense-lines, module circuit, terminal connection pads, and temperature sensing) and (2) Less complex single part since serving just as a cell holder; may be made of more common material; less complex tooling than plastic injection molded cell holder for the linear/string assembly method.

In another alternate implementation of a pouch cell battery holder described above, the trays are eliminated. In this implementation, illustrated in FIGS. 34 and 35, the stack of pouch cells 26—formed either by the string assembly configuration or the stacked configuration—is placed directly in the battery pack housing 22. The housing 22 includes internal features 176 to constrain and fix the stack of cells 26 relative to the housing 22. The housing 22 may include a combination of ribs, walls, and/or grids to maintain the position of the stack of cells 26 relative to the housing 22. In addition or alternatively, the stack of cells 22 may be wrapped in a sleeve-like material 178, for example a heat-shrink material, to fix the stack of cells 26 relative to each other.

Similar to the configurations described above, this method includes the steps of (1) welding the cells 26 together—either in string assembly configuration and z-folded or as a stacked assembly configuration; (2) connecting the sense wires/straps 126 as part of step 1 or after step 1; (3) wrapping the pouch cells 26 with heat shrink or other material 178 to constrain them as group; (4) placing the pouch cells 26 directly into the battery pack housing 22 wherein the housing 22 has features 176 that fit/constrain/protect the cells 26.

This configuration allows the cell holder parts to be eliminated. This configuration provides several advantages including: (1) elimination of a separate cell holder parts; (2) fewer assembly steps; and (3) simpler design with fewer tolerance stack-ups.

Another general aspect is directed to the connections of adjacent pouch cells and improved thermal performance of a pouch cell battery pack.

Figure 37:
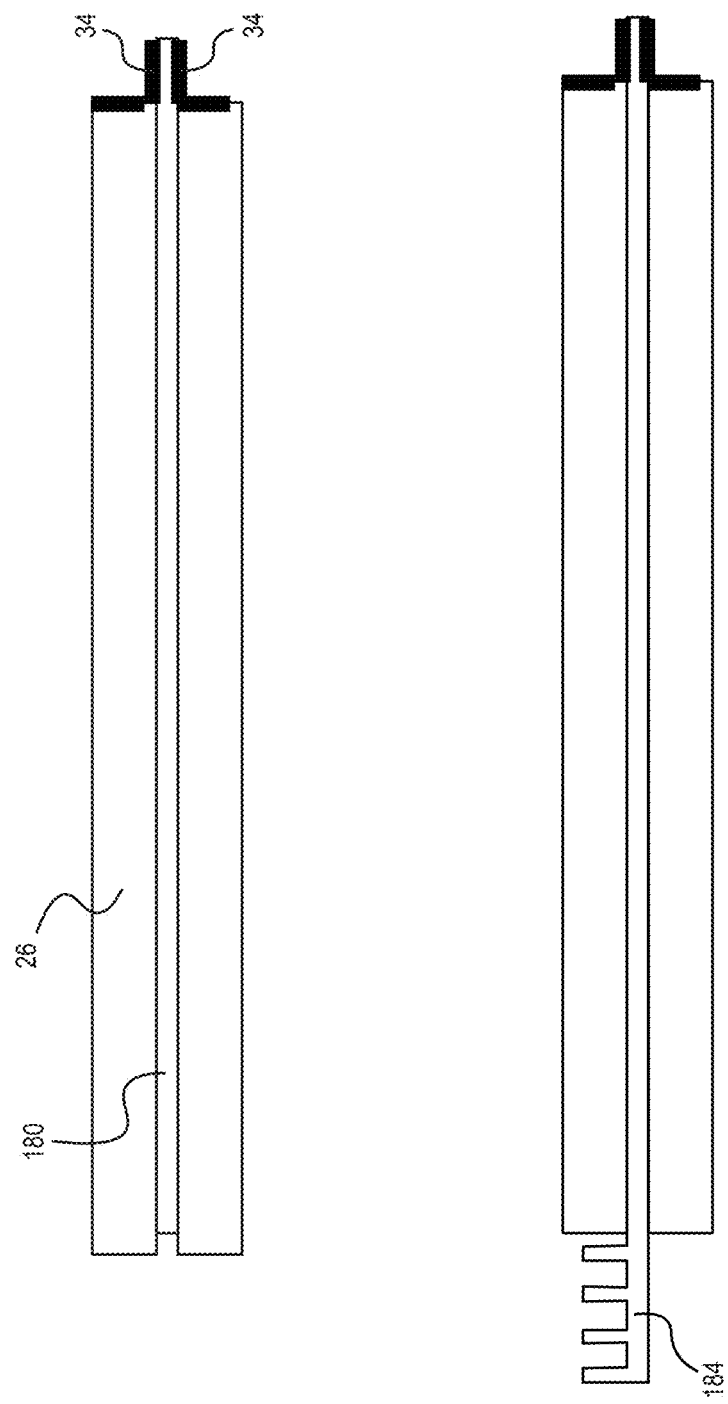
FIG. 37 is an example illustration of the connections of adjacent pouch cells of FIGS. 36a-36b.
Figure 41:
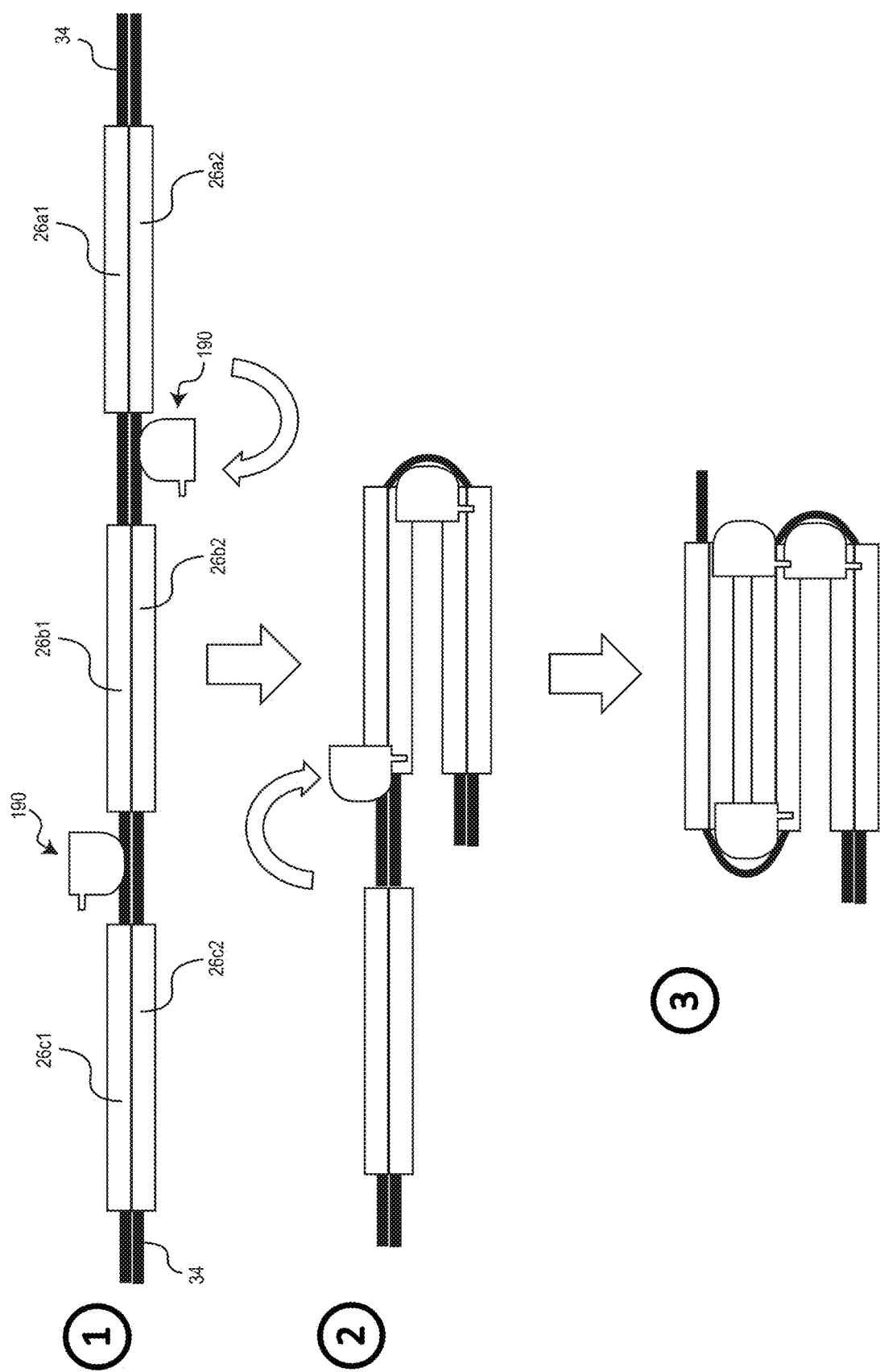
FIG. 41 is an example illustration of the spacer or end cap of FIG. 38.

In this aspect, illustrated in FIGS. 36 and 37, there are two adjacent pouch cells 26. Each cell 26 may include a tab 34 extending from the pouch 28. A support strap 180 of thermally conductive material having a length and width equivalent to the length and width of the pouch 28 is positioned such that an end 182 of the support strap 180 is placed between the adjacent cell tabs 34. The cell tabs 34 are welded to opposing sides of the support strap 180. As illustrated in FIG. 36*b*, after the tabs 34 are welded to the support strap 180 the cells 26 are folded together positioning the support strap 180 between the cells 26. The support strap 180 may provide structural rigidity for the pair of cells 26. The support strap 180 may also serve as a heat sink for the pair of cells 26. In an alternate implementation, the support strap 180 may include an extension 184 along one of the sides of the support strap 180 that is not welded to the tabs 34. The extension 184 may improve convective cooling.

Another general aspect, illustrated in FIGS. 38-41, is a spacer/end cap 190. As noted above, in the string assembly configuration the pouch cells 26 are lined up during the initial step. The tabs 34 between the cells 26 are welded together to form a series connection between the plurality of pouch cells 26. A spacer or end cap 190 may be placed on the cell tab 34 connections. An example implementation of the spacer 190 has a length and a width. One side of the spacer along the length is formed as a semicircular or curved surface 192. When the cells 26 are folded, as described above, the connected cell tabs 34 wrap around the spacer 190. This provides for shaping the cell tabs 34 and providing strain relief when the cells 26 are folded. The spacer 190 may include an internal slot 194 to receive the cell tabs 34. The spacer 190 may include a first mating feature 196, such as a peg or other male element, on a side and a second mating feature 198, such as a cavity or other female element, on a side opposed to the first mating feature 196. The male element 196 is to mate with a female element 198 of an adjacent spacer 190 and the female element 198 is to mate with a male element 196 of an adjacent spacer 190. These mating features 196, 198 provide alignment for stacking the cells 26 and mechanical robustness in constraining the cells 26 and cell tabs 34. The spacers 190 may also provide some space between adjacent cells 26 for additional components to be placed on the cells 26 for thermal management, vibration and impact control or other mechanical support.

Another general aspect is for creating voltage sense connections in a pouch cell. In order to optimize safety and performance, rechargeable batteries containing lithium ion cells generally need voltage monitoring during charge and discharge. This is usually established by using wires, straps or other conductors connected at the junctions between cells in the battery. The voltage sense connections are then connected to a battery management unit. The battery management unit uses voltage measurements to determine if, when and how to charge or discharge the battery cells. As pouch cells have a different packaging configuration than the conventional 18650 cells, a new approach needs to be devised to establish these voltage sense connections. One way is to weld or solder wires, straps or other conductors to the junctions between each cell in the battery. An alternative way is to use the positive and/or negative tabs 78, 80 that come out of each cell to make the sense connection, without an extra connecting component. In one implementation, a pouch cell tab is fabricated such that a first part of the tab can serve as the sense connection and a second part of the tab can serve as the power/high current connection. The cell tab may be received at the cell manufacturer pre-cut or pre-formed into the desired shape ("power and sense ready"), or it may be cut or formed after the manufacture process.

Figure 42:
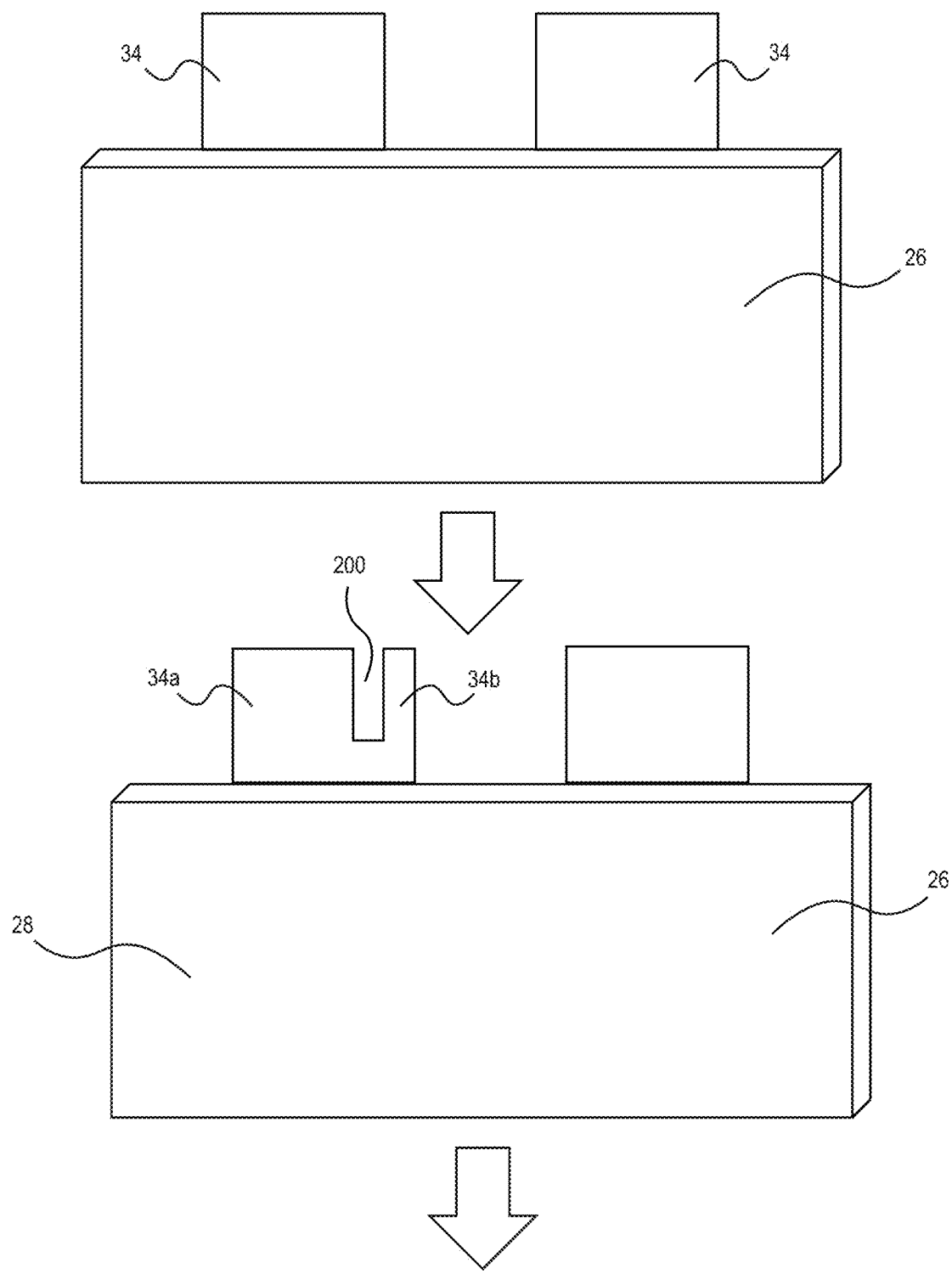
FIG. 42 is an example illustration of a method for creating voltage sense connections.
Figure 43:
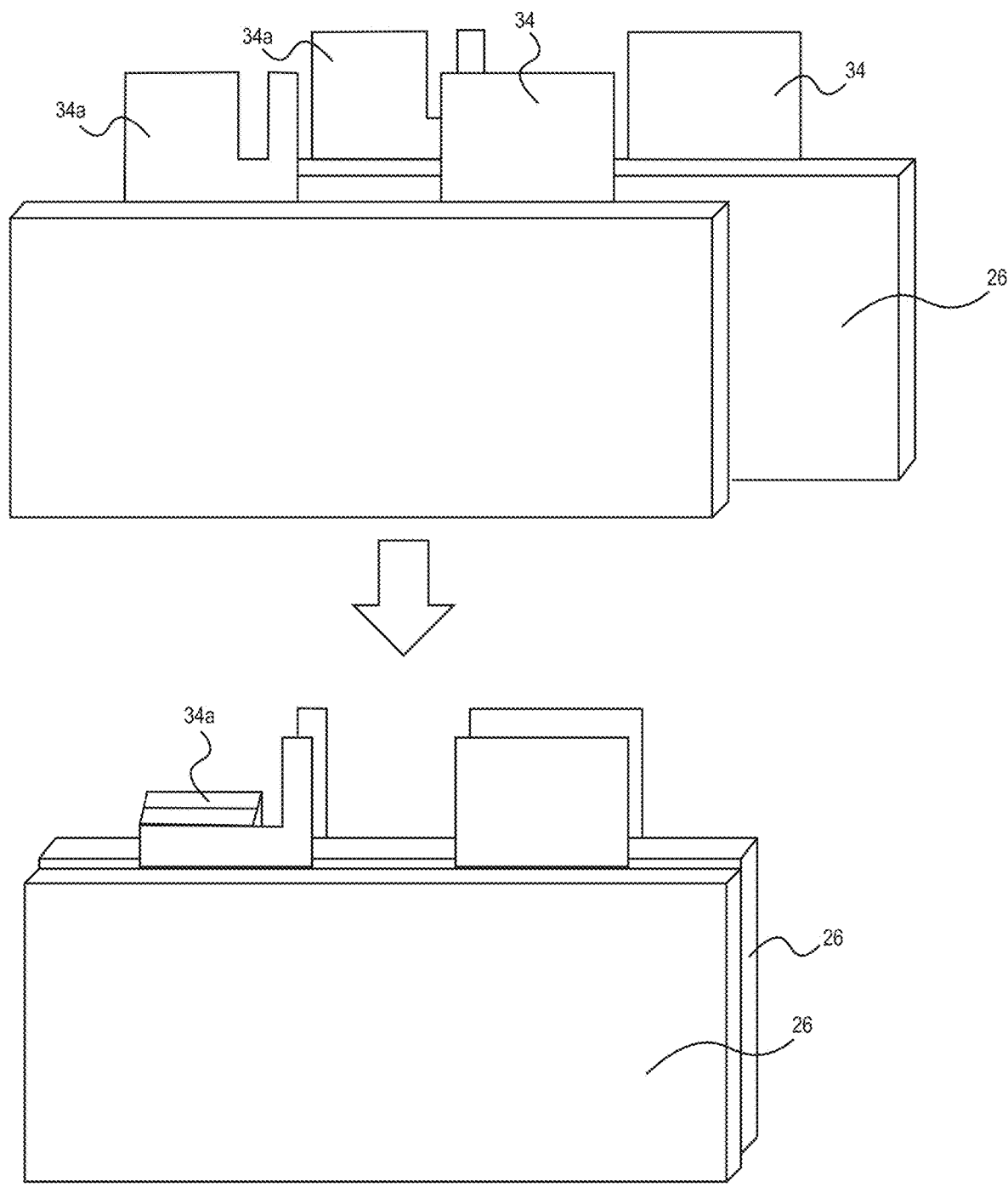
FIG. 43 is an example illustration of a method for creating voltage sense connections.
Figure 44:
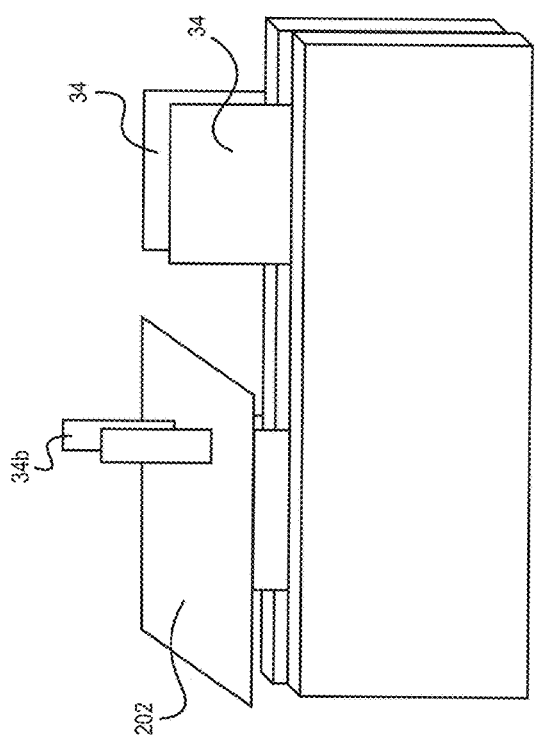
FIG. 44 is an example illustration of a method for creating voltage sense connections.

In a first example implementation of creating voltage sense connections, illustrated in FIGS. 42-44, a first step comprises creating at least one and preferably a plurality of cell tabs 34 extending from the pouch 28. In a second step, the cell tab 34 is punched or a cut-out 200 is created such that two sub-tabs 34*a*, 34*b* are created. In an example implementation, one of the sub-tabs 34*a* is larger than the other sub-tab 34*b*—the larger sub-tab 34*a* serving as a power/high current connection between cells 26 and the smaller sub-tab 34*b* serving as a sense connection. This step may take place at the cell manufacturer or at the battery manufacturer. In a third step, at least two cells 26 having the punched tabs 34 are positioned next to each other such that the tabs/sub-tabs 34 of the adjacent cells 26 are aligned. In a fourth step, the larger power/high current sub-tabs 34*a* of adjacent cells 26 are welded together to provide a series connection between the cells 26. In a fifth step, a rigid or flexible printed circuit board (PCB) 202 that includes through holes to receive the smaller sense sub-tabs 34*b* is placed over the connected cells 26 to receive the sense sub-tabs 34*b*. The sense sub-tabs 34*b* may be connected to the PCB 202 by soldering, ultrasonic welding or resistance welding or other connection methods. The battery management unit may be connected to the PCB 202. Alternatively, the sense sub-tabs 34*b* could be connected to a wire, strap or other conductor which is connected to the battery management unit.

Another general aspect is to provide a method for monitoring and gauging swelling of a pouch cell in order to address safety and performance issues. Depending upon the status of the cells, vis-à-vis swelling of the pouch, one must control the charge and/or discharge of the cells and may modify the voltage/temperature/current limits used to determine when to allow charging and discharging. By carefully monitoring these parameters one may extend the life/performance of the battery cell and address safety concerns.

It is known that pouch cells may swell under high temperature and after repeated charge and discharge cycles. This is at least in part due to the different molecules in the electrolyte of the cell becoming gaseous under high temperature. The result of a swollen cell can be performance degradation in the form of increased impedance, reduced runtime, and poor thermal performance.

Figure 45B:
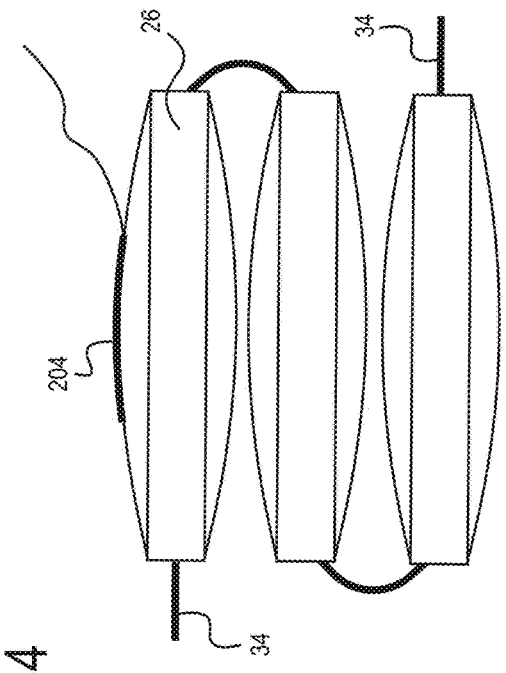
FIGS. 45a and 45b are example illustrations of a sensor on a pouch cell.
Figure 45A:
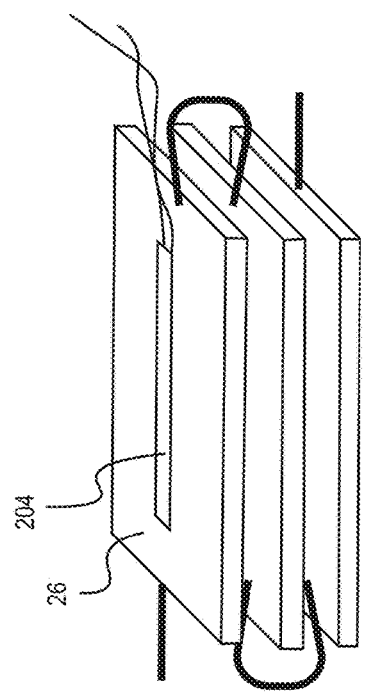

In one example implementation, illustrated in FIG. 45, a sensor 204 may be placed on a cell 26. When a portion of the sensor 204 is triggered, for example bent due to the swelling of the cell 26, the sensor 204 outputs a variable voltage or other electrical signal, which is used by the battery management unit to do one or more of the following:

1) Terminate or not allow charge or discharge
2) Change thermal, voltage or current limits in charge or discharge in order to extend the life of the battery.

For example, if the normal thermal limit is 80° C., it could be reduced to 60° C. or 70° C. if that would extend the life of the battery. Voltage and current limits could also be altered to extend the life of the battery once it has experienced some swelling over its period of use. An exemplary sensor is the SEN-10264 flex sensor manufactured by SpectraSymbol.

Figure 46:
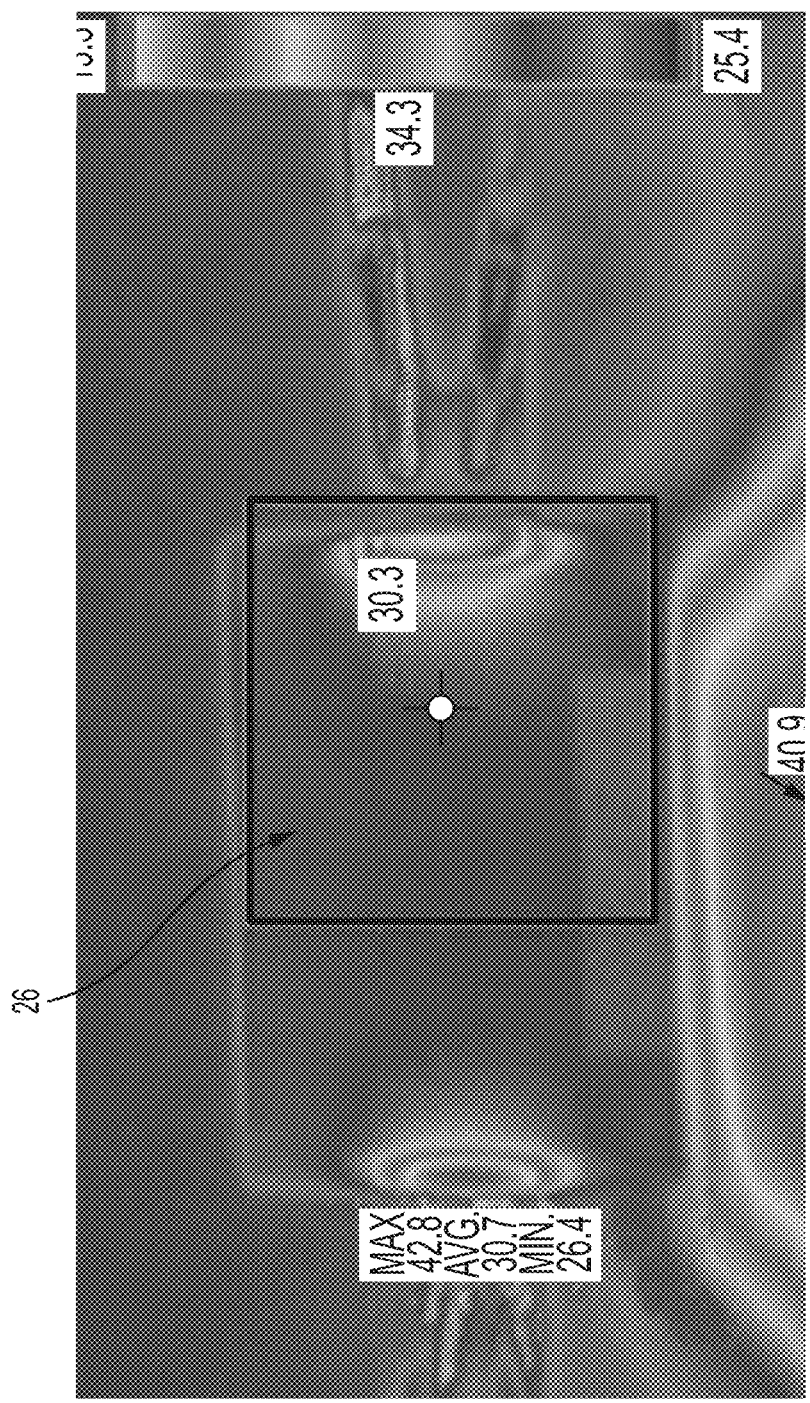
FIG. 46 is an example illustration for monitoring the temperature of a pouch cell.
Figure 47:
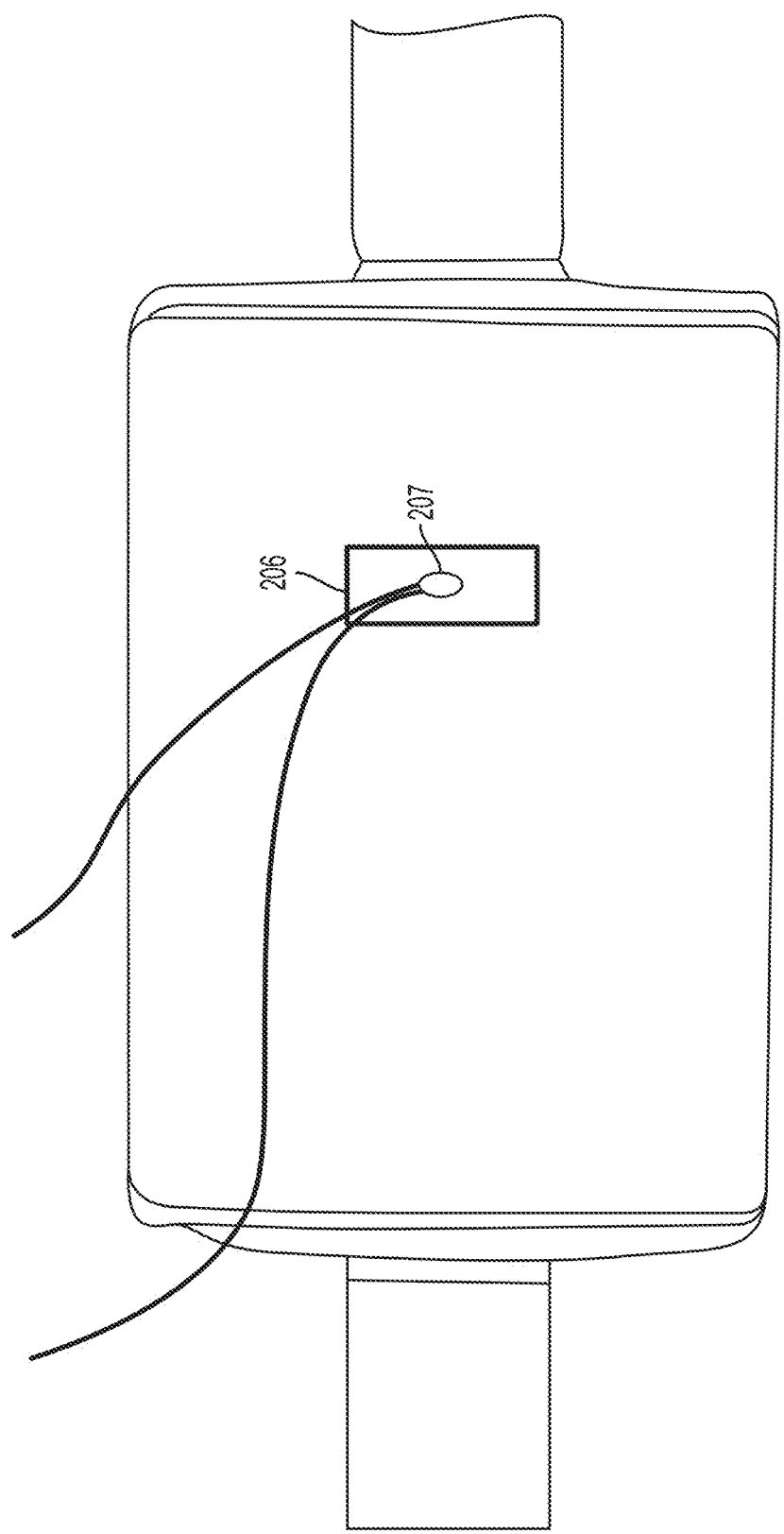
FIG. 47 is an example illustration for monitoring the temperature of a pouch cell.
Figure 48B:
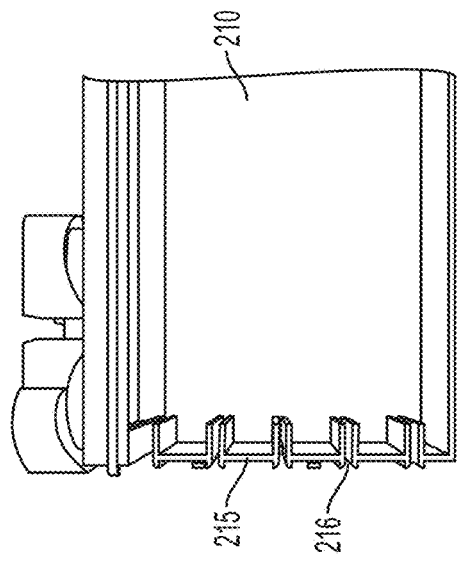
FIGS. 48a-48e are example illustrations of a cell holder having a clamshell configuration.
Figure 48E:
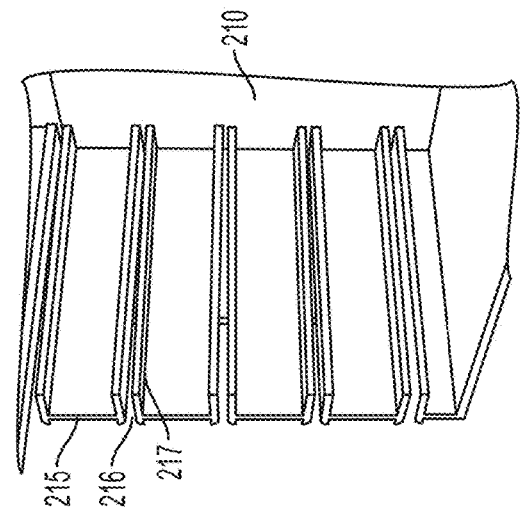
Figure 48A:
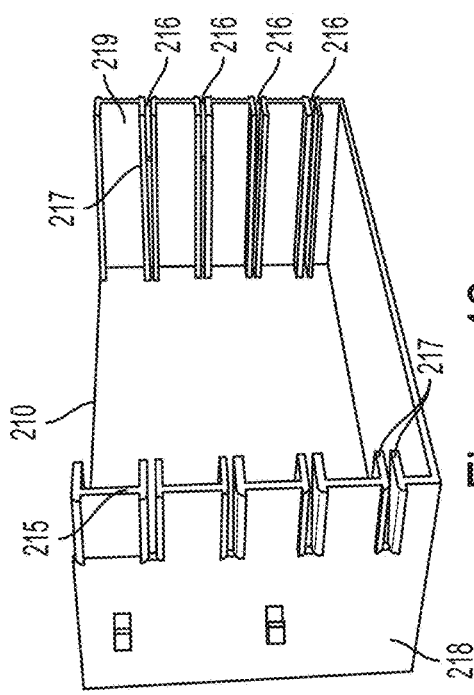
Figure 48D:
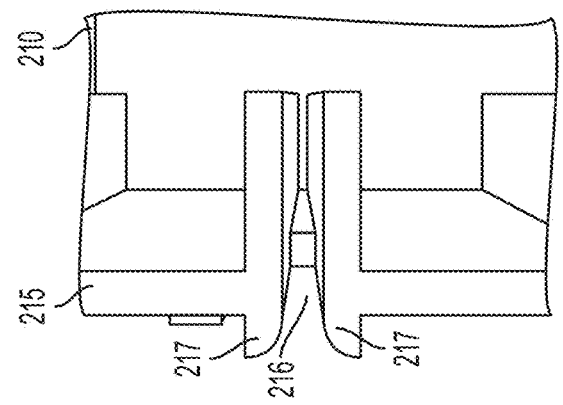
Figure 48C:
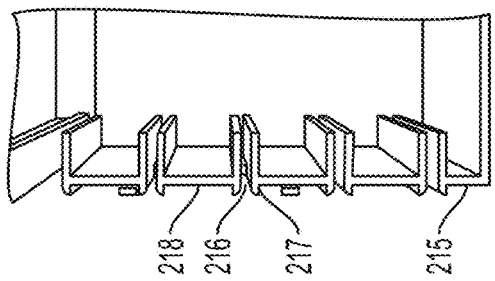
Figure 49B:
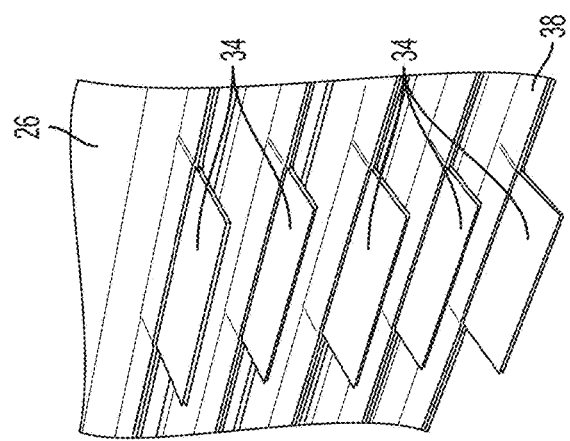
FIGS. 49a-49d are example illustrations of a cell holder having a clamshell configuration.
Figure 49D:
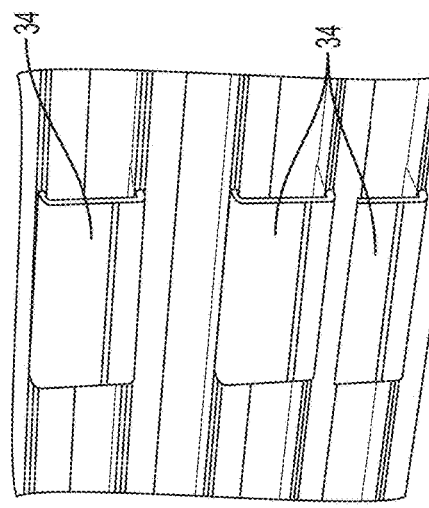
Figure 49A:
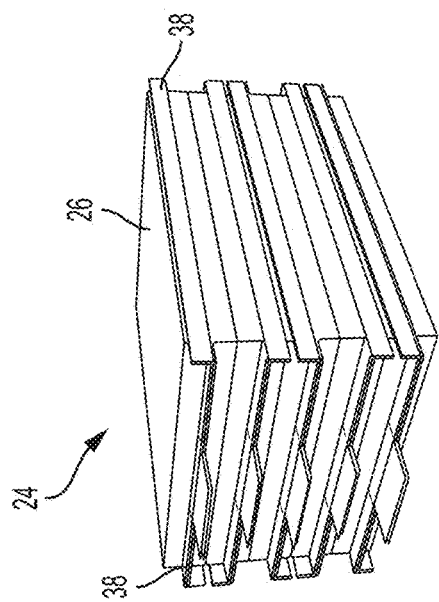
Figure 49C:
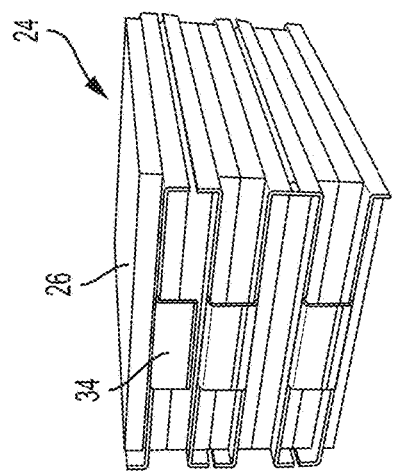
Figure 50B:
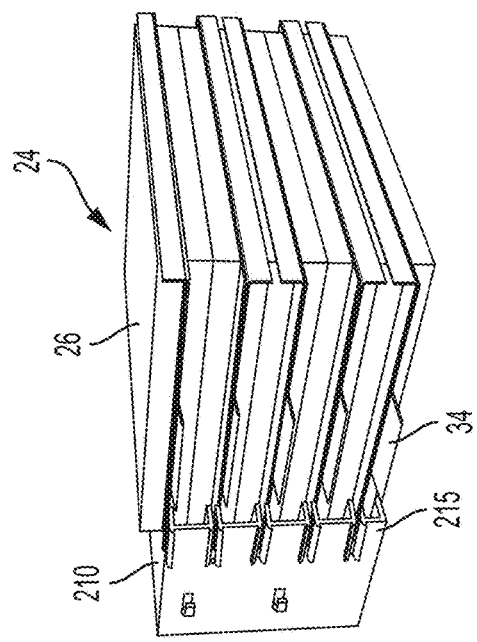
FIGS. 50a-50d are example illustrations of a cell holder having a clamshell configuration.
Figure 50D:
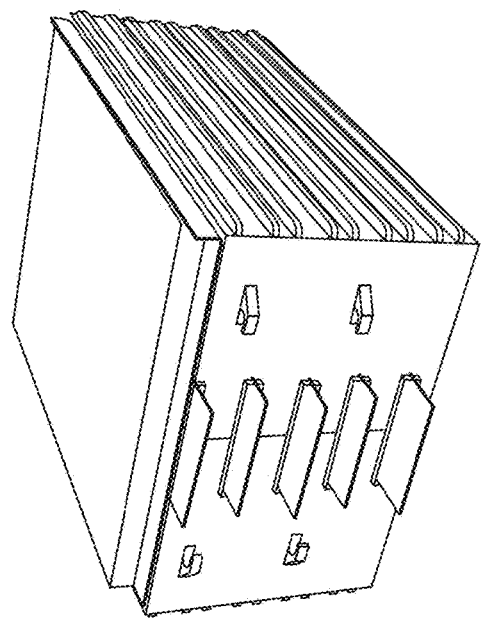
Figure 50A:
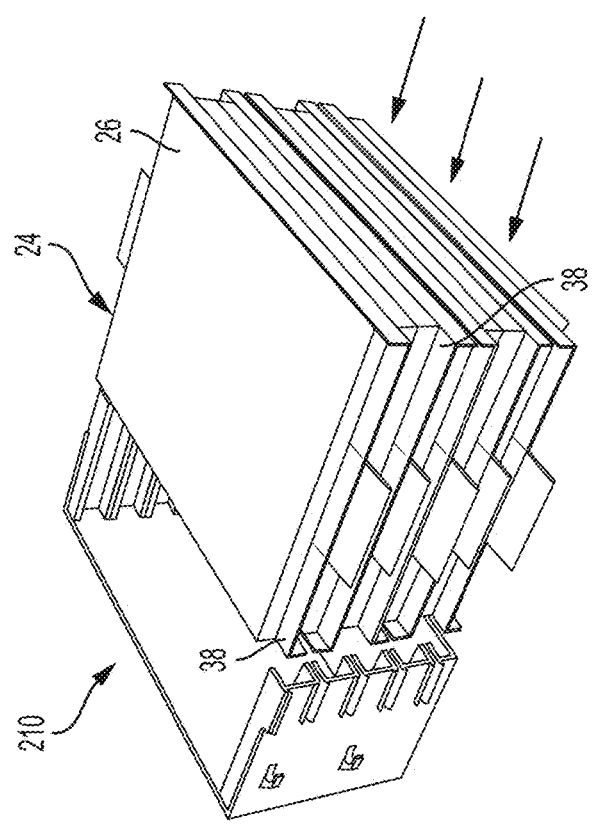
Figure 50C:
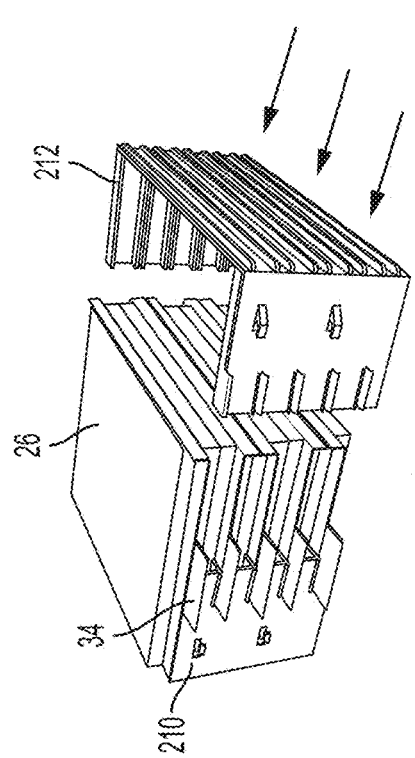
Figure 51B:
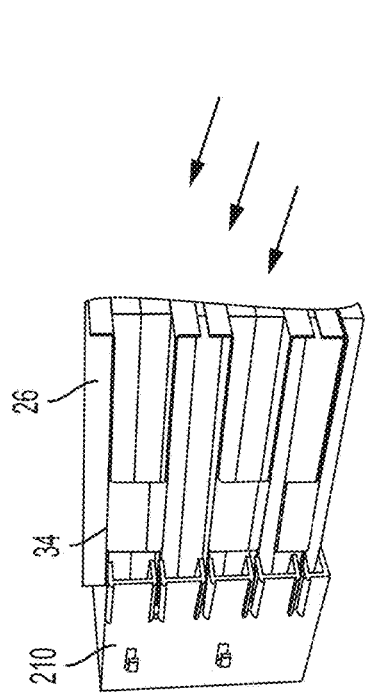
FIGS. 51a-51d are example illustrations of a cell holder having a clamshell configuration.
Figure 51D:
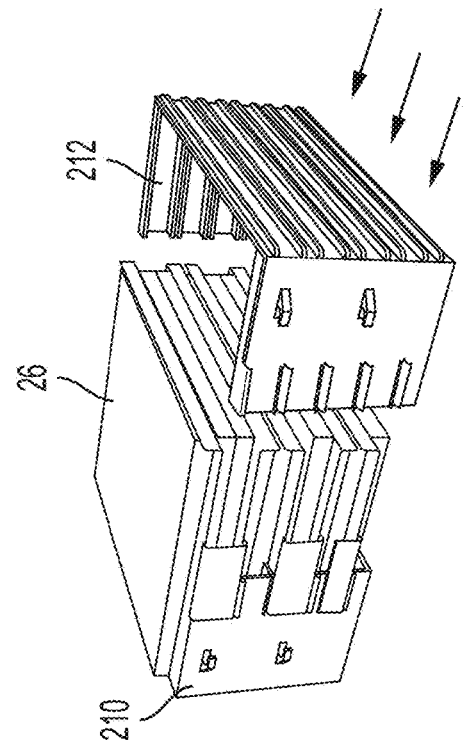
Figure 51A:
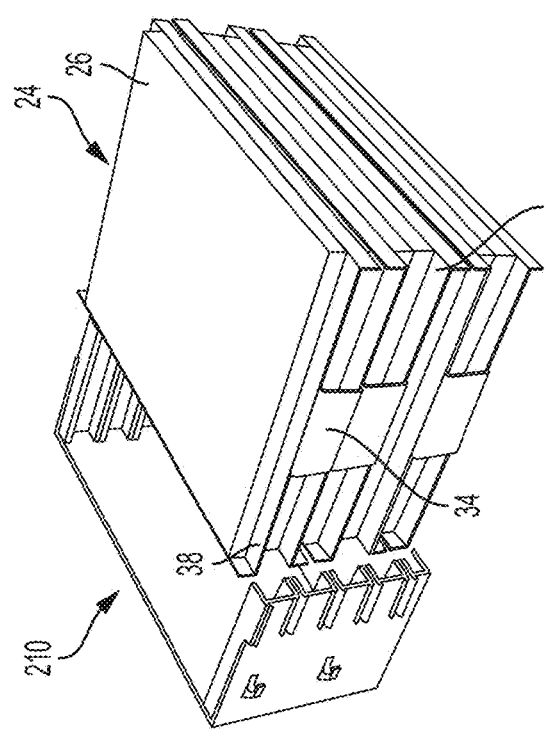
Figure 51C:
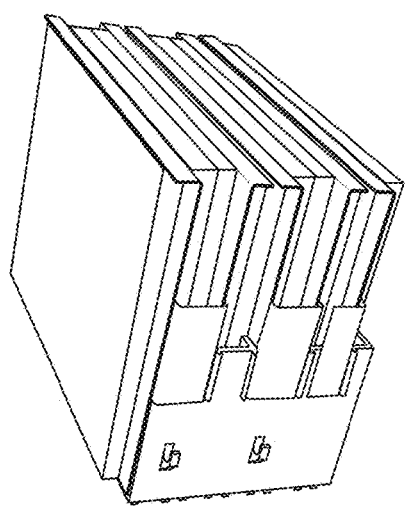
Figure 52B:
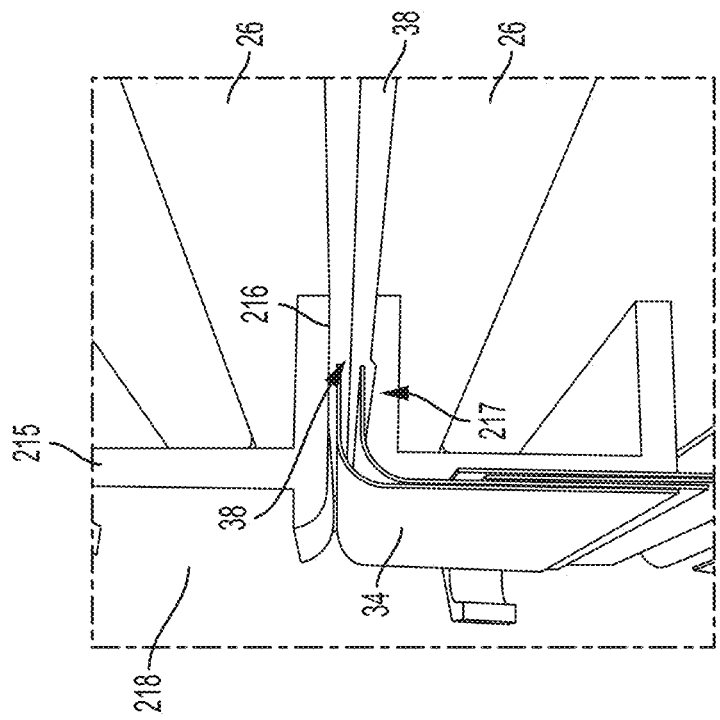
FIGS. 52a and 52b are example illustrations of a cell holder having a clamshell configuration.
Figure 52A:
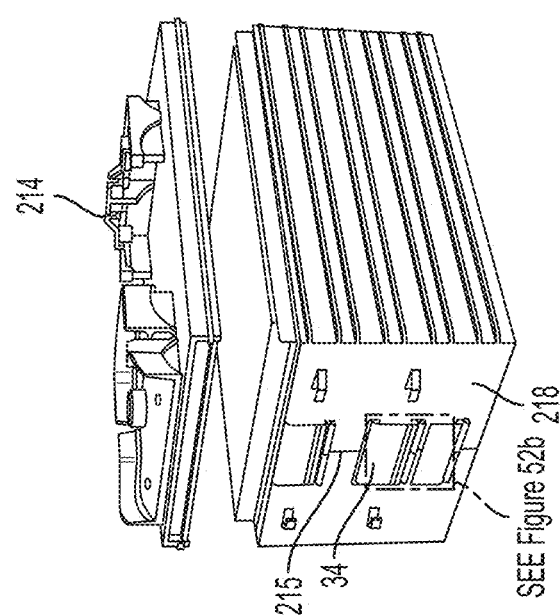
Figure 53:
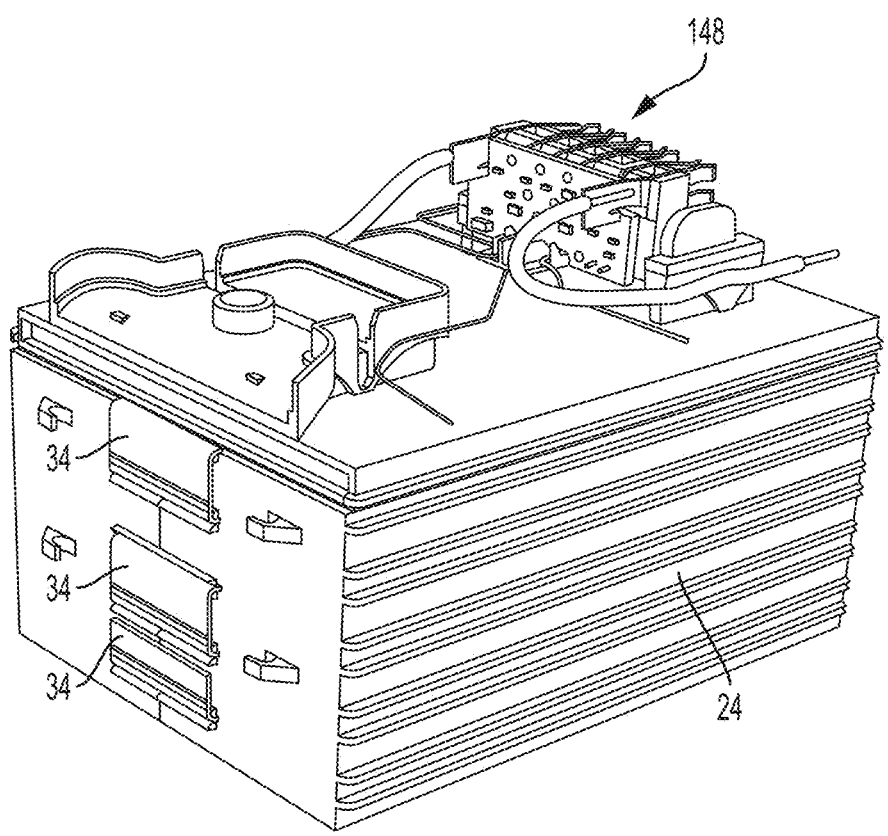
FIG. 53 is an example illustration of a clamshell configuration.

Another general aspect, illustrated in FIGS. 46 and 47, is directed to monitoring the temperature of the pouch cells. In order to effectively monitor the temperature of the cells it is important to position the monitor at the best location on the pouch.

When pouch cells are discharged or charged, there is temperature variation across the cell. Because of the variation of temperature across the cell, it may not be clear which is the optimal location or locations for the cell to be monitored for temperature.

Generally, one should monitor temperature in a location that sees the highest temperatures, to be sure that no other locations of the cell sustain thermal damage. The cell supplier may also advise that certain areas of the cell, though they may see the highest temperatures at the surface of the cell, may not be the correct locations to monitor the cell. FIG. 46 illustrates an exemplary temperature distribution across a pouch cell 26 during discharge.

The solution is for the cell supplier to place a mark or box or other indicating feature 206 on the pouch cell 26 to communicate where the temperature sensing should be located. A thermistor or other temperature sensing device 207 may be placed in the box 206.

Another general aspect is an alternate cell holder 208 that enables a pouch cell battery assembly configuration and process that will allow for an improved assembly process, as well as provide mechanical support for sensitive areas on the pouch cell, and provide for electrical connections that result in a robust construction.

Figure 54:
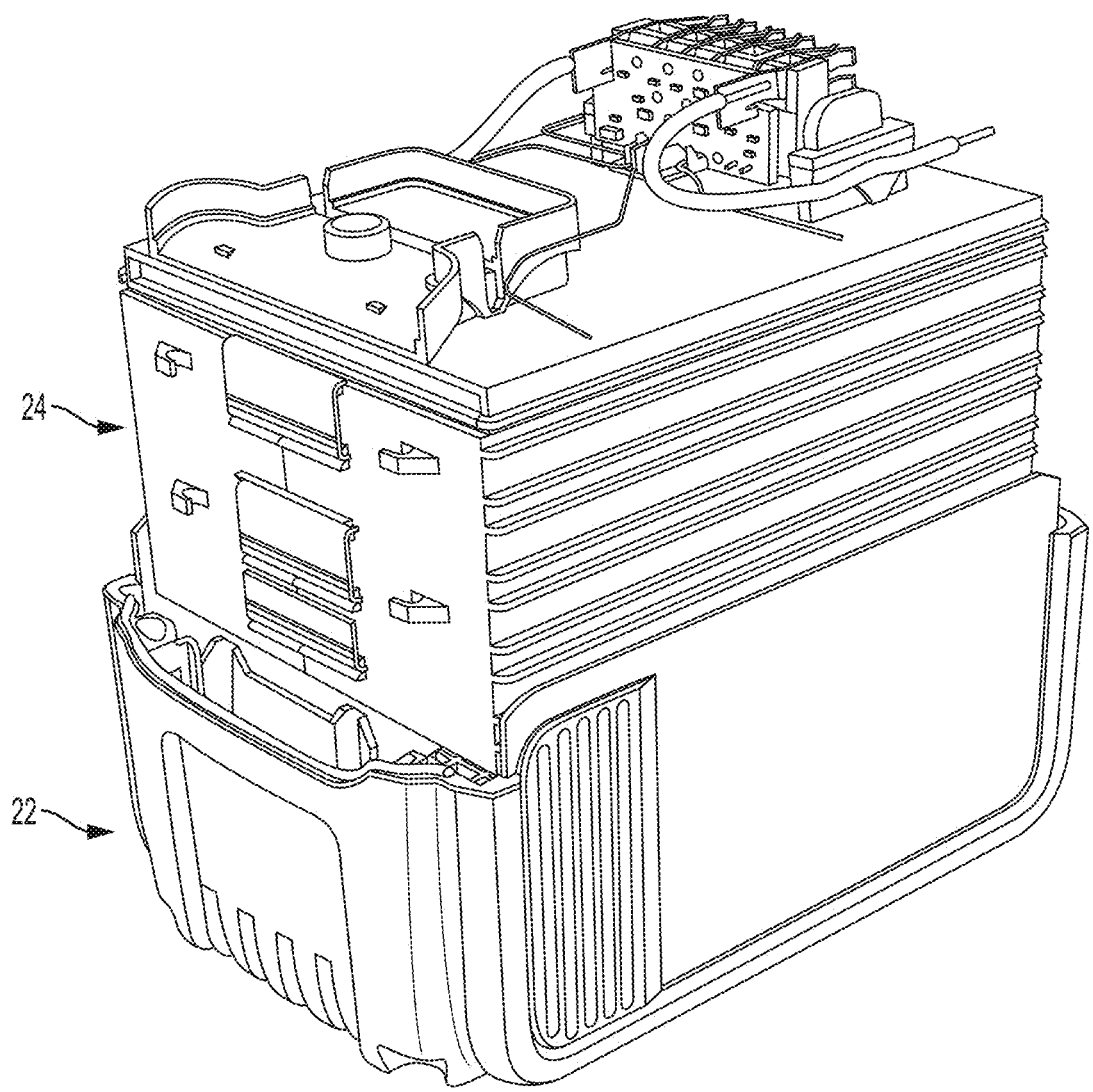
FIG. 54 is an example illustration of a clamshell configuration.

In an example implementation, illustrated in FIGS. 48-54, the cell holder 208 has a clamshell configuration having a clamshell housing including two clamshell housing portions 210, 212. The battery assembly configuration may be one of the battery assembly configurations described above, i.e., linear assembly or stacked assembly and common direction or alternating direction. For example, the basic string assembly configuration, with or without the trays, may be used. As illustrated in FIG. 49, the cells 26 are configured in a stacked assembly using either a string assembly method or a stacked assembly method. The cell tabs 34 may be in an unformed/unbent state prior to insertion into the clamshell housings—as shown in FIGS. 49*a* and 49*b*—or the cell tabs 34 may be in a formed/bent state prior to insertion into the clamshell housings—as shown in FIGS. 49*c* and 49*d*. The cell tabs may be connected by welding or some other connection method either before after the cells are in the final stacked assembly and either before or after they are inserted into the clamshell housings 210, 212. The battery 24, comprising the plurality of pouch cells 26, is slid into a first of the clamshell housing portions 210. Thereafter, the second of the clamshell housing portions 212 is slid onto the battery 24. The first and second clamshell housing portions 210, 212 are coupled together, for example by a snap fit connection, to form a clamshell assembly unit. Thereafter, a cell top cover 214 is coupled to the clamshell assembly unit, for example by a snap fit connection. Other mechanical connection methods may be used in place of the snap fit connections. Thereafter, sense wires/straps and power wires/straps may be connected to the cell tabs 34 by welding or soldering and then fixed to the clamshell assembly using, for example, wire hooks. As illustrated in FIG. 54, once the clamshell assembly is complete, it is placed in the battery housing 22.

As illustrated in FIG. 48, the clamshell housing includes slots 216 bounded by ribs 217 on the interior surface of a front wall 218 of each clamshell portion 210, 212 and slots 216 bounded by ribs 217 on the interior surface of the rear wall 219 of each clamshell portion 210, 212 that may compress the short side of the heat seal 38 of a conventional pouch cell 26. A portion of the slot 216 extends through the front wall 218 to receive the tab(s) 34 of a set of cells 26. The ribs 217 on either side of a slot 216 are angled with respect to each other such that the ribs 217 approach each other as they move from an interface 215 between the two clamshells 210, 212. In other words, a height of the slot 216 of each clamshell half gets smaller as the slot 216 moves from the mating line with the corresponding clamshell half. As such, as the battery 24 slides into the clamshell 210 and the heat seal 38 slides into the slot 216, the ribs 217 will engage the heat seal 38 and provide a compressive force thereon. The compression is designed to: (1) Constrain the pouch cell 26 tightly at the seal edge 38 such that there is no load or stress on the internal chemical and electrical components of the cell 26 such as the separator, electrodes, pouch housing; (2) Distribute the mechanical energy or stress around the seal edge 38 of the cell 26 instead of into the sensitive areas in the cell interior in the event of a mechanical shock or vibration; and (3) apply an additional mechanical pressure on the seal edge 38 of the pouch 28 at specific locations such that during pressure buildup and when desirable, the cell 26 opens in such a way as to direct the release on the internal components of the cell into a known area of the battery pack. This allows the safe and repeatable operation of the cell's venting feature which will protect users from possible contact with electrolyte liquid.

Another general aspect is a method to assemble pouch cell battery packs for power tools in a way that (1) prevents a short circuit connection between adjacent cells, and (2) reduces stresses on cell tabs after connection during configuration into a battery.

Figure 55:
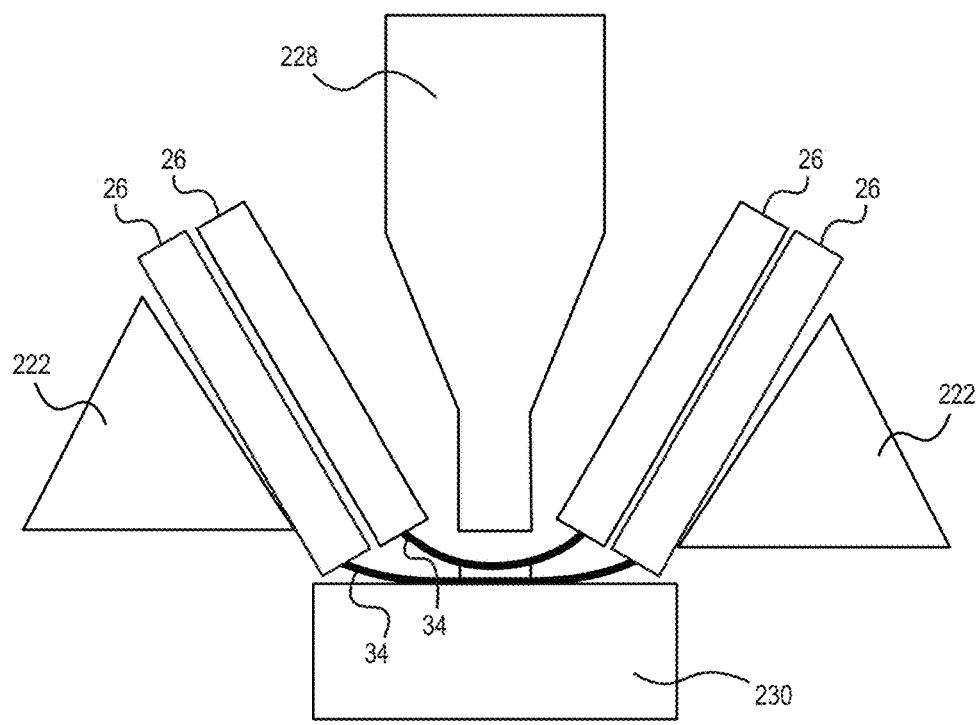
FIG. 55 is an example illustration of a method of assembly of pouch cells to form a battery.

This method for assembly, illustrated in FIG. 55, is described by an assembly fixture that is designed in such a way as to orient two cells in series or parallel at a certain angle from each other so as to (1) allow clearance for a welding or connecting apparatus to pass between pouch cells without placing either cell in a short circuit configuration and (2) orient the cells during the welding or connecting operation in such a way as to place the cell tabs close to the final assembly configuration. With this method, when the cells are manipulated into their final assembly position the stress that is introduced (1) on the cell tabs and/or (2) the connections is much less than other methods.

In an example implementation of this general aspect, a cell assembly apparatus 220 includes two cell holding fixtures 222. Each cell holding fixture 222 holds one of two adjacent sets of cells 26. The set of cells 26 may include one or more cells. The cell holding fixture 222 holds the cell 26 at an angle from the vertical to take up excess material of the tab 26 before welding. In one implementation, the angle is approximately 45°. In an alternate implementation, the cell holding fixtures 222 may hold the cells 26 prior to folding into the stacked configuration. Each cell 26 has a cell tab 34 extending from an end of the cell 26 towards the adjacent cell 26. The cell assembly apparatus 220 includes a welding device 226. The welding device may include a welding anvil 228 and a welding horn/gun 230. The cell tabs 34 rest on the welding anvil 228. The welding horn 230 is positioned above the welding anvil 228. The welding device 226 welds the cell tabs 34 to each other.

This general aspect provides lower stress on the cell connections or welds when the battery is manipulated into a final assembly. This aspect also provides lower risk for connecting cells into a short circuit configuration during assembly.

In another general aspect, there is a battery and a method of manufacturing a battery wherein the battery includes a plurality of pouch cells. The method connects the cell tabs during the assembly process.

Figure 56:
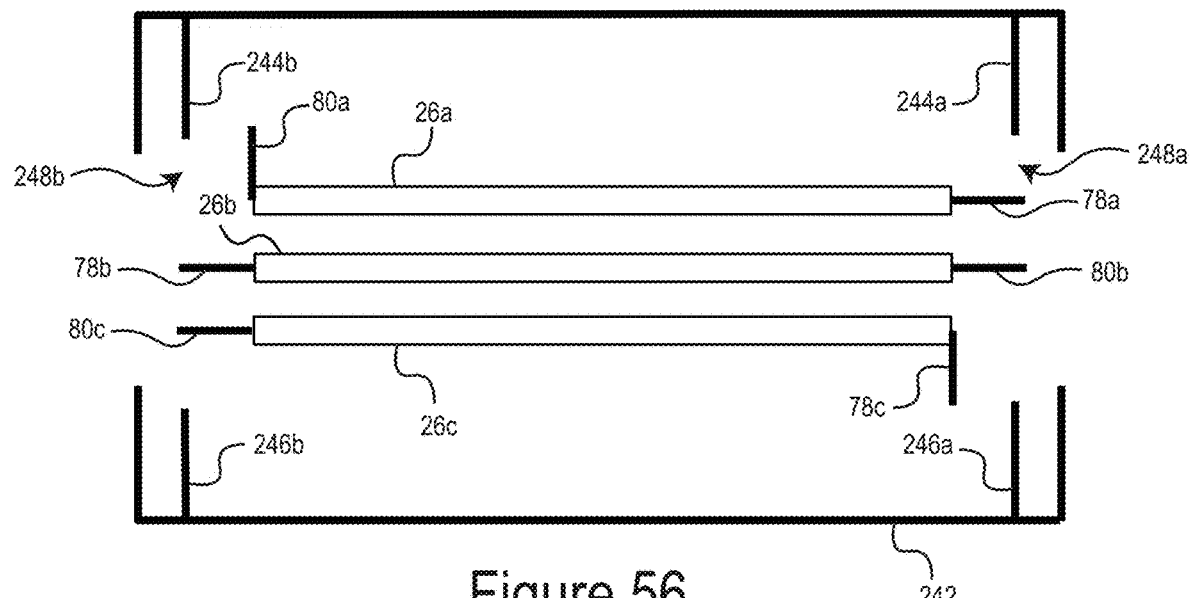
FIG. 56 is an example illustration of a method of assembly of pouch cells to form a battery including connecting the cell tabs during the assembly process.

In a first implementation of this aspect illustrated in FIG. 56, there is a battery housing 22 having a top housing portion 240 and a bottom housing portion 242. The top housing portion 240 includes a pair of pincher elements 244a, 244b extending towards the bottom housing portion 242 from each end of the top housing portion 240. The bottom housing portion 242 includes a pair of pincher elements 246a, 246b extending towards the top housing portion 240 from each end of the bottom housing portion 242. Each bottom housing portion pincher element 246a, 246b is aligned with a respective one of the top housing portion pincher elements 244a, 244b.

The battery 24 includes a plurality of pouch cells 26. Each pouch cell 26 includes a positive cell tab 80 and a negative cell tab 78. A first pouch cell positive tab 80a extends from a first end of a first cell 26a and is configured to be directed towards the top housing portion 240. A first pouch cell negative tab 78a extends from a second end of the first cell 26a that is opposed to the first end and extends to a space 248a between a first top housing portion pincher element 244a and a first bottom housing portion pincher element 246a. A second pouch cell positive tab 80b extends from a second end of a second cell 26b and extends to the space 248a and is generally parallel with the negative tab 78a of the first pouch cell 26a. A second pouch cell negative tab 78b extends from a first end of the second pouch cell 26b and extends to a space 248b between a second top housing portion pincher element 244b and a second bottom housing portion pincher element 246b. A third pouch cell positive tab 80c extends from a first end of a third pouch cell 26c to the space 248b and is generally parallel with the negative tab 78b of the second pouch cell 26b. The third pouch cell negative tab 78c extends from a second end of the third pouch cell 26c towards the bottom housing portion 242.

Figure 57:
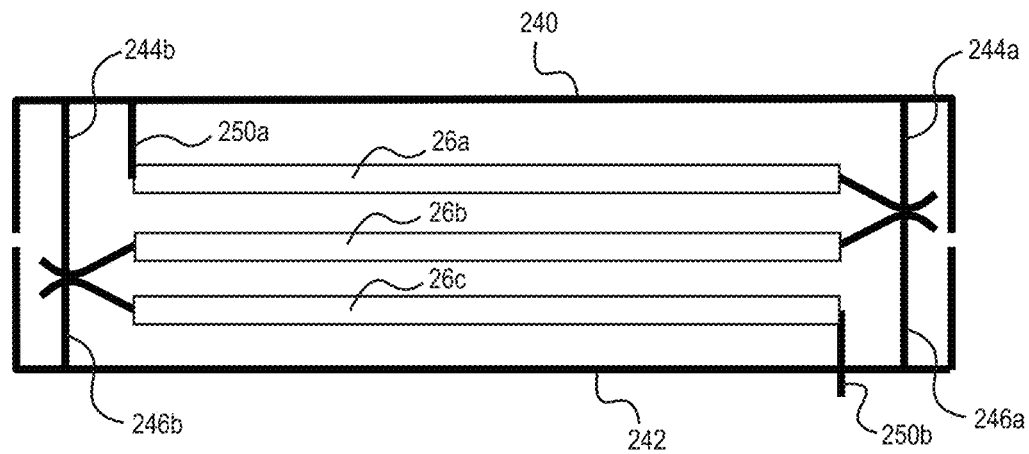
FIG. 57 is an example illustration of part of the assembly method of FIG. 56.

As illustrated in FIG. 57, upon bringing the top housing portion 240 and the bottom housing portion 242 together the top housing portion pincher elements 244 and the bottom housing portion pincher elements 246 pinch the cell tabs 78, 80 together—the first top housing portion pincher element 244a and the first bottom housing portion pincher element 246a pinch the first cell negative tab 78a and the second cell positive tab 80a together and the second top housing portion pincher element 244b and the second bottom housing portion pincher element 246b pinch the second cell negative tab 78b and the third cell positive tab 80c together—thereby electrically connecting the cell tabs of adjacent cells. In addition, the positive tab 80a of the first cell 26a extends through an opening 250a in the top housing portion 240 and the negative tab 78c of the third cell 26c extends through an opening 250b in the bottom housing portion 242. The battery 24 may include more or less cells 26 but the connections will be made in a similar manner regardless of the number of cells.

Figure 58:
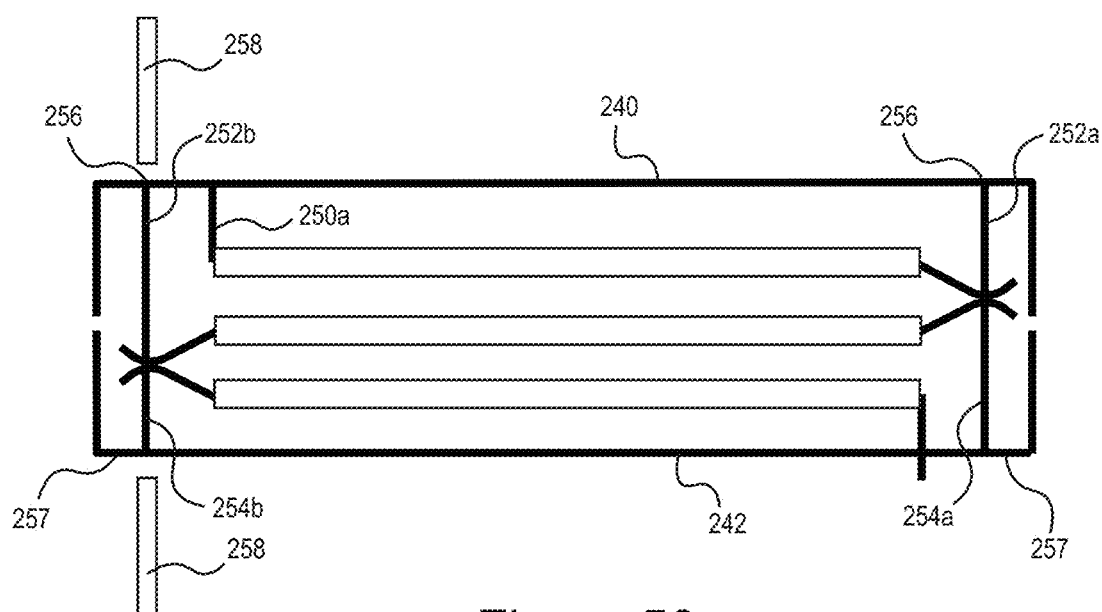
FIG. 58 is an example illustration of an implementation of the assembly method of FIG. 56.

In another example implementation illustrated in FIG. 58, the top housing portion 240 includes insert elements 252 instead of pincher elements and the bottom housing portion 242 includes insert elements 254 instead of pincher elements. A first end of each top housing portion insert element 252 extends through an opening 256 in the top housing portion 240 to expose the top housing portion insert element 252 outside the top housing portion 240 but is flush with an exterior surface of the top housing portion 240. A first end of each bottom housing portion insert element 254 extends through an opening 256 in the bottom housing portion 242 to expose the bottom housing portion insert element 254 outside the bottom housing portion 242 but is flush with an exterior surface of the bottom housing portion 242. A second end of each top housing portion insert element 252 extends toward a corresponding bottom housing portion insert element 244. In other words, the second end of a first top housing portion insert element 252a extends towards and is aligned with the second end of a first bottom housing portion insert element 254a and the second end of a second top housing portion insert element 252b extends towards and is aligned with the second end of a second bottom housing portion insert element 254b. This is very similar to the implementation described above. Furthermore, the cell tabs 78, 80 are positioned between the inserts 252, 254 in a fashion similar to the implementation described above. When the top housing portion 240 and the bottom housing portion 242 are clamped together the inserts 252, 254 pinch the cell tabs 78, 80 positioned therebetween together. In a first implementation, the inserts 252, 254 are made of a metal material and after the top and bottom housing portions 240, 242 are clamped together external resistive electrodes 258 contact the exposed first end of the metal inserts 252, 254. An electric current is sent through the electrodes 258 and the inserts 252, 254 and the tabs 78, 80 are welded together. In a second implementation, the inserts 252, 254 are made of a non-conductive material that will transmit an ultrasonic signal and after the top and bottom housing portions 240, 242 are clamped together external horns contact the exposed first end of the non-metallic inserts 252, 254. An ultrasonic signal is sent through the horns and the inserts 252, 254 and the tabs 78, 80 are welded together.

In another example implementation, the housing portions 240, 242 include pincher elements 244, 246 as in the implementation described above. The housing portions 240, 242 include openings to allow external electrodes access to the cell tabs 78, 80 through the housing portion openings to weld the tabs 78, 80 together.

Figure 59B:
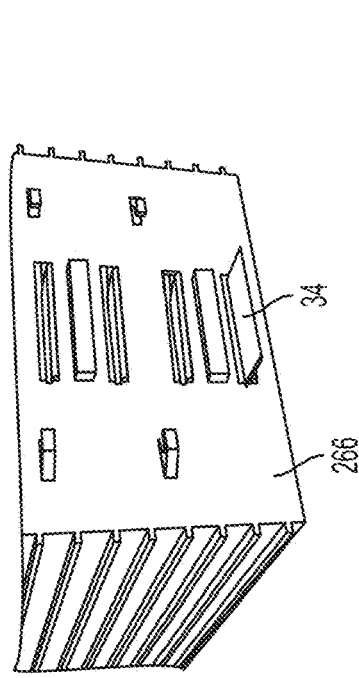
FIGS. 59a-59c are example illustrations of a pouch cell battery assembly configuration and process for assembling a battery.
Figure 59C:
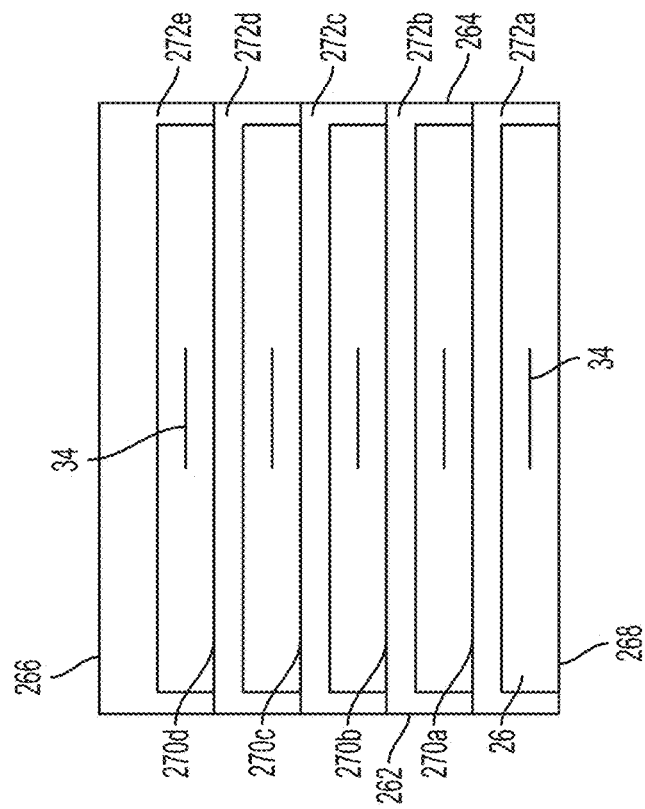
Figure 59A:
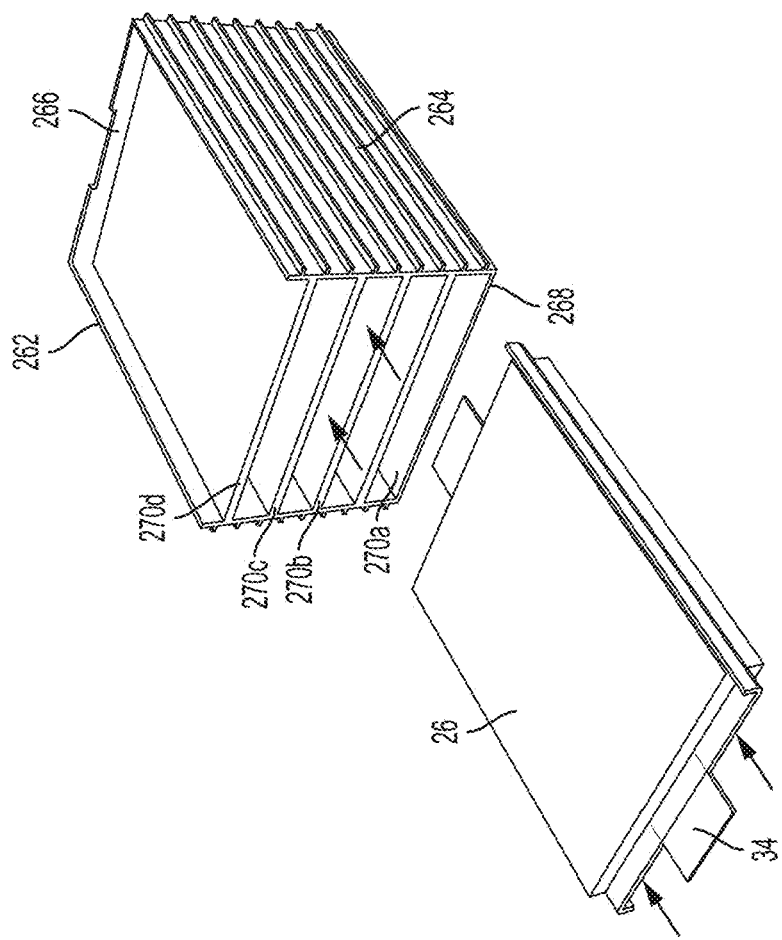
Figure 60:
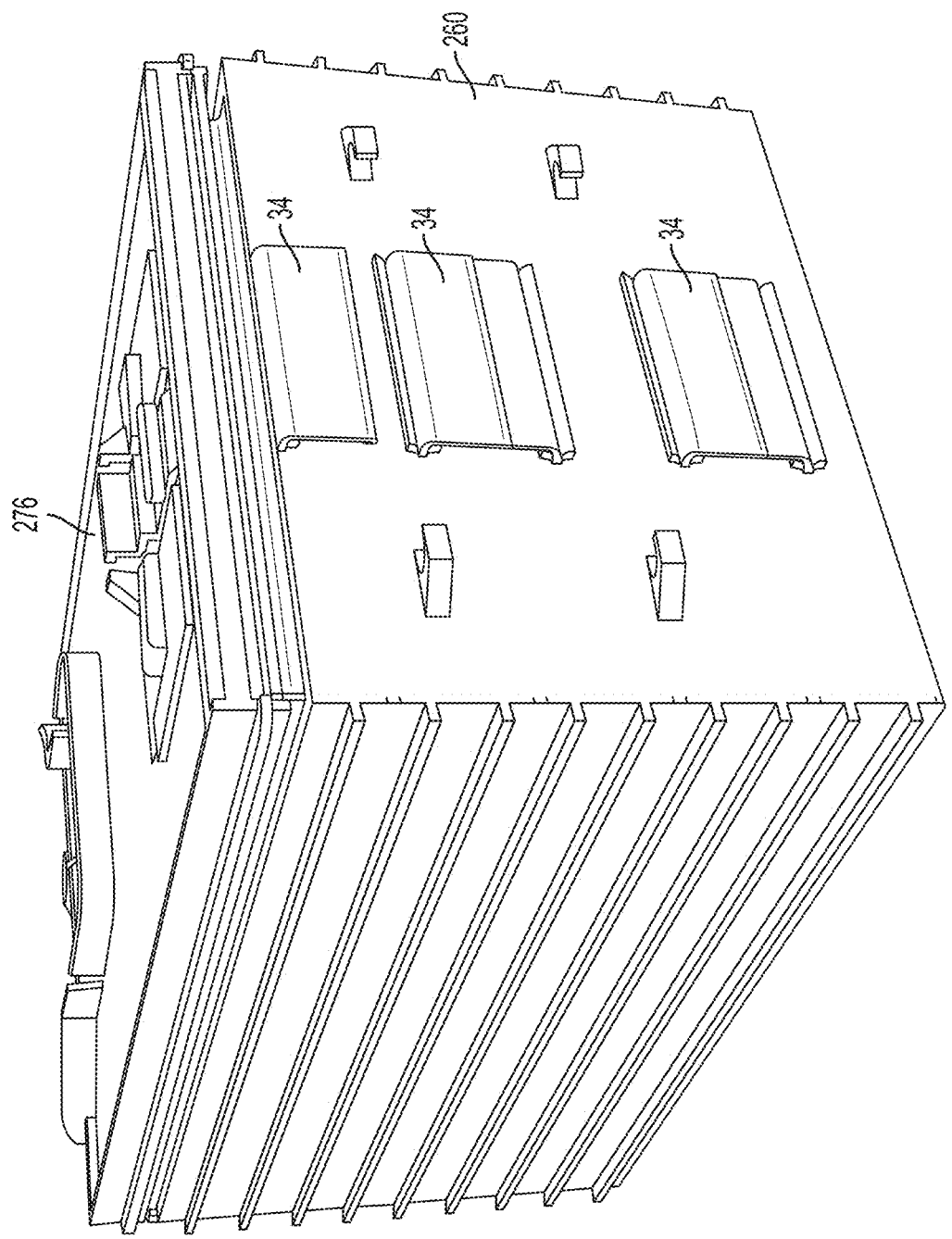
FIG. 60 is an example illustration of the battery of FIGS. 59a-59c.

Another general aspect is a pouch cell battery assembly configuration and process for assembling a battery. As illustrated in FIGS. 59-65, the battery 24 includes a plurality of sets of pouch cells 26. Each set of cells 26 may include one or more cells 26. The battery 24 also includes a cell cartridge 260. The cell cartridge 260 includes a pair of parallel side walls 262, 264 and a rear wall 266 perpendicular to and connecting the side walls 262, 264. The cell cartridge 260 also includes a bottom wall 268 perpendicular to the rear wall 266 and the side walls 262, 264 and connecting bottom edges of the rear wall 266 and the side walls 262, 264. The cell cartridge 260 also includes a plurality of shelves 270 parallel to the bottom wall 268 and perpendicular and connected to the rear wall 266 and the side walls 262, 264. A plurality of cavities or slots 272 is formed by the bottom wall 268/the shelves 270/side walls 262, 264/rear wall 266. In other words, as illustrated in FIG. 59a, the bottom wall 268, a first shelf 270a just above the bottom wall 268, the side walls 262, 264 and the rear wall 266 form a first cavity/slot 272a; the first shelf 270a, a second shelf 270b just above the first shelf 270a, the side walls 262, 264 and the rear wall 266 form a second cavity/slot 272b, the second shelf 270b, a third shelf 270c just above the second shelf 270b, the side walls 262, 264 and the rear wall 266 form a third cavity/slot 272c, and the third shelf 270c, a fourth shelf 270d just above the third shelf 270c, the side walls 262, 264 and the rear wall 266 form a fourth cavity/slot 272d. In a first implementation the cell cartridge 260 does not include a top wall and as such the fourth shelf 270d, the side walls 262,264 and the rear wall 266 form a fifth open-top cavity/slot 272e. In an alternate implementation, the cell cartridge 260 includes a top wall and the fifth cavity/slot 272e would be formed by the fourth shelf, the top wall, the side walls and the rear wall. In the illustrated implementation there are five cavities/slots. The number of cavities/slots corresponds to the number of sets of pouch cells 26. Alternate implementations may include more or less sets of pouch cells and corresponding cavities/slots.

The cavities/slots are dimensioned to receive a single set of pouch cells. If the set of pouch cells includes a single pouch cell than the cavity/slot will be dimensioned to receive a single pouch cell. If the set of pouch cells includes two pouch cells than the cavity/slot will be dimensioned to receive two pouch cells. The rear wall 266 includes a plurality of openings 274 configured and positioned to receive the cell tab(s) 34 of each set of cells when the set of cells 26 is fully inserted into its respective cavity 272. As illustrated in FIG. 59, prior to inserting the set of cells into the cavity, the cell tab(s) are configured in a plane parallel with the insertion direction of the cell(s) into the cavity. As illustrated in FIG. 59a, each set of pouch cells 26 is slid into a cavity 272. Once the pouch cells are inserted into the cavity they may be fixed in the cavity/slot by an adhesive or a mechanical fixture.

Once each set of cells is inserted into the respective cavity and the cell tabs are received through the rear wall opening 274, the tabs of intermediate cells may be formed or bent such that tabs of adjacent sets of cells overlap each other. In addition, a cell top cover 276 may be placed connected to the cell cartridge holder 260.

Figure 61A:
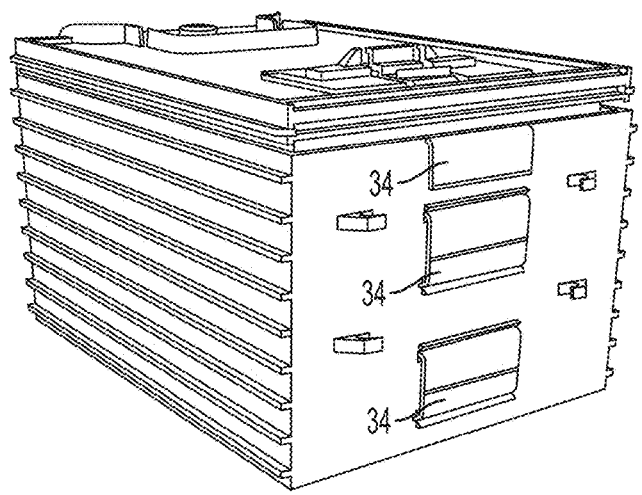
FIGS. 61a and 61b are example illustrations of the battery of FIGS. 59a-59c.
Figure 61B:
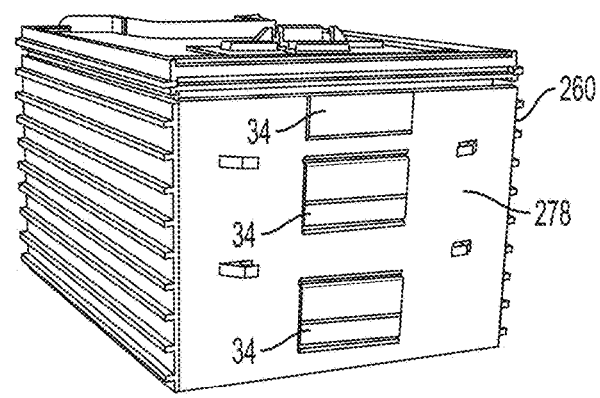
Figure 62:
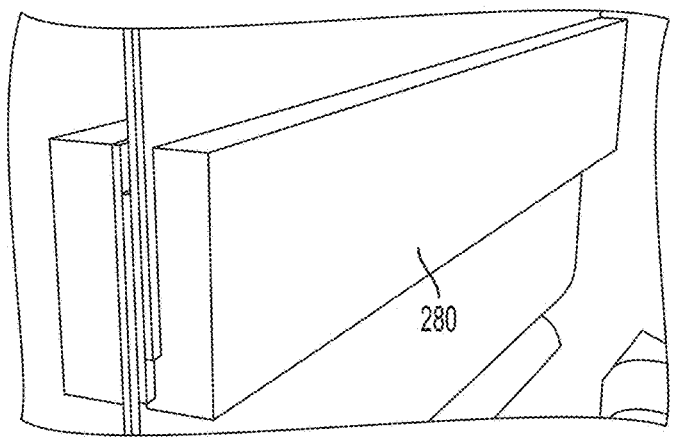
FIG. 62 is an example illustration of an alternate implementation of the battery of FIGS. 59a-59c using a crimp style connection.

Thereafter, as illustrated in FIGS. 61 and 62, the overlapping rear cell tabs may be electrically connected to each other through any conventional method such as, for example, resistance welding, ultrasonic welding or soldering. The rear wall 266 of the cell cartridge holder 260 may serve as a backing material for the connection process. Thereafter, sense wires/straps may be connected to overlapping cell tabs and a power wire/strap may be connected to the top cell tab and the bottom cell tab. In addition or alternatively, a PCB 278 may be attached to the rear wall 266. The PCB 278 includes a plurality of openings corresponding to the openings 274 in the rear wall 266. The cell tabs may be connected to each other and the PCB through any conventional method such as, for example, resistance welding, ultrasonic welding or soldering. The PCB may be used to make the sense connections and the power connections or the sense wires/straps may be connected to overlapping cell tabs and a power wire/strap may be connected to the top cell tab.

In an alternate implementation, illustrated in FIG. 62, a crimp style connector 280 may be used to electrically and mechanically connect the overlapping cell tabs. In addition, sense wires/straps and power wires/straps may be mechanically and electrically connected to the cell tabs by a compression element integral to the cell cartridge holder 260. This would eliminate the need for welding or soldering the wires to the tabs.

Figure 63A:
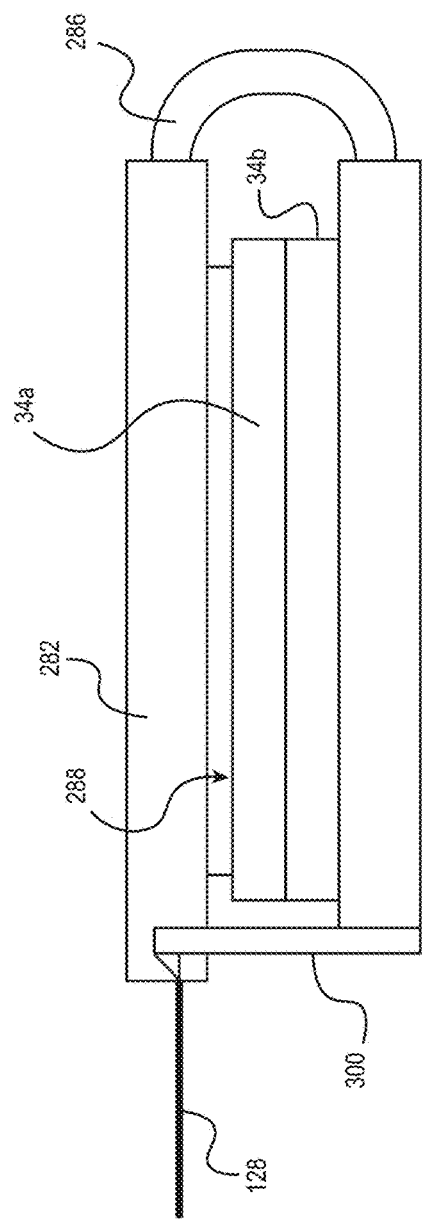
FIGS. 63a and 63b are example illustrations of an alternate implementation of the battery of FIGS. 59a-59c using an alternate implementation of the crimp style connection.
Figure 63B:
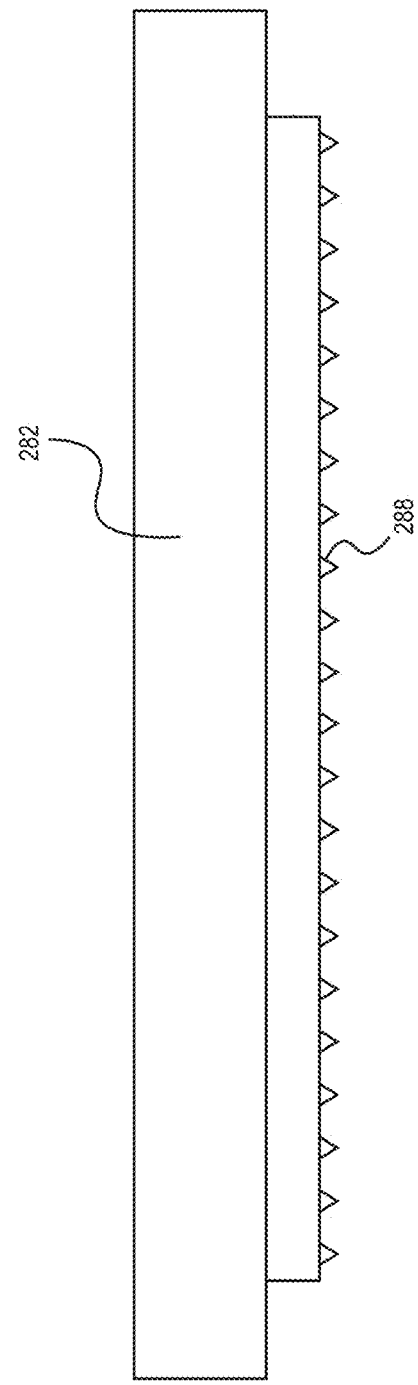

In alternate implementation of the crimp style connector, illustrated in FIG. 63, the connector includes an inner crimp blade 282 attached to an outer surface of the rear wall 266, an outer crimp blade 284 connected to the inner crimp blade 282 by a hinge 286. The hinge 286 allows the outer crimp blade 284 to open relative to the inner crimp blade 282 to accept the tabs 34 of adjacent cells 26 as the tabs 34 are bent into an overlapping configuration. The inner crimp blade 282 and/or the outer crimp blade 284 may include knurled or spiked interior surface or layer 288. The knurls or spikes engage and may even penetrate the cell tabs to provide a strong connection between the crimp and the tabs. Once the tabs 34 are bent into the overlapping configuration the outer crimp blade 284 is rotated to engage the overlapping tabs 34. The crimp 280 may include a retention element 300 to hold the outer crimp blade 284 in a fixed position relative to the inner crimp blade 282 to fully engage the tabs 34 and hold the adjacent tabs 34 in a fixed position relative to each other and provide an electrical and mechanical connection between the adjacent tabs 34. In addition, a sense wire/strap 128 may be incorporated in the crimp 280. For example, the sense wire/strap 128 may be incorporated in the inner crimp blade 282 and electrically connected to the knurled/spiked surface/layer 288 to electrically connect to the tab 34.

Figure 64A:
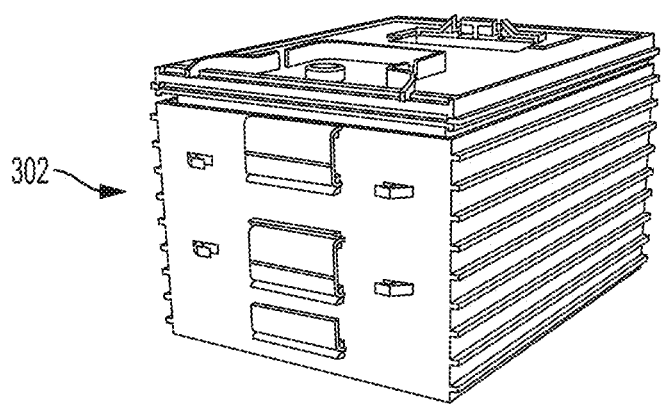
FIGS. 64a and 64b are example illustrations of a front tab connection of the battery of FIGS. 59a-59c.
Figure 64B:
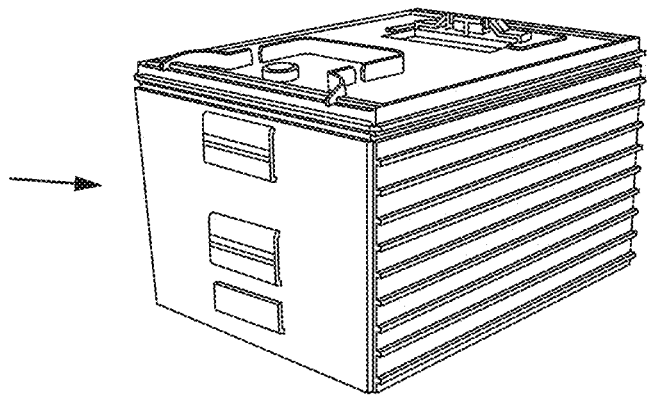
Figure 65:
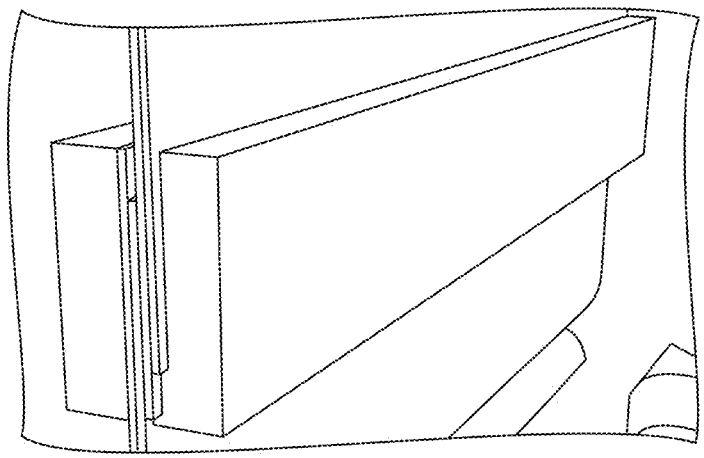
FIG. 65 is an example illustration of the front tab connection of the battery of FIGS. 59a-59c.
Figure 66:
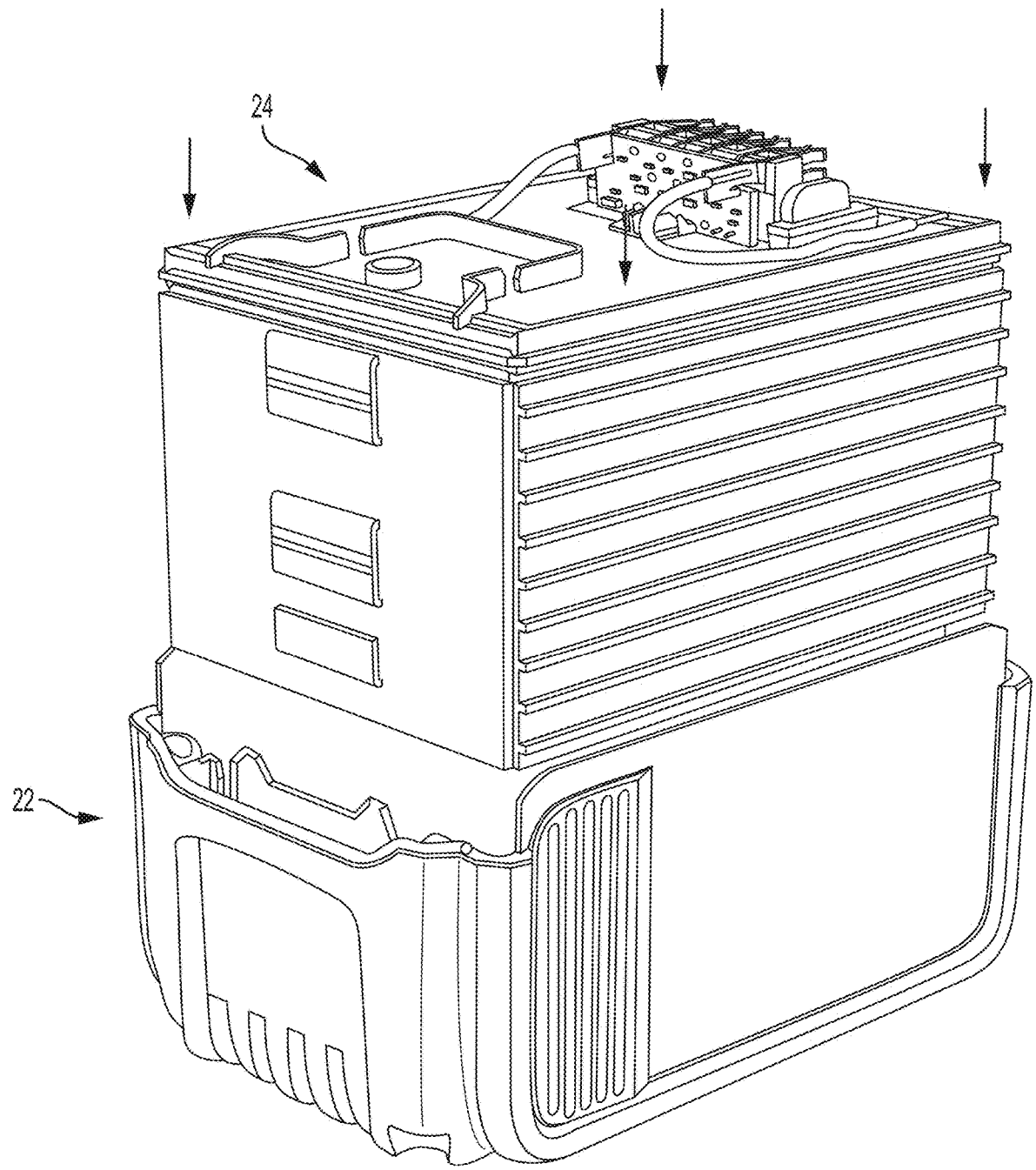
FIG. 66 is an example illustration of the assembled battery of FIGS. 59a-59c inserted into a battery housing bottom.

As illustrated in FIGS. 64 and 65, a front cover or cap 302 is connected to the open end of the cell cartridge holder 260. Similar to the rear wall 266, the front cover 302 includes a plurality of openings 304 to receive the cell tabs 34. The front cover 302 may be connected to the cell cartridge holder 260 in any conventional method, for example snap fit connections. Once the front cover 302 is connected to the cell cartridge holder 260, the tabs of intermediate cells may be formed or bent such that tabs of adjacent sets of cells overlap each other. The cell tabs 34 may be electrically and mechanically connected to each other in a manner similar to the connection methods described above with regard to the rear wall connections. The sense and power wires are not illustrated in these figures for purposes of simplicity.

Once the battery assembly is complete, the battery 24 may be inserted into a battery housing bottom.

This implementation provides a design of a power tool battery pack and a method of assembly which has the following benefits: (1) additional heat sinking through the use of a housing which directly contains the cells to allow the pouch cell battery to dissipate more heat away from the pouch cells during charging and discharging operation; (2) Connecting the pouch cell tabs to a printed circuit board that in turn allows the sense lines for each set of cells and the power lines to be connected to a battery management unit; (3) Additional mechanical constraint, to protect the cells from shock and vibration, as well as isolating the cells from each other electrically and mechanically; (4) compression on the largest side of the pouch cells which may provide benefits to cell performance and cell impedance; and (5) features that allow the pouch cell tabs to be connected together in such a way that welding, such as ultrasonic welding or resistance welding, are not needed to make the appropriate mechanical or electrical connection.

Another general aspect is an assembly that addresses swelling of the pouch cells. As noted above, a battery 24 having a plurality of pouch cells 26 may swell during charge and/or discharge. Referring to FIGS. 67a and 67b, to address this situation, an inter-cell substrate or inter-cell layer 310 of compressible material, for example foam, may be placed between adjacent cells 26. In its normal or not swelled state, the pack 24 has a predefined height H which equals which equals the height of the cells 26 in their normal/not swelled state I times the number of cells 26 in the battery 24 plus the height of the inter-cell layer 310 in their uncompressed state J times the number of inter-cell layers 310 in the battery 24. In the example implementation illustrated in FIG. 67 the battery height $H=5 \times I + 4 \times J$. Above and below the battery 24 is an immovable layer, for example the top and bottom of the battery pack housing 22. As the top and bottom layers of battery pack housing 22 are immovable, the top pouch cells 26a will expand downwards towards the bottom of the battery 24 and the bottom pouch cell 26e will expand upwards towards the top of the battery 24. The intermediate pouch cells 26b, 26c, 26d may expand in both the up and down directions. When the battery 24 experiences a swelling condition, the pouch cells 26 will expand as described above. As the cells 26 expand the inter-cell layers 310 will compress while maintaining the same battery height H. In addition, the inter-cell layer 310 may include thermal heat sinking properties, address dimensional tolerances in the manufacturing process, mechanically couple the cells 26 together and distribute compressive forces on the battery 24.

It is well known that pouch cells expand when they overcharge or overheat. The pouch cells expand due to the mechanical expansion of the active materials in the cells and due to the creation of gas inside the pouch. One general aspect addresses the situation when the pouch cells expand. If the pouch expands too much it could cause safety, reliability and/or performance issues with the battery pack.

A first general aspect uses the expansion of the pouch to permanently or temporarily disable the battery by creating an open circuit in the battery circuit.

Figure 68B:
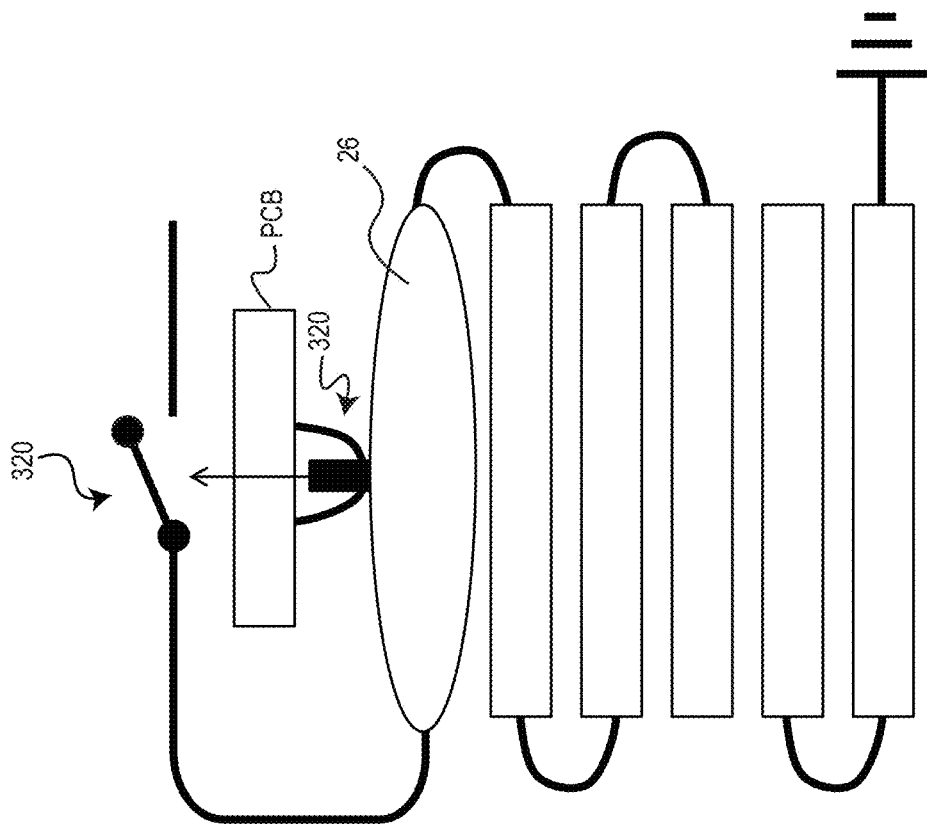
FIGS. 68a and 68b are example illustrations of pouch cells assembled to form a battery and configured to disable the battery upon pouch expansion.
Figure 68A:
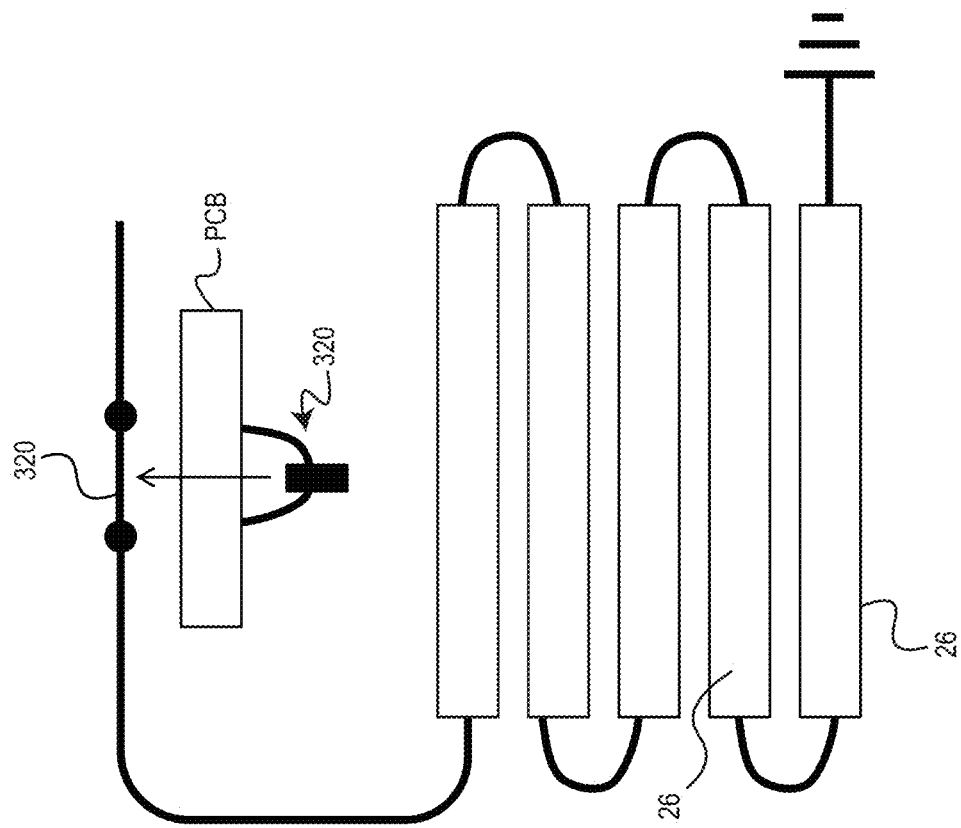
Figure 69B:
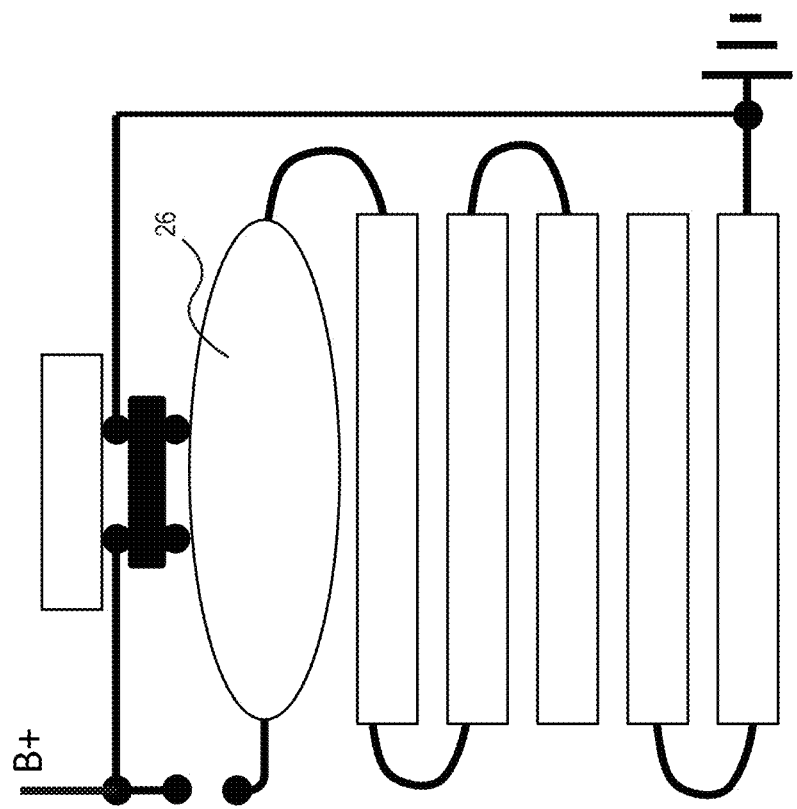
FIGS. 69a and 69b are example illustrations of pouch cells assembled to form a battery and configured to disable the battery upon pouch expansion.
Figure 69A:
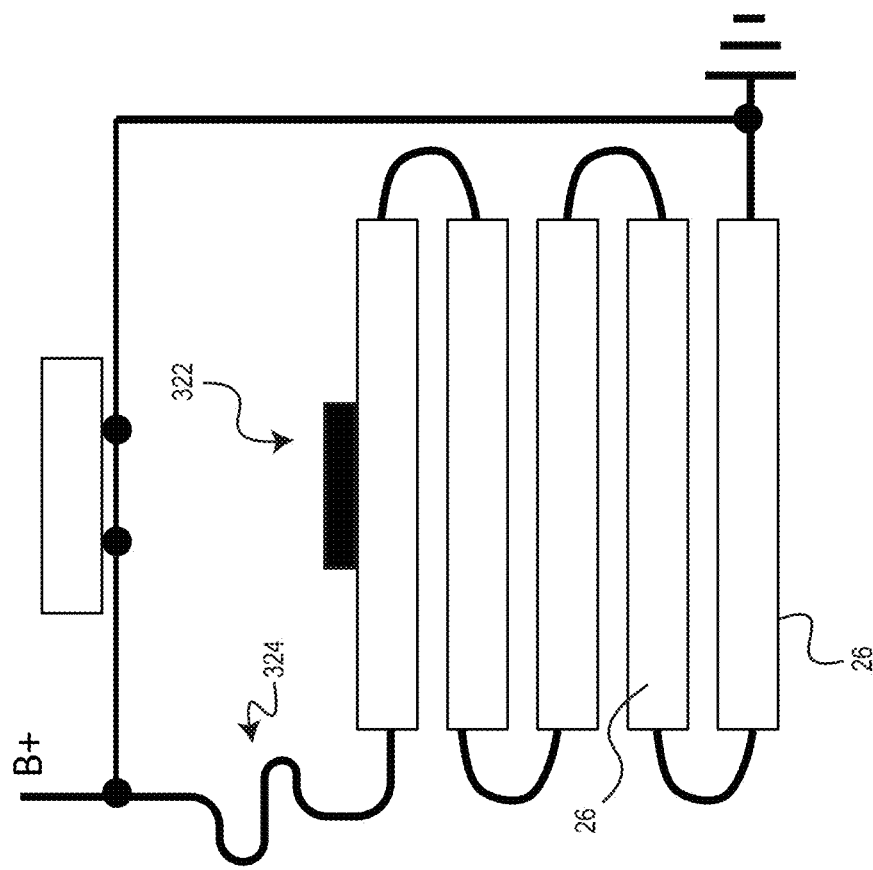
Figure 72:
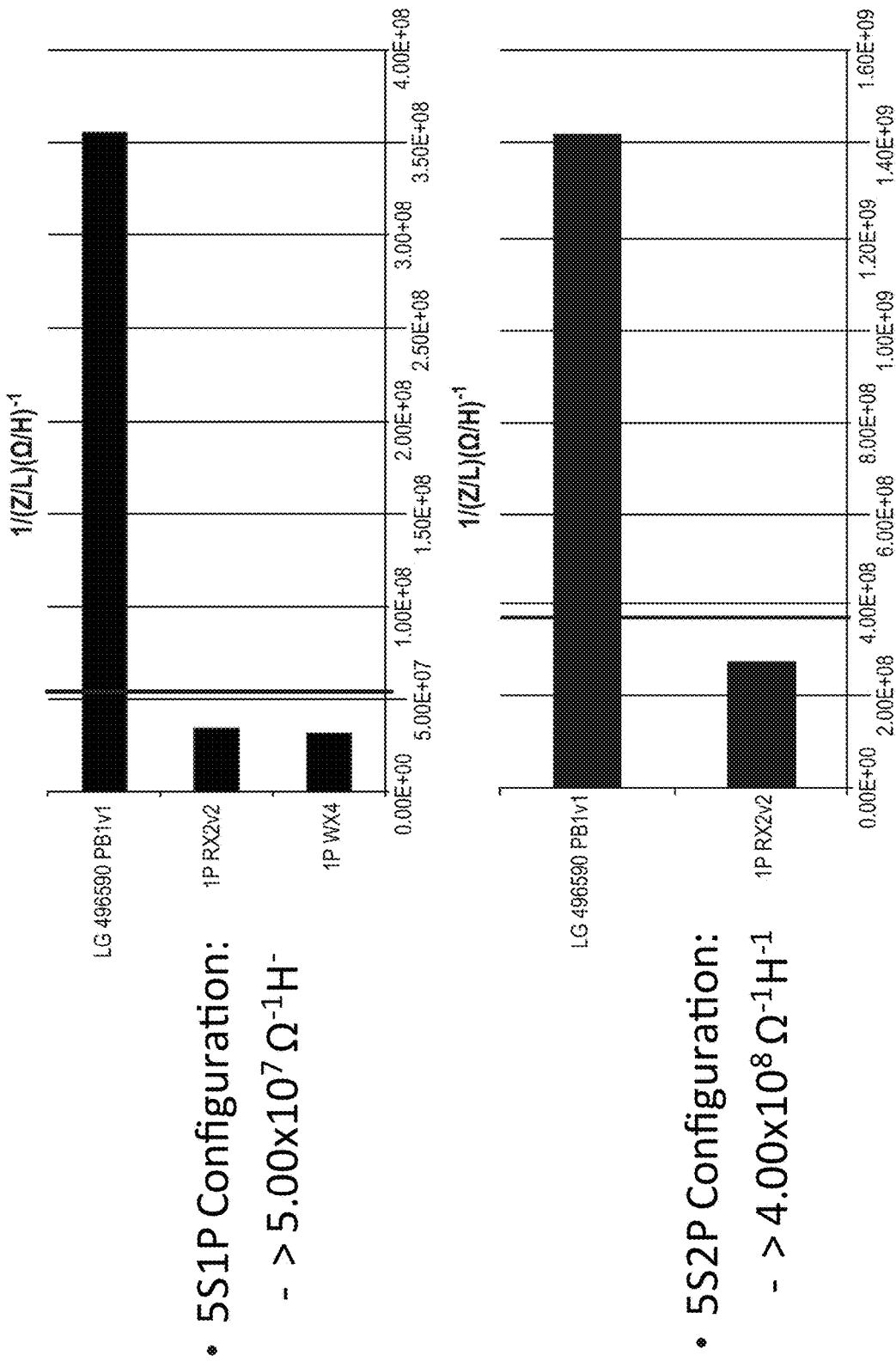
FIG. 72 is an example illustration of inductive characteristics for pouch cell batteries.

A first example, illustrated in FIG. 68, uses the expansion of a stack of pouch cells 26 to depress/activate a switch 320 that renders the battery inoperable. In an example implementation, the switch 320 is a MOSFET or other power electronics switching device in the charge or discharge path of the battery. A second example uses the expansion of a stack of pouch cells to break or pull apart a connection between the cells, or between the stack of cells and another battery component. A third example, illustrated in FIG. 69, uses the expansion of the pouch cells 26 to create a short circuit connection across the battery stack. The battery includes a shorting bar 322 that closes an open circuit between the B+ terminal and the B− terminal. In response a current surge is created in the battery stack that activates a fusing element 324 between one or more of the pouch cells 26.

A power tool battery in a 5S1P configuration—the battery includes 5 cells connected in series—that can output (at least) 70% of its rated capacity at 60 A continuous, and at least 15% of its rated capacity at 80 A continuous, the battery pack volume being less than 0.3 L.

In order to achieve these characteristics the battery is charged and then discharged. There are various methods to charge the battery. In an exemplary method, the battery is charged at 3 A constant current until the voltage of each cell reaches 4.2 v. Thereafter, the battery is charged at a decreasing current maintaining a constant voltage until the charging current reaches 50 mA, at which time the charging is terminated. After a 10 minute rest, the battery is discharged to 2.5 v per cell, unless the temperature on the outside of a cell reaches 80° C.+/−1 C during the discharge. The test is run in a 23° C. chamber, and the battery pack is fresh and uncycled. The battery is not subjected to active external cooling during charge or discharge.

A power tool battery in a 5S2P configuration—the battery includes 5 sets of cells with each set of cells including two cells connected in parallel and wherein the 5 sets of cells are connected in series. The cells have a rated voltage of 4.2 v/cell—that can output (at least) 60% of its rated capacity at 100 A continuous, the battery pack volume being less than 0.5 L.

In order to achieve these characteristics the battery is charged and then discharged. There are various methods to charge the battery. In an exemplary method, the battery is charged at 3 A constant current until the voltage of each cell reaches 4.2 v. Thereafter, the battery is charged at a decreasing current maintaining a constant voltage until the charging current reaches 50 mA, at which time the charging is terminated. After a 10 minute rest, the battery is discharged to 2.5 v per cell, unless the temperature on the outside of a cell reaches 80° C.+/−1 C during the discharge. The test is run in a 23° C. chamber, and the battery pack is fresh and uncycled. The battery is not subjected to active external cooling during charge or discharge.

A battery pack with very low inductive characteristics is needed.

FIG. 70 describes an exemplary power tool battery pack which displays an inductance between 0 and 0.20 µH in a 5S1P configuration and an inductance between 0 and 0.10 µH in a 5S2P configuration. In the exemplary power tool battery pack, the battery utilizes cells having a rated voltage of 3.8 volts per cell. The cells may of a pouch, prismatic or cylindrical design. Cells of other rated voltages may be used.

The inductance may be measured by the following exemplary process: (1) providing a high frequency power supply and producing a pulse width modulated signal; (2) charging the battery to 3.8 Volts per cell with the power supply at a constant charging current of 3 A followed by constant voltage at 3.8V with a charging current decrease until the charging current is less than 50 mA; (3) measuring cell parameters including cell OCV, charging current to cell over time—at least 100 Megasamples/second; and (4) calculating the inductance of the battery pack by based on the formula $V(t)=L*di/dt$.

FIG. 71 describes an exemplary power tool battery pack which displays a ratio of inverse impedance and inductance characteristic of greater than $5.00\times10^7 \Omega\text{-}1H^{-1}$ in a 5S1P configuration and greater than $4.00\times10^8 \Omega\text{-}1H^{-1}$ in a 5S2P configuration.

In the exemplary power tool battery pack, the battery utilizes cells having a rated voltage of 3.8 volts per cell. The cells may of a pouch, prismatic or cylindrical design. Cells of other rated voltages may be used. The impedance of the battery pack is to be measured by the AC Impedance method using a Hioki 3560 AC Impedance meter or similar with 4 wire voltage measurements and a measurement frequency of 1 kHz.

FIG. 73 describes an exemplary power tool battery pack which displays a ratio of energy density versus inductance of greater than 0.02 J/H @100 A, greater than 0.05 J/H @80 A and greater than 0.20 J/H @ 60 A, when in the 5S1P configuration.

FIG. 73 describes an exemplary power tool battery pack which displays a ratio of energy density versus inductance of greater than 2.50 J/H @100 A, greater than 2.00 J/H @80 A, and greater than 2.00 J/H @60 A, when in the 5S2P configuration.

In the exemplary power tool battery pack, the battery utilizes cells having a rated voltage of 3.8 volts per cell. The cells may of a pouch, prismatic or cylindrical design. Cells of other rated voltages may be used. The energy density of the battery pack is to be calculated by the method previously described above.

Figure 74:
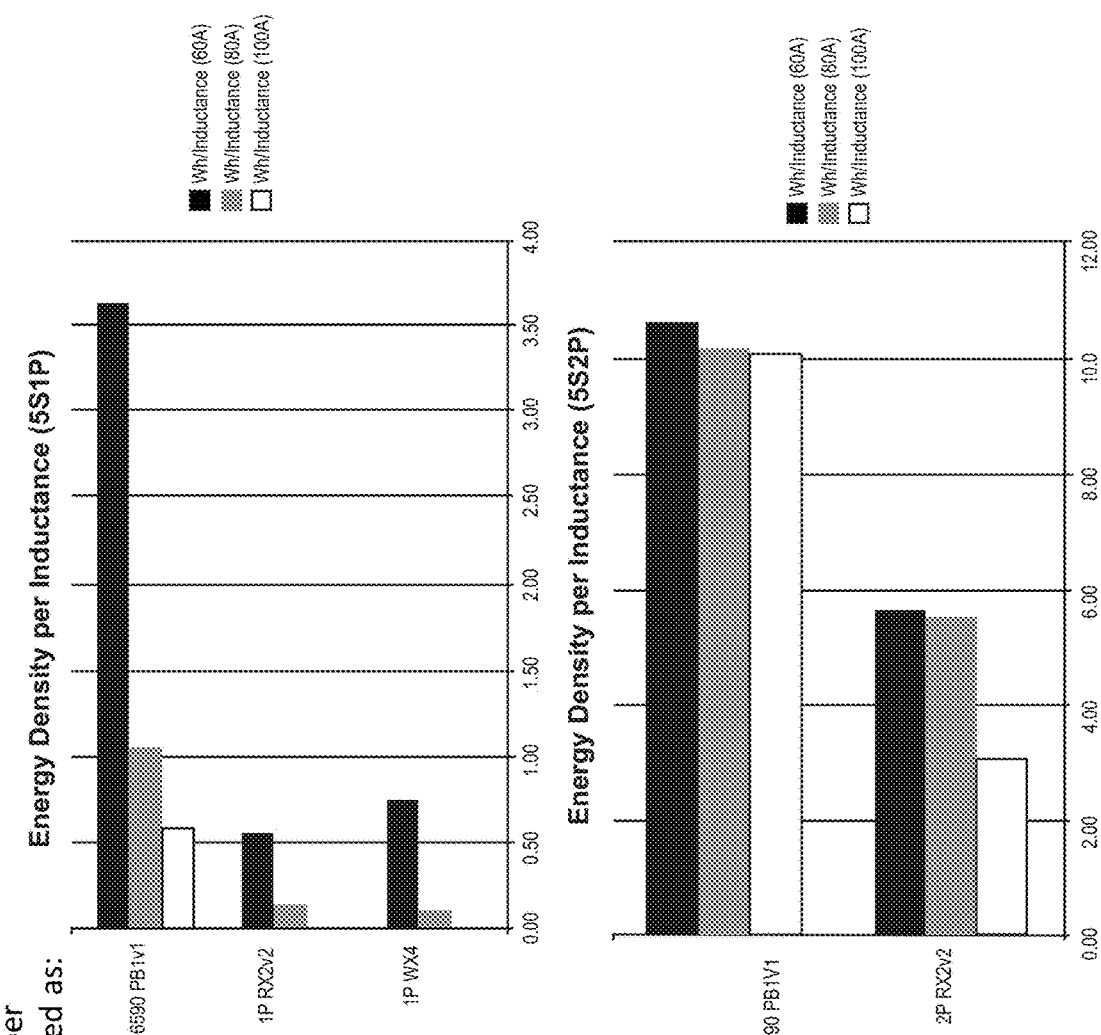
FIG. 74 is an example illustration of inductive characteristics for pouch cell batteries.

FIG. 74 describes an exemplary power tool battery pack which displays a ratio of energy density versus inductance of greater than 0.10 J/L/H @100 A, greater than 0.50 J/L/H @80 A; and greater than 1.00 J/L/H @60 A, when in the 5S1P configuration.

FIG. 74 describes an exemplary power tool battery pack which displays a ratio of energy density versus inductance of greater than 5.00 J/L/H @100 A, greater than 7.00 J/L/H @80 A and greater than 7.00 J/L/H @60 A, when in the 5S2P configuration.

In the exemplary power tool battery pack, the battery utilizes cells having a rated voltage of 3.8 volts per cell. The cells may be of a pouch, prismatic or cylindrical design. Cells of other rated voltages may be used. The volume of the battery pack is to be defined as the space enclosed by the outer surfaces of the battery pack including all opening surfaces that allow access into the interior of the battery pack.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A battery pack, comprising:
    a battery cell holder, wherein the battery cell holder comprises a plurality of frames with each of the frames defining a single cavity and adjacent frames connected to each other; and
    at least one pouch cell battery, the at least one pouch cell battery including a pouch and a battery cell disposed within the pouch, one of the at least one pouch cell battery including the pouch and the battery cell disposed in the single cavity of each of the frames, the at least one pouch cell battery being disposed in each of the adjacent frames such that at least a portion of the pouch is positioned within the cavity and the pouch cell batteries in adjacent frames are electrically connected to each other;
    a sensor placed on at least one of the at least one pouch cell battery; and
    the plurality of frames being arranged in a stacked configuration and further comprising living hinges connecting adjacent frames to each other.

2. The battery pack of claim 1, wherein two of the at least one pouch cell batteries are disposed in the single cavity of each of the frames.

3. The battery pack of claim 1, wherein the battery cell holder comprises a top frame cover disposed on a top of the stacked configuration of frames.

4. The battery pack of claim 3, wherein the top frame cover comprises a holder for connecting a terminal block to the stacked configuration.

5. The battery pack of claim 4, wherein each of the pouch cell batteries includes terminals and further comprising tabs connected to the terminals.

6. The battery pack of claim 5, further comprising sense wires and power wires connected to the tabs, wherein the sense wires and power wires are coupled to the terminal block.

7. The battery pack of claim 1, wherein the cavity of each frame is defined by a first sidewall, a second sidewall, a leading wall and a trailing wall that are connected to form a substantially rectangular frame defining a substantially rectangular cavity.

8. The battery pack of claim 1, wherein each of the frames comprises a bottom frame and a top frame, wherein the bottom frame and the top frame are coupled together to hold the pouch battery cell in the frame.

9. The battery pack of claim 8, wherein the bottom frame and the top frame are coupled together using a one or more coupling devices.

10. The battery pack of claim 9, wherein the coupling devices include one or more snap elements.

11. The battery pack of claim 1, further comprising a housing configured to house the stacked configuration.

12. The battery pack of claim 1, wherein the sensor is a temperature sensor.

13. The battery pack of claim 1, wherein the sensor is placed on the portion of the pouch that is positioned within the cavity.

14. The battery pack of claim 1, wherein the sensor is placed between adjacent pouch cell batteries.

* * * * *